(12) United States Patent
Nakatake et al.

(10) Patent No.: US 7,584,445 B2
(45) Date of Patent: Sep. 1, 2009

(54) SEQUENCE-PAIR CREATING APPARATUS AND SEQUENCE-PAIR CREATING METHOD

(75) Inventors: Shigetoshi Nakatake, 16-37-1106, Otemachi, Kokurakita-ku, Kitakyushu-shi, Fukuoka (JP); Masahiro Kawakita, Yokohama (JP); Takao Ito, Tokyo (JP)

(73) Assignees: Shigetoshi Nakatake, Kitakyushu-shi (JP); Kabushiki Kaisha Toshiba, Tokyo (JP)

( * ) Notice: Subject to any disclaimer, the term of this patent is extended or adjusted under 35 U.S.C. 154(b) by 165 days.

(21) Appl. No.: 11/730,004

(22) Filed: Mar. 29, 2007

(65) Prior Publication Data

US 2008/0244490 A1  Oct. 2, 2008

(51) Int. Cl.
*G06F 17/50* (2006.01)
(52) U.S. Cl. ...................... 716/9; 716/2; 716/10; 703/2
(58) Field of Classification Search ........................ None
See application file for complete search history.

(56) References Cited

U.S. PATENT DOCUMENTS

| | | | | |
|---|---|---|---|---|
| 4,554,625 | A * | 11/1985 | Otten | 700/171 |
| 5,818,722 | A | 10/1998 | Kajitani et al. | |
| 6,374,200 | B1 * | 4/2002 | Nakagawa | 703/8 |
| 6,550,046 | B1 * | 4/2003 | Balasa et al. | 716/8 |
| 7,093,220 | B2 * | 8/2006 | Fallon et al. | 716/10 |
| 7,305,641 | B2 * | 12/2007 | Tang | 716/10 |

FOREIGN PATENT DOCUMENTS

| | | |
|---|---|---|
| JP | 9-108933 | 4/1997 |
| JP | 9-108934 | 4/1997 |
| JP | 2006-99416 | 4/2006 |

OTHER PUBLICATIONS

Chi et al., "An Effective Soft Module Floorplanning Algorithm Based on Sequence Pair," 2002 IEEE, pp. 54-58.*
Lin et al., "A New Faster Sequence Pair Algorithm," ISCAS 2000—IEEE Int'l Symposium on Circuits and Systems, May 28-31, 2000, pp. 407-410.*

(Continued)

*Primary Examiner*—Leigh Marie Garbowski
(74) *Attorney, Agent, or Firm*—Edwards Angell Palmer & Dodge LLP

(57) ABSTRACT

A sequence-pair creating apparatus includes a block placement storing unit that stores information of size of a block $b_i$ in a block set B and information of block placement, creates a sequence-pair (P, M), serving as a pair of a sequence P and a sequence M of the block $b_i$, and further includes a binary relation setting unit that sets, in accordance with the information of block placement and information of size, a binary relation serving as an order relation that indicates a relative configuration between the blocks of a block pair of two blocks and that is derived from a configuration constraint between the blocks extracted from the information of block placement and information of size or designated by an external input, and a total order relation setting unit that sets a series of ranks of the sequences P and M for all the blocks on the basis of the information of block placement and information of size so as to satisfy all binary relations set by the binary relation setting unit.

25 Claims, 25 Drawing Sheets

OTHER PUBLICATIONS

Miyashita et al., "On the Equivalence of the Sequence Pair for Rectangle Packing to the Dimension of Partial Orders," 2002 IEEE, pp. 367-370.*

Murata et al., "Rectangle-Packing-Based Module Placement," 1995 IEEE, pp. 472-479.*

Tang et al., "Fast Evaluation of Sequence Pair in Block Placement by Longest Common Subsequence Computation," IEEE Transactions on CAD of ICs and Systems, vol. 20, No. 12, Dec. 2001, pp. 1406-1413.*

Hiroshi Murata et al., "VLSI Module Placement Based on Rectangle-Packing by the Sequence-Pair," IEEE Transactions of Computer-Aided Design of Integrated Circuits and Systems, vol. 15, No. 12, Dec. 1996, 1518-1524. / discussed in the specification.

Yukiko Kubo et al., "Explicit Expression and Simultaneous Optimization of Placement and Routing for Analog IC Layouts," Proceedings of IEEE/ACM Asia South Pacific Design Automation Conference 2002, 2002, pp. 467-472. / discussed in the specification.

* cited by examiner

FIG. 4
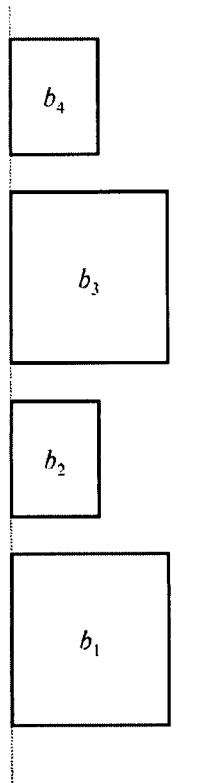
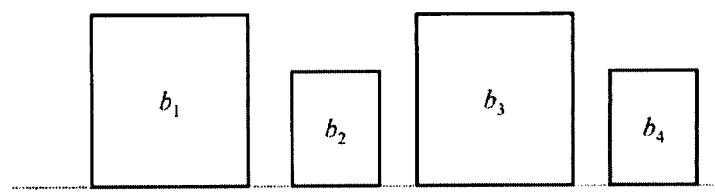
(a)    (b)

FIG. 5
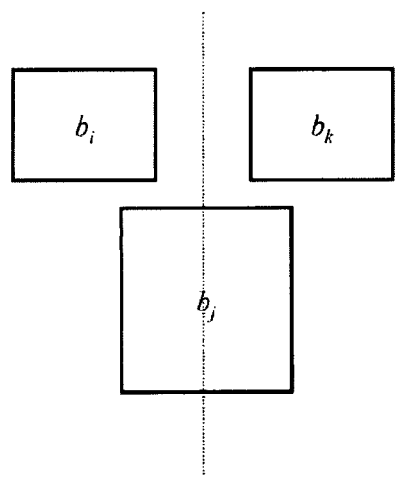 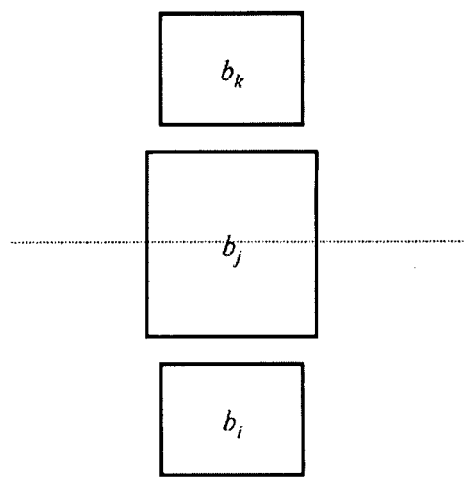
(a)                     (b)

FIG. 9
(a)
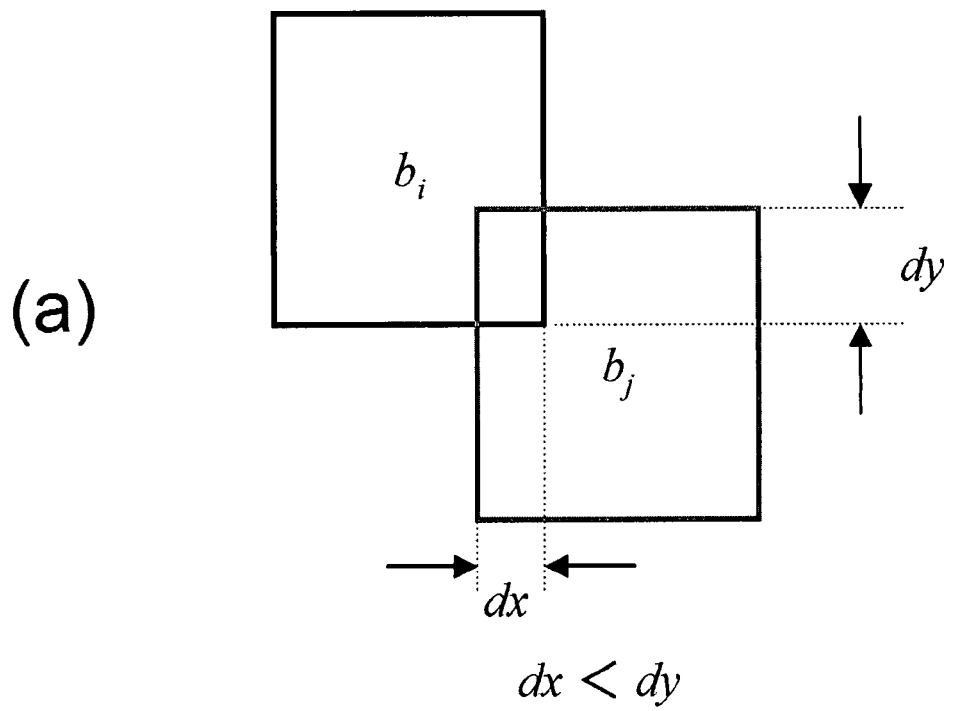
$dx < dy$
(b)
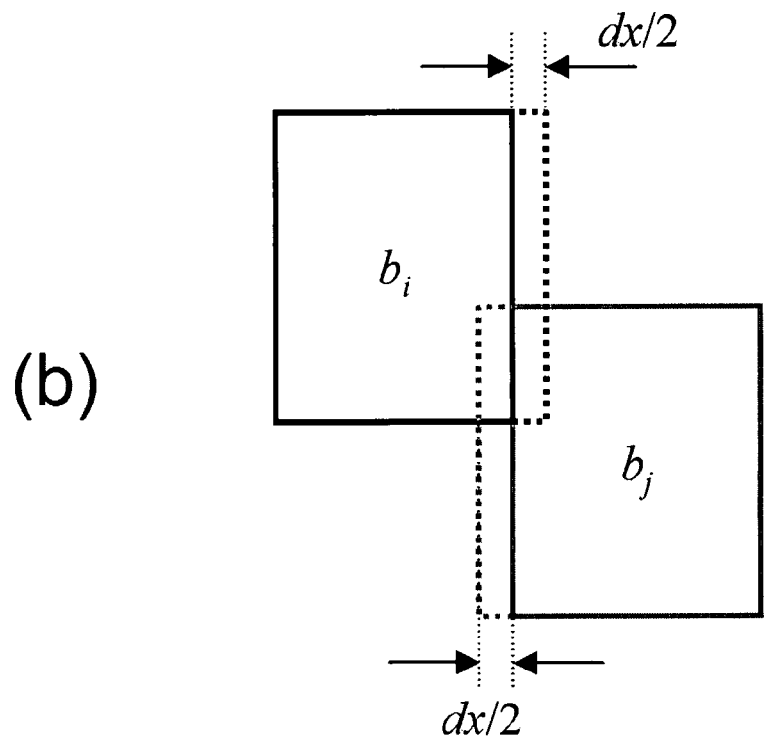

FIG. 10
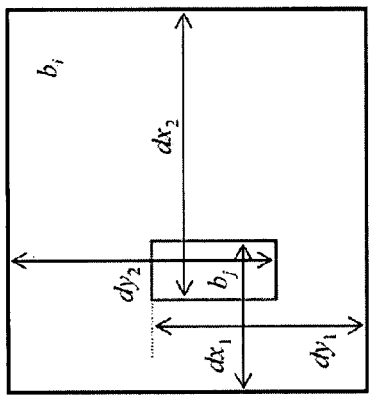
(c)
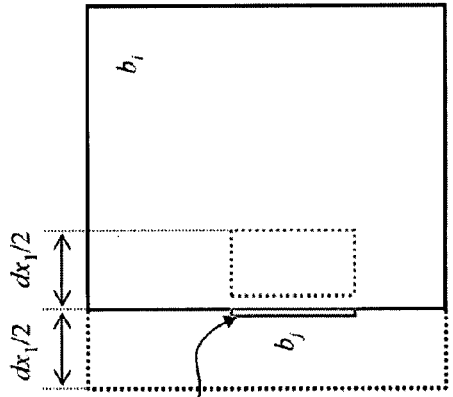
(d)
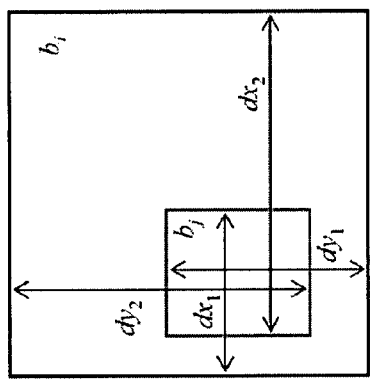
(a)
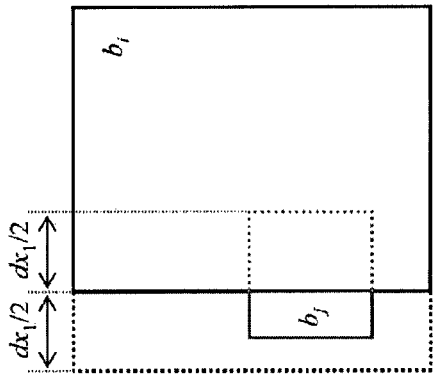
(b)

FIG. 15
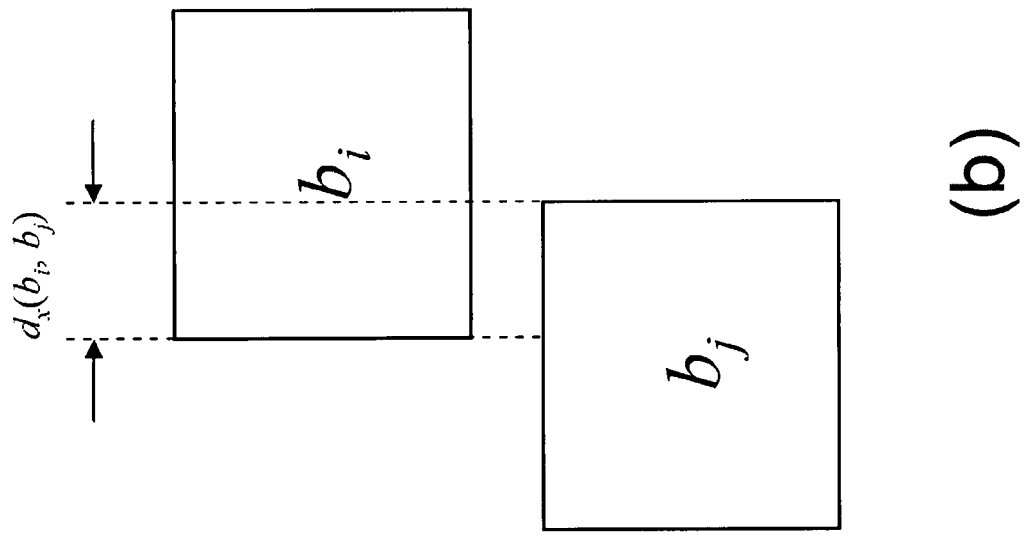
(b)
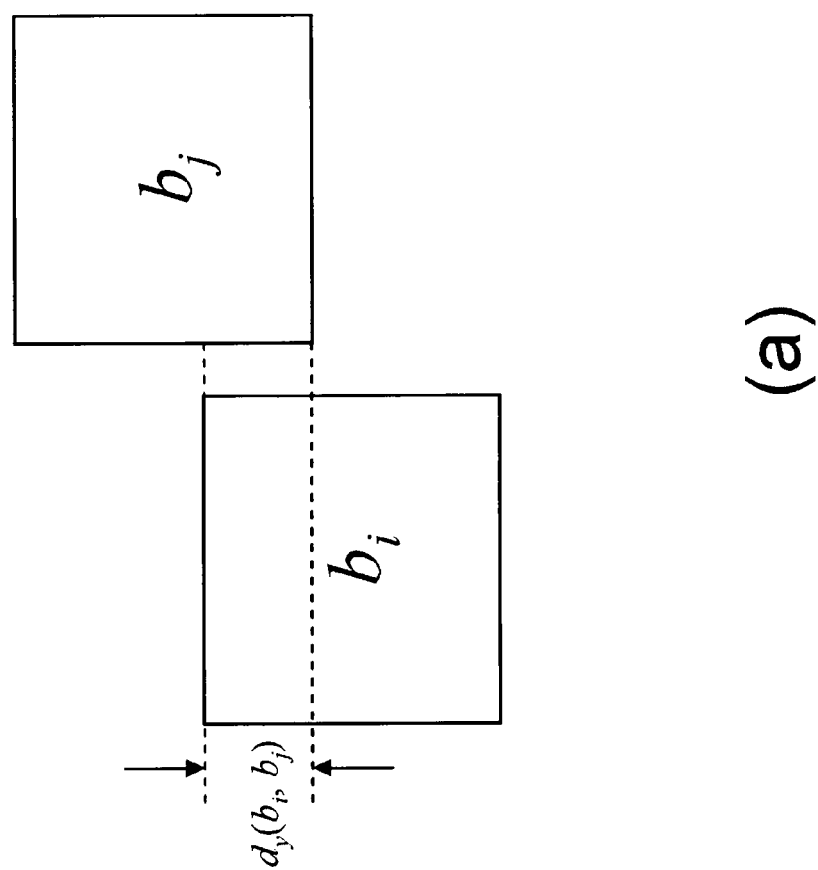
(a)

(a)   (b)

(a)　　　　　　(b)

SEQUENCE-PAIR CREATING APPARATUS AND SEQUENCE-PAIR CREATING METHOD

BACKGROUND OF THE INVENTION

1. Field of the Invention

The present invention relates to a technology for creating a sequence-pair used for a sequence-pair method serving as one method for optimizing a rectangle packing that places rectangle modules having an arbitrary size without an overlap.

2. Description of the Related Art

In VLSI layout design, the first most important design process is module placement. A design process for designating the placement of a module on the unit basis of a circuit block (hereinafter, simply referred to as a "block") on a VLSI semiconductor chip is called a floorplan. In the floorplan, the block is arranged at a smaller region as much as possible. As a consequence, signal delay on the semiconductor chip is within a predetermined limit and the circuit can be fast. Further, the scale of VLSI can be reduced and manufacturing costs can be decreased. A two-dimensional configuration of blocks obtained by assigning a plurality of blocks without an overlap to individual positions is referred to as a block placement. The floorplan optimizes the block placement to compress the area of a convex boundary surrounding the block placement, that is, this is referred to as compaction.

A problem to give rectangle blocks with an arbitrary size and configure the blocks in the minimal rectangle boundary without the overlap of the blocks is well-known as a rectangle packing problem ("RP"). Reference character B denotes a set of N rectangle blocks (hereinafter, referred to as a "block set") with a height and a width of a real number. The "packing" of the set B of N rectangle blocks means the block placement without the overlap of the blocks. The minimal rectangle boundary of the packing is referred to as a "chip". Reference character RP denotes a problem for finding the packing of the set B having the minimal area of the chip. Further, the "floorplan" is defined that a chip C is divided into rectangle regions called rooms each including only one block.

The essential of the floorplan is the solution of RP. However, since the number of blocks for configuration is numerous in the VLSI layout design, the manual operation of the block placement does not necessarily obtain the optimal configuration and it further takes a long time. Therefore, a CAD device for performing the floorplan of the VLSI layout design requires an algorithm for efficient solution of RP.

The RP is well-known as NP-hard. Further, since the height and width of the block have continuous real numbers, the RP is not a simple combination optimizing problem. Therefore, in the case of the solution of RP, an iterative approach such as combinational search is employed.

In the combinational search, a solution space serving as a set of codes for prescribing a structure is defined. When there is a packing for one code in the solution space, the code is feasible. The feasible code is evaluated by the chip area of the packing corresponding to the code. In the combinational search, the feasible code having the best-evaluated packing is searched.

By searching for all codes with the combinational search, the optimal packing can be obtained. However, when there are a large number of blocks, the search range is extremely large and is not practical. Therefore, a heuristic search method is used. In the case of using the heuristic search method, in order to execute the effective search, it is important which solution space is selected. The effective search needs the solution space that is P-admissible. The P-admissible solution space satisfies the following four conditions:

(1) The solution space is finite;
(2) Every solution is feasible;
(3) Evaluation for each code is possible in polynomial time and so is the realization of the corresponding packing; and
(4) The packing corresponding to the best evaluated code in the space coincides with an optimal solution of RP.

As an extremely effective solution space for giving the P-admissible solution space, it is well-known that the codes are expressed by a sequence-pair of block names (refer to [Ref. 1], [Ref. 2], [Ref. 3], and [Ref. 4]). Features of the solution space are as follows:

(1) Since the codes are expressed only by the sequence pair of the block names, the number of combinations is $(n!)^2$;
(2) Any packing can be expressed and, obviously, it is proved that even the minimal area solution can be expressed; and
(3) All sequence-pairs express the packing (including only the feasible code). Hereinbelow, a description will be given of a solution of RP using the sequence-pair with a floorplanner.

With a method using the sequence-pair ("sequence-pair method"), first, as an initial condition, a block placement (packing) before the optimization is given. A designer creates an initial layout with a CAD device or the like, and the initial block placement is given by rectangle approximation of a circuit device or wiring in the initial layout. Further, the floorplanner first extracts the sequence-pair from the given initial block placement. Subsequently, the floorplanner sets the extracted initial sequence-pair as an initial state, and performs the combinational search with the heuristic search method (e.g., Simulated Annealing method) to search for the optimal sequence-pair. In this case, as an evaluated value for determining the optimality of the sequence-pair, the chip area corresponding to the sequence-pair is employed. Finally, the floorplanner outputs, as the optimal packing, the packing corresponding to the sequence-pair of the optimal evaluated value.

[1] Extraction of Sequence-Pair From Packing

First, a description will be given of extracting the sequence-pair from the packing (refer to [Ref. 3]).

Reference character Π denotes the packing on the chip C. As mentioned above, the floorplan means that the chip C is divided into the rooms each including only one block. The room without including one block is "empty". A cutting-seg denotes a linear segment forming the boundary of the rooms including four sides of the chip C. FIG. 21 shows the floorplan of the packing Π having six blocks. Reference characters a to d denote the blocks and a dotted line denotes the "cutting-seg".

In the packing Π, a pebble p is placed in the center of the room that is not empty. The pebble p is moved to the right until it reaches the cutting-seg forming one side of the room. Subsequently, when the pebble p reaches the cutting-seg, the pebble p is then moved above until it next reaches the cutting-segs crossing like a T-shape above the cutting-seg. Subsequently, when the pebble p reaches the cutting-seg, the pebble p is moved in the right direction until it next reaches the cutting-segs crossing like a T-shape on the right side of the cutting seg. Hereinafter, similarly, the pebble p is moved above, to the right, and above, . . . until the pebble p reaches the upper right corner. The above-obtained locus of the pebble p is called "right-up locus". Similarly, "up-left locus", "left-down locus", and "down-right locus" are defined. FIG. 22 shows a right-up locus, up-left locus, left-down locus, and down-right locus for a block b in the packing Π shown in FIG. 21. Hereinbelow, the right-up locus, up-left locus, left-down locus, and down-right locus for a block x are defined as RU(x), UL(x), LD(x), and DR(x).

The sum of the left-down locus and the right-up locus for the block x is referred to as a "positive locus". Further, the sum of the up-left locus and the down-right locus for the block x is referred to as a "negative locus". If the packing Π is given, one positive locus and one negative locus for one block are uniquely determined. Therefore, hereinlater, the positive locus and negative locus are referred to by using the block name. FIG. 23A is a diagram showing the positive locus and FIG. 23B is a diagram showing the negative locus in the packing Π shown in FIG. 21.

In this case, the establishment of the following theorems can be proved:

(Theorem 1)

No pair of positive loci cross each other. No pair of negative loci each other. (They may run along the same cutting-segs, but not cross each other.)

(End of Theorem 1.)

From Theorem 1, m positive loci and m negative loci obviously have linear order relations. Then, the positive loci are ordered from the upper left to the lower right of the chip C, and the negative loci are ordered from the lower left to the upper right of the chip C. The sequences of the positive loci and the negative loci are referred to as P and M, respectively. The loci are uniquely specified by the block names. Therefore, the sequences P and M are represented as the sequences of module names. The above-obtained sequence pair (P, M) of the module names is defined as a "sequence-pair". For example, referring to FIGS. 23A and 23B, the sequences P and M are represented as P=(abdecf) and M=(cbfade).

The above operation for making a corresponding relationship between the packing Π and the sequence-pair is referred to as "gridding", and is referred to as Gridding(Π). Gridding (Π)=(P, M) is established.

Upon giving the sequence-pair having a corresponding relationship with the packing Π of the block set B, the following four partial sets $M^{aa}(X)$, $M^{bb}(x)$, $M^{ba}(x)$, and $M^{ab}(x)$ of the block set B are uniquely determined with respect to two arbitrary blocks x and x' in the block set B:

[Expression 1]

$$M^{aa}(x) = \{x' | x' \text{ is after } x \text{ in both } P \text{ and } M\} \quad (1)$$

$$M^{bb}(x) = \{x' | x' \text{ is before } x \text{ in both } P \text{ and } M\} \quad (2)$$

$$M^{ba}(x) = \{x' | x' \text{ is before } x \text{ in } P \text{ and after } x \text{ in } M\} \quad (3)$$

$$M^{ab}(x) = \{x' | x' \text{ is after } x \text{ in } P \text{ and before } x \text{ in } M\} \quad (4)$$

For example, with respect to the sequence-pair (P, M)=(abdecf, cbfade) obtained from the packing shown in FIG. 21, four partial sets for the block b are $M^{aa}(b)=\{d, e, f\}$, $M^{bb}(b)=\phi$, $M^{ba}(b)=\{a\}$, and $M^{ab}(b)=\{c\}$. Further, the following dual relation between the blocks is established:

[Expression 2]

$$x' \in M^{aa}(x) \Leftrightarrow x \in M^{bb}(x') \quad (5)$$

$$x' \in M^{ba}(x) \Leftrightarrow x \in M^{ab}(x') \quad (6)$$

If the left side of the block x is on the right of the right side of the block x', x is "right of" x' (Let Gridding(Π)=(P, M). If $x' \in M^{aa}(x)$ then X' is right of x in Π). Similarly, "left of", "above", and "below" relationships between two blocks are defined. In this case, the establishment of the following theorem is proved:

(Theorem 2)

Let Gridding(Π)=(P, M). If $x' \in M^{aa}(x)$ then x' is right of x in Π. Similarly, if $x' \in M^{bb}(x)$ then x' is left of x. If $x' \in M^{ab}(x)$ then x' is below x. If $x' \in M^{ba}(x)$ then x' is above x.

(End of Theorem 2.)

[2] Creation of Packing from Sequence-pair

If the sequence-pair is extracted, the blocks are rearranged in the sequence-pair, thereby searching for the optimal packing. As the effective search, the heuristic method such as simulated annealing is used. In this case, upon evaluating the packing obtained by rearranging the sequence-pair, the packing needs to be created from the sequence-pair. Although the method for creating the packing from the sequence-pair is described in [Ref. 3] and [Ref. 1], it will be briefly described here.

First, the following geometric constraints are derived from the sequence-pair (P, M):

(1) With respect to two arbitrary blocks x and x', if $x' \in M^{aa}(x)$ then x' should be right of x in the packing Π. If $x' \in M^{bb}(x)$ then x' should be left of x.

(2) With respect to two arbitrary blocks x and x', if $x' \in M^{ab}(x)$ then x' should be below x. If $x' \in M^{ba}(x)$ then x' should be above x.

The packing Π for satisfying the geometric constraints is referred to as a (P, M) packing. [Ref. 3] proves that there are the (P, M) packings in all sequence-pairs (P, M). FIG. 24 shows the (P, M) packing corresponding to (P, M)=(abdecf, cbfade).

Next, a description will be given of a method for obtaining the packing having the minimal chip area in the (P, M) packing of the block set B. This packing is referred to as "(P, M)-optimal". The (P, M)-optimal packing is obtained by applying a maximal length path algorithm to a directed acyclic graph having weighted contacts with $O(m^2)$-time calculation.

First, a horizontal constraint graph $G_H=(V, E_H, \Omega_H)$ is defined from the geometric constraint (1) of the sequence-pair (P, M) as follows:

[Expression 3]

$$G_H = (V, E_H, \Omega_H)$$

$$V = V_1 \cup V_2$$

$$V_1 = \{\text{source s, sink t}\}$$

$$V_2 = \{i | i \text{ one-to-one corresponds to each block } x_i \text{ in } B\}$$

$$E_H = E_1 \cup E_{2H}$$

$$E_1 = \{(s,i),(i,t) | i \in V_2\}$$

$$E_{2H} = \{(i,j) \in V_2 \times V_2 | j \text{ is right of } i\}$$

$$\Omega_H = \{\omega(s), \omega(t)\} \cup \{\omega(i) | i \in V_2\}$$

$$\omega(s) = \omega(t) = 0, \omega(i) = w(x_i) \; (\forall_i \in V_2) \quad (7)$$

where, V, $V_1$, and $V_2$ denote sets of vertexes, E, $E_1$, and $E_{2H}$ denote sets of directed edges, and $\Omega_H$ denotes a set of weights of vertex. s and t denote a source and a sink, respectively. Index i denotes a vertex of the horizontal constraint graph $G_H$ other than the source s and the sink t. ω(x) denotes a weight of a vertex x. $w(x_i)$ denotes a width of a block $x_i$.

A vertical constraint graph $G_V=(V, E_V, \Omega_V)$ is similarly defined on the basis of above-and-below positional relation of the geometrical constraint (2) and a height h(x) of a block x (∈B).

[Expression 4]

$$G_V = (V, E_V, \Omega_V)$$

$$V = V_1 \cup V_2$$

$V_1=\{\text{source } s, \text{sink } t\}$ $V_2=\{i | i \text{ one-to-one corresponds to each block } x_i \text{ in } B\}$ $E_V=E_1 \cup E_{2V}$ $E_1\{(s,i),(i,t)|i \in V_2\}$ $E_{2V}=\{(i,j) \in V_2 \times V_2 | j \text{ is above } i\}$ $\Omega_V=\{\omega(s), \omega(t)\} \cup \{\omega(i)|i \in V_2\}$ $$\omega(s)=\omega(t)=0, \omega(i)=h(x_i) \ (\forall_i \in V_2) \quad (8)$$

where, V, $V_1$, and $V_2$ denote sets of vertexes, E, $E_1$, and $E_{2V}$ denote sets of directed edges, $\Omega_V$ denotes a set of weights of vertexes. s and t denote a source and a sink, respectively. Index i denotes a vertex of the vertical constraint graph $G_V$ other than the source s and the sink t. $\omega(x)$ denotes a weight of a vertex x. $h(x_i)$ denotes a height of the block $x_i$.

FIG. 25A is a horizontal constraint graph with the weight of the (P, M) packing corresponding to (P, M)=(abdecf, cbfade), and FIG. 25B is a vertical constraint graph with the weight thereof. Both the graphs do not include any directed closed paths. Further, with respect to a pair $(x_i, x_j)$ of the block, a side exists in any of the graphs $G_H$ and $G_V$ and the side does not exist in both the graphs. Therefore, the x coordinate and the y coordinate of the block satisfy the constraint of the configuration and are also independently determined. As a consequence, the block placement without the overlap is obtained. The x coordinate and the y coordinate of the module $x_i (\in B)$ are determined as the sum of weights of vertexes other than the vertex i at a maximal length path (having the maximal sum of weights of vertexes on the path) between the source s and the vertex i in the graphs $G_H$ and $G_V$. Similarly, the height and width of the chip are determined as the sums of weights of vertexes at the maximal length path between the source s and sink t in the graphs $G_H$ and $G_V$. The width and height of the chip can be independently minimized, and the packing obtained as a result of minimization is the (P, M)-optimal packing. FIG. 26 shows an example of the block placement obtained as a consequence of calculating the maximal length path.

As mentioned above, the geometric constraint of the compaction in the conventional VLSI is basically extracted by rectangle-approximating the circuit device or wiring given as an initial layout and extracting the above-and-below and right-and-left relations of the rectangle blocks. In this case, when the blocks are overlapped, it is necessary to determine the initial sequence-pair by determining the shape of the blocks and the initial positional coordinates and extracting the above-and-below and right-and-left relations of the blocks while keeping the positional relation of the blocks on the initial layout. Depending on this determination, the wiring connection can be disconnected or the circuit performance can be greatly reduced.

Further, the layout design requires a predetermined clearance between the blocks under the design rule. Upon imposing the constraint using the design rule, the sequence-pair needs to be determined in consideration of the design rule.

Furthermore, in order to improve the circuit performance, a series of circuit devices need to be arranged on a linear line and plural circuit devices need to be symmetrically arranged in many cases. Therefore, in this case, the initial sequence-pair needs to be determined to store the constraints of the linear configuration and the symmetrical configuration of plural blocks on the initial layout.

However, with the conventional method as mentioned above, information on a specific configuration constraint between the blocks is eliminated and the above various constraints are not considered upon extracting the sequence-pair from the initial packing. Therefore, there is such a problem that the compaction for satisfying the constraint using the design rule and the constraint to improve the circuit performance is not performed.

SUMMARY OF THE INVENTION

Accordingly, it is an object of the present invention to provide a sequence-pair creating technology that can extract a sequence-pair that reflects a constraint of the block placement on the initial layout from a given block placement.

A first constitution of the present invention of a sequence-pair creating apparatus comprises block placement storing means that stores information of size serving as information of a weight $w(b_i)$ and a height $h(b_i)$ of a block $b_i$ ($b_i \in B$) in a set B of N ($\geq 2$) rectangle blocks (hereinafter, referred to as a "block set") having a width and a height, and information of block placement having positional coordinates $(x(b_i), y(b_i))$ of the block $b_i$ ($b_i \in B$) upon configuring all blocks in the block set B on a chip. The sequence-pair creating apparatus creates a sequence-pair (P, M), serving as a pair of a sequence P of the N blocks $b_i$ ($b_i \in B$) and a sequence M of the N blocks $b_i$ ($b_i \in B$) different from the sequence P; for uniquely specifying a positional relation between the blocks in the case of configuring all the blocks in the block set B on the chip without an overlap of the block. The sequence-pair creating apparatus comprises:

binary relation setting means that sets, in accordance with the information of block placement and information of size, a binary relation serving as an order relation that indicates a relative configuration between the blocks of a block pair ($b_i$, $b_j$) of two blocks $b_i$ and $b_j$ ($\in B$) and that is derived from a configuration constraint between the blocks extracted from the information of block placement and information of size or designated by an external input; and total order relation setting means that sets a series of ranks of the sequences P and M for all the blocks on the basis of the information of block placement and information of size so as to satisfy all binary relations set by the binary relation setting means.

With this constitution, the binary relation setting means extracts the configuration constraint between the blocks, extracted from the information of block placement and information of size or determined by the external input, as the binary relations (($p_{ord}(b_i, b_j)$ and $m_{ord}(b_i, b_j)$ or $h_{ord}(b_i, b_j)$ and $v_{ord}(b_i, b_j)$)) between the two blocks. The total order relation setting means sets the total order relation of the blocks in the sequences P and M so as to satisfy all the binary relations. Therefore, the above-obtained sequence-pair (P, M) captures the configuration constraint between the blocks.

Therefore, by performing the packing of the blocks on the chip on the basis of the sequence-pair (P, M) that captures the configuration constraint between the blocks, the optimal packing for satisfying the configuration constraint can be executed.

In this case, the configuration constraint between the blocks is not captured upon creating the sequence-pair (P, M), but the configuration constraint between the blocks is once abstracted as the binary relation between the two blocks and the extracted binary relation is captured upon setting the total order of the sequences P and M. Therefore, the configuration constraint between the blocks is easily captured to the sequences P and M and can be executed with a small amount of calculation.

Herein, the "block" corresponds to a circuit block. The "block set" corresponds to a set of N ($\geq 2$) rectangle blocks with given width and height. The "block-pair" corresponds to the combination of two blocks in the block set B.

The "information of size" corresponds to information on a width $w(b_i)$ and a height $h(b_i)$ of a block $b_i$ ($b_i \in B$) in the block set B. The "information of block placement" corresponds to information having positional coordinates $(x(b_i), y(b_i))$ of the block $b_i$ ($b_i \in B$) upon configuring all blocks in the block set B on the chip. It is noted that the positional coordinates of the block correspond to the coordinates of a representative point determined in the block, including the coordinates of the center of gravity of the block, the coordinates of the lower-left vertex of the block, and the coordinates of the upper-right vertex of the block.

The "configuration constraint" corresponds to a constraint on the positional relation between the blocks upon configuring the blocks. The configuration constraint between the blocks, "by designated by the external input", corresponds to the configuration constraint between the blocks, forcedly designated by a user.

The "sequence-pair" corresponds to, in the block set B having N elements, a pair of the sequence P having N blocks $b_i$ ($b_i \in B$) and the sequence M having N block $b_i$ ($b_i \in B$) different from the sequence P, and further corresponds to an ordered pair of the sequences P and M for uniquely specifying the positional relation between the blocks upon configuring all the blocks in the block set B on the chip without the overlap thereof.

The "order relation" corresponds to a relation for establishing reflexivity (i.e., $x \leq x$ where X is a set as a target considered and x is an arbitrary element in the set X), transitivity (i.e., if $x \leq y$ and $y \leq z$ then $x \leq z$ where x, y, and z are arbitrary elements in the set X), and antisymmetry (i.e., if $x \leq y$ and $y \leq x$ then $x = y$ where x and y are arbitrary elements in the set X). The "total order relation" corresponds to totalness (i.e., any of $x \leq y$ and $y \leq x$ is established where x and y are arbitrary elements in the set X) in addition to the reflexivity, transitivity, and antisymmetry. Further, the "binary relation" generically corresponds to a relation in which a component of one set P corresponds to a component of the other set Q in a partial set of a direct product P×Q. However, in this specification, the "binary relation" particularly corresponds to an order relation indicating a relative configuration between the blocks in one block-pair, such as the left-and-right relation $h_{ord}(b_i, b_j)$ and above-and-below relation $v_{ord}(b_i, b_j)$ at the two-dimensional configuration of two blocks $b_i$ and $b_j$ or P order relation $p_{ord}(b_i, b_j)$ and M order relation $m_{ord}(b_i, b_j)$ in the sequence P or sequence M of two blocks. Incidentally, in this specification, the "left-and-right relation" corresponds to the order relation for the horizontal direction of the positional coordinates, and the "above-and-below relation" corresponds to the order relation for the vertical direction of the positional coordinates. The "P-order relation" corresponds to the order relation in the sequence P, and the "M-order relation" corresponds to the order relation in the sequence M. Further, the above-mentioned (Theorem 2) may be used to mutually transforming between the left-and-right relation and above-and-below relation and between the P-order relation and M-order relation.

The "rank" of the element in the sequence corresponds to the position of the element in the sequence.

With the second constitution of the sequence-pair creating apparatus according to the present invention, in the first constitution, the binary relation setting means comprises separation constraint extracting means that, by referring to positional coordinates $(x(b_i), y(b_i))$ and $(x(b_j), y(b_j))$, widths $w(b_i)$ and $w(b_j)$, and heights $h(b_i)$ and $h(b_j)$ of the two blocks $b_i$ and $b_j$ ($\in B$) stored in the block placement storing means, sets the binary relation between the block $b_i$ and block $b_j$ in accordance with a left-and-right relation of the positional coordinates of the block $b_i$ and $b_j$ when the y coordinates of sides in the vertical direction (hereinafter, this is referred to as the y direction) do not have a clearance with a predetermined width not less than 0 and those in the horizontal direction (hereinafter, this is referred to as the x direction) of the block $b_i$ and block $b_j$ have a clearance with a predetermined width not less than 0, and further sets the binary relation between the block $b_i$ and block $b_j$ in accordance with an above-and-below relation between the positional coordinates of the blocks $b_i$ and $b_j$ when the x coordinates of sides in the x direction of the block $b_i$ and block $b_j$ do not have a clearance with a predetermined width not less than 0 and those in the y direction of the block $b_i$ and block $b_j$ have a clearance with a predetermined width not less than 0.

Herein, the "clearance" corresponds to the allowable minimal value of the distance between the two blocks.

With this constitution, the separation constraint extracting means determines that, with respect to two blocks $b_i$ and $b_j$, the blocks $b_i$ and $b_j$ have the left-and-right order relation when the information of block placement and information of size stored in the block placement storing means includes the clearance for the x direction and does not include the clearance for the y direction. Then, the separation constraint extracting means sets the binary relations ($p_{ord}(b_i, b_j)$ and $m_{ord}(b_i, b_j)$ and $h_{ord}(b_i, b_j)$ and $v_{ord}(b_i, b_j)$) in accordance with the left-and-right relation between the positional coordinates of the blocks $b_i$ and $b_j$.

On the other hand, the separation constraint extracting means determines that, with respect to the two blocks $b_i$ and $b_j$, the blocks $b_i$ and $b_j$ have the above-and-below order relation when the information of block placement and information of size stored in the block placement storing means includes the clearance for the y direction and does not include the clearance for the x direction. Then, the separation constraint extracting means sets the binary relation in accordance with the above-and-below relation of the positional coordinates of the blocks $b_i$ and $b_j$.

As a consequence, from the information of block placement and information of size stored in the block placement storing means, the order relation between the blocks configured to satisfy the design standard, and the order relation can be reflected to the sequence-pair.

With the third constitution of the sequence-pair creating apparatus according to the present invention, in the first constitution, the binary relation setting means comprises:

vertical collinear constraint extracting means that sets the binary relation between the two blocks $b_i$ and $b_j$ in a partial set $B_k$ ($\in B$) of the block set B stored in the block placement storing means in accordance with an above-and-below relation between the positional coordinates of the block $b_i$ ($\in B_k$) upon imposing a configuration constraint (hereinafter, referred to as a "vertical collinear constraint") for aligning a left side or right side or representative points of the block $b_i$ ($\in B_k$) on a vertical line to the blocks in the partial set $B_k$.

With this constitution, the vertical collinear constraint extracting means sets the binary relation ($p_{ord}(b_i, b_j)$ and $m_{ord}(b_i, b_j)$ or $h_{ord}(b_i, b_j)$ and $v_{ord}(b_i, b_j)$, etc.) in accordance with the vertical collinear constraint extracted from the information of block placement and information of size stored in the block placement storing means or externally input by a designer. The total order relation setting means sets the total order relation between the sequences P and M for satisfying the binary relation. As a consequence, the vertical collinear constraint given by the initial block placement or the vertical collinear constraint externally input by the designer can be reflected to the sequence-pair.

Herein, the "representative point" of the block corresponds to a representative point of the block position. In general, the representative point is the center point of gravity of the block, lower-left vertex, or upper-right vertex and however is not limited to this.

With the fourth constitution of the sequence-pair creating apparatus according to the present invention, in the first constitution, the binary relation setting means comprises:

horizontal collinear constraint extracting means that sets the binary relation between two blocks $b_i$ and $b_j$ in a partial set $B_k$ of the block set B stored in the block placement storing means in accordance with a left-and-right relation between positional coordinates the block $b_i$ ($\in B_k$) in the partial set $B_k$ when imposing a configuration constraint (hereinafter, referred to as a "horizontal collinear constraint") for aligning top sides or bottom sides or representative points of the blocks in the partial set $B_k$ on a horizontal line to the blocks in the partial set $B_k$.

With this configuration, the horizontal collinear constraint extracting means sets the binary relation ($p_{ord}(b_i, b_j)$ and $m_{ord}(b_i, b_j)$ or $h_{ord}(b_i, b_j)$ and $v_{ord}(b_i, b_j)$, etc.) in accordance with the horizontal collinear constraint that is extracted from the information of block placement and information of size stored in the block placement storing means or externally input by the designer. The total order relation setting means sets the total order relation between the sequences P and M for satisfying the binary relation. As a consequence, the horizontal collinear constraint given by the initial block placement or the horizontal collinear constraint externally input by the designer can be reflected to the sequence-pair.

With the fifth constitution of the sequence-pair creating apparatus according to the present invention, in the first constitution, the binary relation setting means comprises:

horizontal symmetrical constraint extracting means that sets the binary relation in accordance with a left-and-right relation of the positional coordinates of both blocks $b_i$ and $b_k$ of three blocks $b_i$, $b_j$, and $b_k$ in the block set B stored in the block placement storing means upon configuration constraint (hereinafter, referred to as a "horizontal symmetrical constraint") for configuring the block $b_i$ and block $b_k$ at positions symmetrical to the block $b_j$ in the horizontal direction.

With this constitution, the horizontal symmetrical constraint extracting means sets the binary relation ($p_{ord}(b_i, b_j)$ and $m_{ord}(b_i, b_j)$ or $h_{ord}(b_i, b_j)$ and $v_{ord}(b_i, b_j)$, etc.) in accordance with the horizontal symmetrical constraint that is extracted from the information of block placement and information of size stored in the block placement storing means or externally input by the designer. The total order relation setting means sets the total order relation between the sequences P and M for satisfying the binary relation. As a consequence, the horizontal symmetrical constraint given by the initial block placement or the horizontal symmetrical constraint externally input by the designer can be reflected to the sequence-pair.

With the sixth constitution of the sequence-pair creating apparatus according to the present invention, in the first constitution, the binary relation setting means comprises:

vertical symmetrical constraint extracting means that sets the binary relation in accordance with an above-and-below relation of the positional coordinates of both blocks $b_i$ and $b_k$ of three blocks $b_i$, $b_j$, and $b_k$ in the block set B stored in the block placement storing means when a configuration constraint (hereinafter, referred to as "vertical syummetrical constraint") for configuring the block $b_i$ and block $b_k$ at positions symmetrical to the block $b_j$ in the vertical direction.

With this constitution, the vertical symmetrical constraint extracting means sets the binary relation ($p_{ord}(b_i, b_j)$ and $m_{ord}(b_i, b_j)$ or $h_{ord}(b_i, b_j)$ and $v_{ord}(b_i, b_j)$, etc.) in accordance with the vertical symmetrical constraint that is extracted from the information of block placement and information of size stored in the block placement storing means or externally input by the designer. The total order relation setting means sets the total order relation between the sequences P and M for satisfying the binary relation. As a consequence, the vertical symmetrical constraint given by the initial block placement or the vertical symmetrical constraint externally input by the designer can be reflected to the sequence-pair.

With the seventh constitution of the sequence-pair creating apparatus according to the present invention, in any one of the first to sixth constitutions, the binary relation setting means comprises:

binary relation transition setting means that transitively sets the binary relation between blocks $b_i$ and $b_k$ of three blocks $b_i$, $b_j$, and $b_k$ in the block set B from the binary relation between the blocks $b_i$ and $b_j$ and the binary relation between the blocks $b_j$ and $b_k$ when the binary relation between the blocks $b_i$ and $b_j$ and the binary relation between the blocks $b_j$ and $b_k$ are set and the binary relation between the blocks $b_i$ and $b_k$ is not set.

With this constitution, when various configuration constraints including the separation constraint, horizontal collinear constraint, vertical collinear constraint, horizontal symmetrical constraint, and vertical symmetrical constraint give the binary relation, the binary relation transitively setting means sets the binary relation $p_{ord}(b_i, b_k)$ (or $m_{ord}(b_i, b_k)$) to be non-contradictionary in accordance with transitivity (for example, if P-order relations $p_{ord}(b_i, b_j)$ and $p_{ord}(b_j, b_k)$ are given as the binary relations, the binary relation transitively setting means sets the binary relation $p_{ord}(b_i, b_k)$ to be non-contradictionary in accordance with the transitivity. The case of giving M-order relation $m_{ord}(b_i, b_k)$, left-and-right relation $h_{ord}(b_i, b_k)$, or above-and-below relation $v_{ord}(b_i, b_k)$ as the binary relation, the operation is the same as the foregoing). Thus, the total order relation setting means can set the total order relation between the sequences P and M so that the order relation between the blocks $b_i$, $b_j$, and $b_k$ is non-contradictionary.

Herein, the "transitively derived" means that the order relation is derived with transitivity. For example, since the binary relation $p_{ord}$ is an order relation, the transitivity is established and if setting $\alpha(b_i) \leq \alpha(b_j)$ (where $\alpha(b_i)$ is a rank of the block $b_i$ in the sequence P) with respect to $p_{ord}(b_i, b_j)$ and further setting $\alpha(b_j) \leq \alpha(b_k)$ with respect to $p_{ord}(b_j, b_k)$, then $\alpha(b_i) \leq \alpha(b_k)$ can transitively be derived with the transitivity with respect to $p_{ord}(b_i, b_k)$.

With the eighth constitution of the sequence-pair creating apparatus according to the present invention, in any one of the first to seventh constitutions, the binary relation setting means sets, with respect to two blocks $b_i$ and $b_j$ in the block set B, a binary relation between the sequences P and M to $p_{ord}(b_i, b_j)=1$ and $m_{ord}(b_i, b_j)=1$ when the block $b_i$ is on the left of the block $b_j$ and further sets a binary relation between the sequences P and M to $p_{ord}(b_i, b_j)=0$ and $m_{ord}(b_i, b_j)=1$ when the block $b_i$ is below the block $b_j$, and the total order relation setting means comprises:

P-order setting means that sequentially sets ranks of the blocks at the sequence P from the left by repeating operation for extracting a block $b_i$ ($\in B_n$) in a set $B_n$ ($\subseteq B$) of blocks to which the rank is not set at the sequence P, having a binary order relation $p_{ord}(b_i, b_j)$ between the block $b_i$ ($\in B_n$) and all blocks $b_j$ ($\in B_n$) other than the block $b_i$ in the set $B_n$, which is not 1, and for setting the set of the extracted blocks as a set $B_s$ ($\subseteq B_n$) and operation for selecting the block $b_i$ in the set $B_s$ having the right side thereof that is on the left or at the collinear position of the left side of all blocks $b_j$ ($\in B_s$) other than the block $b_i$ in the set $B_s$ or having the bottom side thereof that is upper than the top side of the block $b_j$, and for aligning the selected block $b_i$ at the sequence P packing from the left; and M-order setting means that sequentially sets ranks of the blocks at the sequence M from the left by repeating operation for extracting a block $b_i$ ($\in B_m$) in a set $B_m$ ($\subseteq B$) of blocks to which the rank is not set at the sequence M, having a binary order relation $m_{ord}(b_i, b_j)$ between the block $b_i$ ($\in B_m$) and all blocks $b_j$ ($\in B_m$) other than the block $b_i$ in the set $B_m$, which is not 1, and for setting the set of the extracted blocks as a set $B_t$ ($\subseteq B_m$) and operation for selecting the block $b_i$ in the set $B_t$ having the right side of the block $b_i$ is on the left or at the collinear position of the left side of all the blocks $b_j$ ($\in B_t$) in the set $B_t$ other than the block $b_i$ or the bottom side of the block $b_i$ is upper than the top side of the block $b_j$, and for aligning the selected block $b_i$ at the sequence M packing from the left.

With this constitution, total order relation setting means can uniquely set the order relation between the blocks $b_i$ and $b_j$ in the sequences P and M by using the binary relations $p_{ord}(b_i, b_j)$ and $m_{ord}(b_i, b_j)$. Therefore, various configuration constraints including the separation constraint, horizontal collinear constraint, vertical collinear constraint, horizontal symmetrical constraint, and vertical symmetrical constraint can be reflected to the sequence-pair.

With the ninth constitution of the sequence-pair creating apparatus according to the present invention, in any one of the first to eighth constitutions, the sequence-pair creating apparatus further comprises:

overlap removing means that creates the information of block placement and information of size without an overlap of the blocks, upon overlapping the blocks in the block set B stored in the block placement storing means, by reducing the width or height of one or both of the two overlapped blocks, wherein the total order relation setting means sets a total order relation of the blocks at the sequences P and M in accordance with the information of block placement and information of size without the overlap of blocks created by the overlap removing means so as to satisfy the binary relation set by the binary relation setting means.

With this constitution, when the initially given block placement has the overlap between the blocks, the packing means removes the overlap. Further, the total order relation setting means creates the sequence-pair by using the block placement without the overlap. As a consequence, it is possible to prevent the situation that the order relation between the blocks cannot be set due to the overlap of the blocks.

With the tenth constitution of the sequence-pair creating apparatus according to the present invention, in the first constitution, the binary relation setting means sets a left-and-right relation serving as the binary relation for the horizontal direction and an above-and-below relation serving as the binary relation for the vertical direction from one of all block pairs of the blocks in the block set B, which is extracted from the block placement information and information of size or to which the configuration constraint between the blocks designated by the external input is imposed, on the basis of the configuration constraint, and further sets a left-and-right relation and an above-and-below relation which are transitively determined from the set left-and-right relation and above-and-below relation, the total order relation setting means comprises:

temporary binary relation setting means that sets a temporary binary relation serving as a temporary left-and-right relation or above-and-below relation of a block pair ($b_k$, $b_l$) ($b_k$, $b_l \in B$) other than one of all the block pairs of the blocks in the block set B, which is related by the left-and-right relation or above-and-below relation (hereinafter, "fundamental binary relation") set by the binary relation setting means;

initial layout area size calculating means that calculates a width W and a height H of a layout area of an initial block placement (hereinafter, referred to as an "initial block placement");

constraint graph creating means that creates a horizontal constraint graph and a vertical constraint graph on the basis of the fundamental binary relation and the temporary binary relation;

compaction executing means that executes upper-right-compaction or upper-left-compaction on the basis of both the horizontal constraint graph and vertical constraint graph created by the constraint graph creating means after the creation thereof and further executes lower-left-compaction or lower-right-compaction on the basis of both the horizontal constraint graph and vertical constraint graph;

current layout area size calculating means that calculates a width W' and a height H' of a layout area of a minimum block placement (hereinafter, referred to as "current block placement") obtained as results of the compaction executed by the compaction executing means;

convergence determining means that determines whether or not the width W' of the layout area is not more than the width W of the layout area of the initial block placement and whether or not the height H' of the layout area is not more than the height H of the layout area of the initial block placement;

temporary binary relation changing means that changes one or a plurality of temporary binary relations for the horizontal direction into a temporary binary relation for the vertical direction and further changes one or a plurality of the temporary binary relations for the vertical direction into the temporary binary relation for the horizontal direction when the convergence determining means does not determine that the width W' and height H' of the layout area are not more than the width W and height H of the layout area of the initial block placement; and total order relation calculating means that sets a series of ranks of all the blocks at the sequences P and M on the basis of the current block placement when the convergence determining means determines that the width W' and height H' of the layout area are not more than the width W and height H of the layout area of the initial block placement, and the constraint graph creating means creates again a horizontal constraint graph and a vertical constraint graph, when the temporary binary relation changing means changes the temporary binary relation, on the basis of the changed temporary binary relation and fundamental binary relation.

With this constitution, the binary relation setting means first extracts the configuration constraint between the blocks extracted from the information of block placement and information of size or externally-input as the left-and-right relation or above-and-below relation, and sets this relation as the fundamental binary relation. Further, the binary relation setting means transitively derives the left-and-right relation or above-and-below relation on the basis of the extracted left-and-right relation and above-and-below relation, and furthermore sets this relation as the fundamental binary relation. After setting the fundamental binary relations, the temporary binary relation setting means sets the temporary binary relation to the block-pair to which the fundamental binary relation is not set yet. In addition, the constraint graph creating means creates the horizontal constraint graph and vertical constraint graph on the basis of the fundamental binary relation and temporary binary relation. In addition, the initial-layout-area size calculating means calculates the width W and the height H of an initial layout area as the layout area of the initial block placement. Herein, the "layout area" means an area surrounded by the minimal rectangle boundary for surrounding the block placement.

Subsequently, the total order relation setting means iteratively executes the following layout area reducing processing:

(1) First, the compaction executing means executes the upper-right-compaction (or upper-left-compaction) on the basis of the horizontal constraint graph and vertical constraint graph. Further, the compaction executing means executes the lower-left-compaction (or lower-right-compaction) on the basis of the horizontal constraint graph and vertical constraint graph;

(2) Subsequently, the current-layout-area size calculating means calculates the width W' and height H' of the layout area, as the current-layout area, of the block placement Π obtained by the compactions. Herein, the block placement Π may be the block placement obtained by the upper-right-compaction (or upper-left-compaction) or the block placement obtained by the lower-left-compaction (or lower-right-compaction);

(3) The convergence determining means determines whether or not the width W' of the layout area is not more than the width W of the layout area of the initial block placement and whether or not the height H' of the layout area is not more than the height H of the layout area of the initial block placement. If determining W'≦W and H'≦H, the total order relation calculating means sets a series of ranks in the sequences P and M in all the blocks on the basis of the current block placement, and ends the layout area reducing processing; and (4) If determining W'>W or H'>H, the temporary binary relation changing means changes one a plurality of the temporary binary relations for the horizontal direction to the temporary binary relation for the vertical direction. Further, the temporary binary relation changing means changes one or a plurality of temporary binary relations for the vertical direction to the temporary binary relation for the horizontal direction.

As a consequence, it is possible to determine a series of ranks in the sequences P and M from the block placement that satisfies the configuration constraint and is obtained from the block placement having the compressed layout area and to create the best sequence-pair (P, M).

Herein, the "fundamental binary relation" means the left-and-right relation and above-and-below relation of the block-pairs imposed by the configuration constraint between the blocks extracted from the information of block placement and information of size or designated by an external input, which are set on the basis of the configuration constraint, and the left-and-right relation and above-and-below relation which are transitively determined from the set left-and-right relation and above-and-below relation. The "temporary binary relation" means the binary relation temporarily-set to the block-pair to which the fundamental binary relation is not set yet.

The "horizontal constraint graph" means a digraph $G_H=(V, E_H, \Omega_H)$ that is defined by equation (7). Further, the "vertical constraint graph" means a digraph $G_V=(V, E_V, \Omega_V)$ defined by equation (8).

The "compaction" means compression of the area of a frame surrounding the block placement with optimization of the block placement. The "upper-right-compaction", "upper-left-compaction", "lower-left-compaction", and "lower-right-compaction" is compaction to the upper-right corner, upper-left corner, lower-left corner, and lower-right corner, respectively.

The upper-right-compaction from the horizontal constraint graph and the vertical constraint graph is performed, with respect to the block $b_i$ (∈B), by the following operations that (a) the x coordinate of the right side of the block $b_i$ is set as a weight of a maximal length path from the source s to the vertex i of the block $b_i$ in the horizontal constraint graph, and (b) the y coordinate of the top side of the block $b_i$ is set as a weight of a maximal length path from the vertex i to the sink t of the block $b_i$ in the vertical constraint graph, thereby determining the positional coordinates of the block $b_i$ (refer to FIGS. 25A and 25B)

Herein, the "maximal length path" means a path having the maximal sum of weights of the vertexes (excluding the initial vertex and the terminal vertex) in the halfway of the path from the initial vertex to the terminal vertex. Further, the "weight of the path" means the sum of weights of vertexes (excluding the initial vertex and the terminal vertex) in the halfway of the path. Therefore, e.g., the maximal length path from the source s to the vertex i means the maximal length path when the source s is the initial vertex and the vertex i is the terminal vertex.

Similarly, the lower-left-compaction is performed from the horizontal constraint graph and the vertical constraint graph, with respect to the block $b_i$ (∈B), by the following operations that (a') the x coordinate of the left side of the block $b_i$ is set as a weight of the maximal length path from the vertex i to the sink t of the block $b_i$ in the horizontal constraint graph, and (b') the y coordinate of the bottom side of the block $b_i$ is set as a weight of the maximal length path from the source s to the vertex i of the block $b_i$ in the vertical constraint graph, thereby determining the positional coordinates of the block $b_i$.

The same operations are performed in the case of the upper-left-compaction and the lower-right-compaction.

A method for setting a series of ranks in the sequences P and M in all blocks by the total order relation calculating means can use, e.g., the method with the positive locus and the negative locus as described above in [1] of "BACKGROUND OF THE INVENTION" (refer to [Ref. 3]).

With the eleventh constitution of the sequence-pair creating apparatus according to the present invention, in the tenth constitution, the total order relation setting means comprises:

movement slack calculating means that calculates the difference $|x_t(b_i)-x_b(b_i)|$ (hereinafter, referred to as a "horizontal movement slack") between distances $x_t(b_i)$ and $x_b(b_i)$ of movement of the blocks $b_i$ ($b_i$∈B) as results of the compaction executed by the compaction executing means and the difference $|y_t(b_i)-y_b(b_i)|$ (hereinafter, referred to as a "vertical movement slack") between distances $y_t(b_i)$ and $y_b(b_i)$ of movement thereof, and the temporary binary relation changing means changes, when the convergence determining means does not determine that an area of the layout area is minimum, the temporary binary relation having the minimum sum of the horizontal movement slacks of both the blocks from among the temporary binary relations for the horizontal direction into the temporary binary relation for the vertical direction and further changes the temporary binary relation having the minimum sum of the vertical movement slacks of both the blocks from among the temporary binary relations for the vertical direction into the temporary binary relation for the horizontal direction.

With this constitution, the total order relation setting means iteratively executes the following layout area reducing processing:

(1) First, the compaction executing means executes the upper-right-compaction (or upper-left-compaction) on the basis of the horizontal constraint graph and vertical constraint graph. Further, the compaction executing means executes the lower-left-compaction (or lower-right-compaction) on the basis of the horizontal constraint graph and vertical constraint graph;

(2) Subsequently, the displacement slack calculating means calculates a movement distance $x_t(b_i)$ of the block $b_i$ (i=1, 2, ..., N) in the horizontal direction and a movement distance $y_t(b_i)$ of the block $b_i$ (i=1, 2, ..., N) in the vertical direction as a result of the upper-right-compaction (or upper-left-compaction). Further, the movement slack calculating means calculates a movement distance $x_b(b_i)$ of the block $b_i$ (i=1, 2, ..., N) in the horizontal direction and a movement distance $y_b(b_i)$ of the block $b_i$ (i=1, 2, ..., N) in the vertical direction as a result of the lower-left-compaction (or lower-right-compaction). Furthermore, the movement slack calculating means calculates the horizontal movement slack $|x_t(b_i)-x_b(b_i)|$ and the vertical movement slack $|y_t(b_i)-y_b(b_i)|$;

(3) Subsequently, the layout area size calculating means calculates the width W' and height H' of the layout area in the block placement Π obtained as a result of the compactions;

(4) The slack determining means determines whether or not the width W' of the layout area is not more than the width W of the layout area in the initial block placement and whether or not the height H' of the layout area is not more than the height H of the layout area in the initial block placement. If determining W'≦W and H'≦H, the total order relation calculating means sets a series of ranks in the sequences P and M in all blocks on the basis of the block placement having the minimal area of the layout area, and ends the layout area reducing processing; and (5) If determining W'>W or H'>H, the temporary binary relation changing means changes the temporary binary relation having the minimal sum of the horizontal movement slacks of both the blocks from among the temporary binary relations for the horizontal direction into the temporary binary relation for vertical direction. Further, the temporary binary relation changing means changes the temporary binary relation having the minimal sum of the vertical movement slacks of both the blocks from among the temporary binary relations for the vertical direction into the temporary binary relation for horizontal direction.

As a consequence, it is possible to determine a series of ranks in the sequences P and M from the block placement that satisfies the configuration constraint and has the compressed area of the layout area and to create the best sequence-pair (P, M). Further, the temporary binary relation of the block-pair having the minimal sums of the horizontal movement slack and the vertical movement slack is changed, thereby increasing the convergence velocity and reducing the calculating time.

Herein, the "horizontal movement slack" means the sum $\Sigma_i |x_t(b_i)-x_b(b_i)|$ of the differences between the movement distance $x_t(b_i)$ of the block $b_i$ ($b_i \in B$) in the horizontal direction as a result of the upper-right-compaction (or upper-left-compaction) and the movement distance $x_b(b_i)$ of the block $b_i$ ($b_i \in B$) in the horizontal direction as a result of the lower-left-compaction (or lower-right-compaction). The "vertical movement slack" means the sum $\Sigma_i |x_t(b_i)-x_b(b_i)|$ of the differences between the movement distance $y_t(b_i)$ in the vertical direction as a result of the upper-right-compaction (or upper-left-compaction) and the movement distance $y_b(b_i)$ of the block $b_i$ ($b_i \in B$) in the vertical direction as a result of the lower-left-compaction (or lower-right-compaction).

With the twelfth constitution of the sequence-pair creating apparatus according to the present invention, in the tenth constitution, the total order relation setting means comprises:

overlap length calculating means that calculates an overlap length $d_x(b_i, b_j)$ for the horizontal direction and an overlap length $d_y(b_i, b_j)$ for the vertical direction for a block pair $(b_i, b_j)$ ($b_i, b_j \in B$) having overlapped blocks from among all the block pairs in a set B×B of the block pairs, and the temporary binary relation setting means comprises:

temporary left-and-right relation setting means that sets the temporary binary relation for the horizontal direction between the block $b_k$ and the block $b_l$ in accordance with the left-and-right relation between horizontal positional coordinates $x(b_k)$ and $x(b_l)$ of the blocks $b_k$ and $b_l$ for the block pair with an overlap in the vertical direction and without an overlap in the horizontal direction of the block pairs $(b_k, b_l)$ to which the fundamental binary relation is not set;

temporary above-and-below relation setting means that sets the temporary binary relation for the vertical direction between the block $b_k$ and the block $b_l$ in accordance with an above-and-below relation between vertical positional coordinates $y(b_k)$ and $y(b_l)$ of the blocks $b_k$ and $b_l$ for the block pair with the overlap in the horizontal direction and without the overlap in the vertical direction of the block pairs $(b_k, b_l)$ to which the fundamental binary relation is not set;

temporary binary relation transition setting means that sets a temporary binary relation transitively determined from the temporary binary relations set by the temporary left-and-right relation setting means and the temporary above-and-below relation setting means and the fundamental binary relations; and temporary binary relation complementing means that sets, with respect to the block pair $(b_i, b_j)$ to which neither the fundamental binary relation nor the temporary binary relation is set, the temporary binary relation for the horizontal direction between the block $b_i$ and the block $b_j$ in accordance with the left-and-right relation between the horizontal positional coordinates $x(b_i)$ and $x(b_j)$ of the blocks $b_i$ and $b_j$ when the overlap length $d_x(b_i, b_j)$ for the vertical direction is shorter than the overlap length $d_y(b_i, b_j)$ for the vertical direction and, in the case except for the time, further sets the temporary binary relation for the vertical direction between the block $b_i$ and the block $b_j$ in accordance with an above-and-below relation between the vertical positional coordinates $y(b_i)$ and $y(b_j)$ of the blocks $b_i$ and $b_j$.

With this constitution, it is possible to set a proper temporary binary relation between the block-pairs to which the configuration constraint based on the block placement is not set yet without any contradictions on the basis of the information of size and information of block placement.

Herein, the "overlap length in the horizontal direction" means the minimal movement distance when two blocks include the overlap therebetween and then one block is moved in the horizontal direction (to the right or left) until the one block is overlapped to the other block. Further, the "overlap length in the vertical direction" means the minimal movement distance when two blocks include the overlap therebetween and then one block is moved in the vertical direction (above or below) until the one block is overlapped to the other block.

A first constitution of a sequence-pair creating method according to the present invention for, on the basis of information of size serving as information of a weight $w(b_i)$ and a height $h(b_i)$ of a block $b_i$ ($b_i \in B$) in a set B of N ($\geq 2$) rectangle blocks ("block set") having a shape, and information of block placement having positional coordinates ($x(b_i)$, $y(b_i)$) of the block $b_i$ ($b_i \in B$) upon configuring all blocks in the block set B on a chip, creating a sequence-pair (P, M), serving as a pair of a sequence P of the N blocks $b_i$ ($b_i \in B$) and a sequence M of the N blocks $b_i$ ($b_i \in B$) different from the sequence P, for uniquely specifying a positional relation between the blocks in the case of configuring all the blocks in the block set B on the chip without an overlap of the blocks, comprises:

a binary relation setting step of setting, in accordance with the information of block placement and information of size, a binary relation serving as an order relation that indicates a relative configuration between the blocks of a block pair ($b_i$, $b_j$) of two blocks $b_i$ and $b_j$ ($\in B$) and that is derived from a configuration constraint between the blocks extracted from the information of block placement and information of size or designated by an external input; and a total order relation setting step of setting a series of ranks of the sequences P and M for all the blocks on the basis of the information of block placement and information of size so as to satisfy all binary relations set by the binary relation setting step.

With the second constitution of the sequence-pair creating method according to the present invention, in the first constitution, the binary relation setting step comprises an separation constraint extracting step of, by referring to positional coordinates ($x(b_i)$, $y(b_i)$) and ($x(b_j)$, $y(b_j)$), widths $w(b_i)$ and $w(b_j)$, and heights $h(b_i)$ and $h(b_j)$ of the two blocks $b_i$ and $b_j$ ($\in B$) in the block set B, setting the binary relation between the block $b_i$ and block $b_j$ in accordance with a left-and-right relation of the positional coordinates of the block $b_i$ and $b_j$ when the y coordinates of sides in the vertical direction (y direction) do not have a clearance with a predetermined width not less than 0 and those in the horizontal direction (x direction) of the block $b_i$ and block $b_j$ have a clearance with a predetermined width not less than 0, and further setting the binary relation between the block $b_i$ and block $b_j$ in accordance with an above-and-below relation between the positional coordinates of the blocks $b_i$ and $b_j$ when the x coordinates of sides in the x direction of the block $b_i$ and block $b_j$ do not have a clearance with a predetermined width not less than 0 and those in the y direction of the block $b_i$ and block $b_j$ have a clearance with a predetermined width not less than 0.

With the third constitution of the sequence-pair creating method according to the present invention, in the first constitution, the binary relation setting step comprises:

a vertical collinear constraint extracting step of setting the binary relation between the two blocks $b_i$ and $b_j$ in a partial set $B_k$ ($\subseteq B$) of the block set B in accordance with an above-and-below relation between the positional coordinates of the block $b_i$ ($\in B_k$) upon imposing a configuration constraint ("vertical collinear constraint") for aligning a left side or right side or representative points of the block $b_i$ ($\in B_k$) on a vertical line to the blocks in the partial set $B_k$.

With the fourth constitution of the sequence-pair creating method according to the present invention, in the first constitution, the binary relation setting step comprises:

a horizontal collinear constraint extracting step of setting the binary relation between two blocks $b_i$ and $b_j$ in a partial set $B_k$ of the block set B in accordance with a left-and-right relation between positional coordinates the block $b_i$ ($\in B_k$) in the partial set $B_k$ when imposing a configuration constraint ("horizontal collinear constraint") for aligning top sides or bottom sides or representative points of the blocks in the partial set $B_k$ on a horizontal line to the blocks in the partial set $B_k$.

With the fifth constitution of the sequence-pair creating method according to the present invention, in the first constitution, the binary relation setting step comprises:

a horizontal symmetrical constraint extracting step of setting the binary relation in accordance with a left-and-right relation of the positional coordinates of both blocks $b_i$ and $b_k$ of three blocks $b_i$, $b_j$, and $b_k$ in the block set B upon configuration constraint ("horizontal symmetrical constraint") for configuring the block $b_i$ and block $b_k$ at positions symmetrical to the block $b_j$ in the horizontal direction.

With the sixth constitution of the sequence-pair creating method according to the present invention, in the first constitution, the binary relation setting step comprises:

a vertical symmetrical constraint extracting step of setting the binary relation in accordance with an above-and-below relation of the positional coordinates of both blocks $b_i$ and $b_k$ of three blocks $b_i$, $b_j$, and $b_k$ in the block set B when a configuration constraint ("vertical symmetrical constraint") for configuring the block $b_i$ and block $b_k$ at positions symmetrical to the block $b_j$ in the vertical direction.

With the seventh constitution of the sequence-pair creating method according to the present invention, in any one of the first to sixth constitutions, the binary relation setting step comprises:

a binary relation transition setting step of transitively setting the binary relation between blocks $b_i$ and $b_k$ of three blocks $b_i$, $b_j$, and $b_k$ in the block set B from the binary relation between the blocks $b_i$ and $b_j$ and the binary relation between the blocks $b_j$ and $b_k$ when the binary relation between the blocks $b_i$ and $b_j$ and the binary relation between the blocks $b_j$ and $b_k$ are set and the binary relation between the blocks $b_i$ and $b_k$ is not set.

With the eighth constitution of the sequence-pair creating method according to the present invention, in any one of the first to seventh constitutions, the binary relation setting step sets, with respect to two blocks $b_i$ and $b_j$ in the block set B, a binary relation between the sequences P and M to $p_{ord}(b_i, b_j)=1$ and $m_{ord}(b_i, b_j)=1$ when the block $b_i$ is on the left of the block $b_j$ and further sets a binary relation between the sequences P and M to $p_{ord}(b_i, b_j)=0$ and $m_{ord}(b_i, b_j)=1$ when the block $b_i$ is below the block $b_j$, and the total order relation setting step comprises:

a P-order setting step of sequentially setting ranks of the blocks at the sequence P from the left by repeating operation for extracting a block $b_i$ ($\in B_n$) in a set $B_n$ ($\subseteq B$) of blocks to which the rank is not set at the sequence P, having a binary order relation $p_{ord}(b_i, b_j)$ between the block $b_i$ ($\in B_n$) and all blocks $b_j$ ($\in B_n$) other than the block $b_i$ in the set $B_n$, which is not 1, and for setting the set of the extracted blocks as a set $B_s$ ($\subseteq B_n$) and operation for selecting the block $b_i$ in the set $B_s$ having the right side thereof that is on the left or at the collinear position of the left side of all blocks $b_j$ ($\in B_s$) other than the block $b_i$ in the set $B_s$ or having the bottom side thereof that is upper than the top side of the block $b_j$, and for aligning the selected block $b_i$ at the sequence P packing from the left; and an M-order setting step of sequentially setting ranks of the blocks at the sequence M from the left by repeating operation for extracting a block $b_i$ ($\in B_m$) in a set $B_m$ ($\subseteq B$) of blocks to which the rank is not set at the sequence M, having a binary order relation $m_{ord}(b_i, b_j)$ between the block $b_i$ ($\in B_m$) and all blocks $b_j$ ($\in B_m$) other than the block $b_i$ in the set $B_m$, which is not 1, and for setting the set of the extracted blocks as a set $B_t$ ($\subseteq B_m$) and operation for selecting the block $b_i$ in the set $B_t$ having the right side of the block $b_i$ is on the left or at the collinear position of the left side of all the blocks $b_j$ ($\in B_t$) in the set $B_t$ other than the block $b_i$ or the bottom side of the block $b_i$ is upper than the top side of the block $b_j$, and for aligning the selected block $b_i$ at the sequence M packing from the left.

With the ninth constitution of the sequence-pair creating method according to the present invention, in any one of the first to eighth constitutions, the sequence-pair creating method further comprises:

an overlap removing step of creating the information of block placement and information of size without the overlap of the blocks, upon overlapping the blocks in the block set B, by reducing the width or height of one or both of the two overlapped blocks, wherein the total order relation setting step sets a total order relation of the blocks at the sequences P and M in accordance with the information of block placement and information of size without the overlap of the blocks created by the overlap removing step so as to satisfy the binary relation set by the binary relation setting step.

With the tenth constitution of the sequence-pair creating method according to the present invention, in the first constitution, the binary relation setting step sets a left-and-right relation serving as the binary relation for the horizontal direction and an above-and-below relation serving as the binary relation for the vertical direction from one of all block pairs of the blocks in the block set B, which is extracted from the block placement information and information of size or to which the configuration constraint between the blocks designated by the external input is imposed, on the basis of the configuration constraint, and further sets a left-and-right relation and an above-and-below relation which are transitively determined from the set left-and-right relation and above-and-below relation, the total order relation setting step comprises:

a temporary binary relation setting step of setting a temporary binary relation serving as a temporary left-and-right relation or above-and-below relation of a block pair ($b_k$, $b_l$) ($b_k$, $b_l \in B$) other than one of all the block pairs of the blocks in the block set B, which is related by the left-and-right relation or above-and-below relation ("fundamental binary relation") set by the binary relation setting step;

an initial layout area size calculating step of calculating a width W and a height H of a layout area of an initial block placement ("initial block placement");

a constraint graph creating step of creating a horizontal constraint graph and a vertical constraint graph on the basis of the fundamental binary relation and the temporary binary relation;

a compaction executing step of executing upper-right-compaction or upper-left-compaction on the basis of both the horizontal constraint graph and vertical constraint graph created by the constraint graph creating step after the creation thereof and further executing lower-left-compaction or lower-right-compaction on the basis of both the horizontal constraint graph and vertical constraint graph;

a current layout area size calculating step of calculating a width W' and a height H' of a layout area of a minimum block placement ("current block placement") obtained as results of the compaction executed by the compaction executing step;

a convergence determining step of determining whether or not the width W' of the layout area is not more than the width W of the layout area of the initial block placement and whether or not the height H' of the layout area is not more than the height H of the layout area of the initial block placement;

a temporary binary relation changing step of changing one or a plurality of temporary binary relations for the horizontal direction into a temporary binary relation for the vertical direction and further changing one or a plurality of the temporary binary relations for the vertical direction into the temporary binary relation for the horizontal direction when the convergence determining step does not determine that the width W' and height H' of the layout area are not more than the width W and height H of the layout area of the initial block placement; and a total order relation calculating step of setting a series of ranks of all the blocks at the sequences P and M on the basis of the current block placement when the convergence determining step determines that the width W' and height H' of the layout area are not more than the width W and height H of the layout area of the initial block placement, and the constraint graph creating step creates again a horizontal constraint graph and a vertical constraint graph, when the temporary binary relation changing step changes the temporary binary relation, on the basis of the changed temporary binary relation and fundamental binary relation.

With the eleventh constitution of the sequence-pair creating method according to the present invention, in the tenth constitution, the total order relation setting step comprises:

a movement slack calculating step of calculating the difference $|x_t(b_i)-x_b(b_i)|$ ("horizontal movement slack") between distances $x_t(b_i)$ and $x_b(b_i)$ of movement of the blocks $b_i$ ($b_i \in B$) as results of the compaction executed by the compaction executing step and the difference $|y_t(b_i)-y_b(b_i)|$ ("vertical movement slack") between distances $y_t(b_i)$ and $y_b(b_i)$ of movement thereof, and the temporary binary relation changing step changes, when the convergence determining step does not determine that an area of the layout area is minimum, the temporary binary relation having the minimum sum of the horizontal movement slacks of both the blocks from among the temporary binary relations for the horizontal direction into the temporary binary relation for the vertical direction and further changes the temporary binary relation having the minimum sum of the vertical movement slacks of both the blocks from among the temporary binary relations for the vertical direction into the temporary binary relation for the horizontal direction.

With the twelfth constitution of the sequence-pair creating method according to the present invention, in the tenth constitution, the total order relation setting step comprises:

an overlap length calculating step of calculating an overlap length $d_x(b_i, b_j)$ for the horizontal direction and an overlap length $d_y(b_i, b_j)$ for the vertical direction for a block pair ($b_i$, $b_j$) ($b_i$, $b_j \in B$) having overlapped blocks from among all the block pairs in a set B×B of the block pairs, and the temporary binary relation setting step comprises:

a temporary left-and-right relation setting step of setting the temporary binary relation for the horizontal direction between the block $b_k$ and the block $b_l$ in accordance with the left-and-right relation between horizontal positional coordinates $x(b_k)$ and $x(b_l)$ of the blocks $b_k$ and $b_l$ for the block pair with an overlap in the vertical direction and without an overlap in the horizontal direction of the block pairs $(b_k, b_l)$ to which the fundamental binary relation is not set;

a temporary above-and-below relation setting step of setting the temporary binary relation for the vertical direction between the block $b_k$ and the block $b_l$ in accordance with an above-and-below relation between vertical positional coordinates $y(b_k)$ and $y(b_l)$ of the blocks $b_k$ and $b_l$ for the block pair with the overlap in the horizontal direction and without the overlap in the vertical direction of the block pairs $(b_k, b_l)$ to which the fundamental binary relation is not set;

a temporary binary relation transition setting step of setting a temporary binary relation transitively determined from the temporary binary relations set by the temporary left-and-right relation setting step and the temporary above-and-below relation setting step and the fundamental binary relations; and a temporary binary relation complementing step of setting, with respect to the block pair $(b_i, b_j)$ to which neither the fundamental binary relation nor the temporary binary relation is set, the temporary binary relation for the horizontal direction between the block $b_i$ and the block $b_j$ in accordance with the left-and-right relation between the horizontal positional coordinates $x(b_i)$ and $x(b_j)$ of the blocks $b_i$ and $b_j$ when the overlap length $d_x(b_i, b_j)$ for the vertical direction is shorter than the overlap length $d_y(b_i, b_j)$ for the vertical direction and, in the case except for the time, further setting the temporary binary relation for the vertical direction between the block $b_i$ and the block $b_j$ in accordance with an above-and-below relation between the vertical positional coordinates $y(b_i)$ and $y(b_j)$ of the blocks $b_i$ and $b_j$.

A program according to the present invention enables a computer to execute the sequence-pair creating method with the first constitution.

As mentioned above, according to the present invention, the binary relation setting means extracts the configuration constraint between the blocks as binary relations $(p_{ord}(b_i, b_j)$ and $m_{ord}(b_i, b_j)$ or $h_{ord}(b_i, b_j)$ and $v_{ord}(b_i, b_j)$, etc.) between two blocks. The total order relation setting means sets the total orders of the sequences P and M to satisfy all the binary relations. As a consequence, it is possible to create the sequences P and M capturing the configuration constraint between the blocks with a small amount of calculation.

BRIEF DESCRIPTION OF THE DRAWINGS

FIGS. 4A and 4B are diagrams showing examples of a collinear constraint;

FIGS. 5A and 5B are diagrams showing examples of a symmetrical constraint;

FIGS. 9A and 9B are diagrams showing examples of overlap removing processing when corners of the blocks are overlapped;

FIGS. 10A to 10D are diagrams showing examples of the overlap removing processing when the blocks have an inclusion relation;

FIGS. 15A and 15B are diagrams for illustrating block placement states;

DESCRIPTION OF THE PREFERRED EMBODIMENTS

Hereinbelow, a description will be given of embodiments of the present invention with reference to the drawings.

First Embodiment

Figure 1:
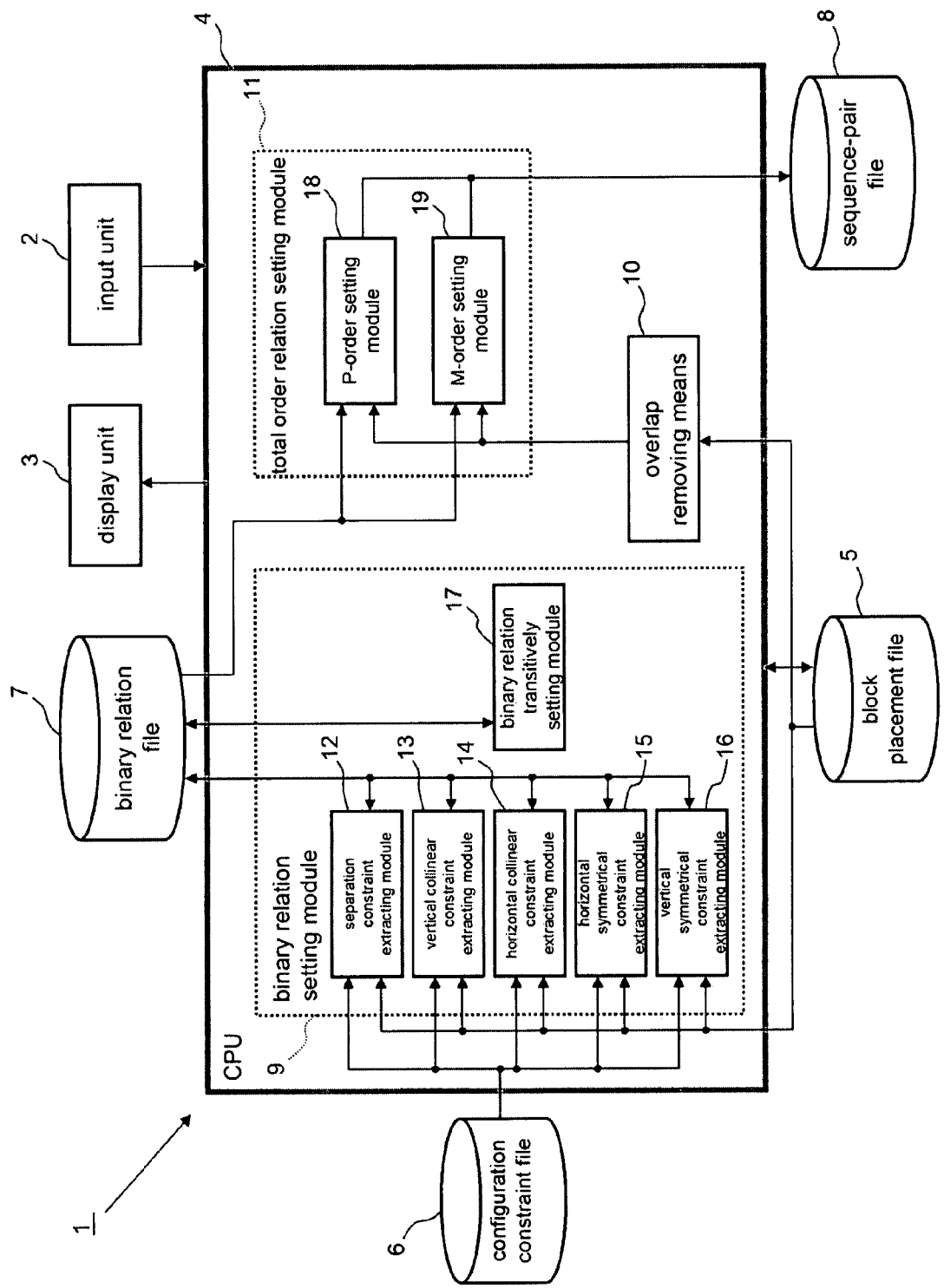
FIG. 1 is a diagram showing the constitution of a sequence-pair creating apparatus according to the first embodiment of the present invention.

FIG. 1 is a diagram showing the constitution of a sequence-pair creating apparatus according to the first embodiment of the present invention. A sequence-pair creating apparatus 1 comprises an input unit 2, a display unit 3, a central processing unit (CPU) 4, block placement file 5, configuration constraint file 6, binary relation file 7, and sequence-pair file 8.

A designer inputs initial information of block placement and information of size and information on various configuration constraints to the input unit 2. As the input unit 2, an input unit of a usual computer, e.g., a keyboard, a mouse, a CD drive, a DVD drive, or a flexible disk block drive is used. The display unit 3 outputs information of block placement and information of a sequence-pair. As the display unit 3, an output unit of a computer, e.g., a display or a printer is used. The CPU 4 performs calculating processing for creating the sequence-pair from the information of block placement and information of size and the information on various configuration constraints.

The block placement file 5 temporarily stores the information of block placement and information of size input from the input unit 2. Hereinbelow, reference character B denotes a set of blocks included in the information of block placement stored in the block placement file 5. The configuration constraint file 6 stores, upon inputting the information of various configuration constraints from the input unit 2, the input information. The binary relation file 7 stores information on a binary relation between the blocks set on the basis of various configuration constraints from the information of block placement and information of size with the CPU 4. The sequence-pair file 8 stores the sequence-pair extracted from the information of block placement and information of size with the CPU 4.

The CPU 4 comprises binary relation setting module 9, overlap removing module 10, and total order relation setting module 11. The module 9 to 11 are realized as functional modules by loading a program from the input unit 2 and executing the program.

The binary relation setting module 9 sets binary relations $p_{ord}(b_i, b_j)$ and $m_{ord}(b_i, b_j)$ of the blocks on the basis of the information of block placement and information of size stored in the block,placement file 5. Herein, the binary relations $p_{ord}(b_i, b_j)$ and $m_{ord}(b_i, b_j)$ are order relations between two blocks $b_i$ and $b_j$ ($\in$B) at sequences P and M of a sequence-pair (P, M) to be created. The binary relations $p_{ord}(b_i, b_j)$ and $m_{ord}(b_i, b_j)$ are derived from the configuration constraint between the blocks, extracted from the information of block placement and information of size or designated by an external input.

The binary relation setting module 9 further comprises separation constraint extracting module 12, vertical collinear constraint extracting module 13, horizontal collinear constraint extracting module 14, horizontal symmetrical constraint extracting module 15, vertical symmetrical constraint extracting module 16, and binary relation transitively setting module 17.

The separation constraint extracting module 12 extracts a block-pair for satisfying an separation constraint from the information of block placement and information of size and sets the binary relation between the sequences P and M of the block-pair. Incidentally, the separation constraint will be described in detail later.

The vertical collinear constraint extracting module 13 and horizontal collinear constraint extracting module 14 sets the binary relation between the sequences P and M of the block as the constraint target in accordance with the vertical collinear constraint and horizontal collinear constraint extracted from the information of block placement and information of size or input from the input unit 2 by the designer. Incidentally, the vertical collinear constraint and horizontal collinear constraint will be described in detail later.

The horizontal symmetrical constraint extracting module 15 and vertical symmetrical constraint extracting module 16 sets the binary relation between the sequences P and M of the block as the constraint target in accordance with the vertical symmetrical constraint and horizontal symmetrical constraint, extracted from the information of block placement and information of size or input from the input unit 2 by the designer. Incidentally, the vertical symmetrical constraint and horizontal symmetrical constraint will be described in detail later.

The binary relation between the blocks in the sequences P and M extracted by the constraint extracting means is stored to the binary relation file 7. The binary relation transitively setting module 17 sets the transitive binary relation of a block-pair to which the binary relation is not set yet, on the basis of the binary relation stored in the binary relation file 7.

When the blocks in the block set B are overlapped in a block placement $\Phi$ stored in the block placement file 5, the overlap removing module 10 reduces a width or height of one or both of the two overlapped blocks, thereby the information of block placement and information of size (packing $\Pi$) without the overlap between the blocks.

The total order relation setting module 11 sets a total order relation between the blocks in the sequences P and M on the basis of the information of block placement and information of size (packing $\Pi$) from which the overlap of the blocks is removed by the overlap removing module 10 so as to satisfy all binary relations $p_{ord}(b_i, b_j)$ and $m_{ord}(b_i, b_j)$ ($b_i, b_j \in$B) set by the binary relation setting module 9.

The total order relation setting module 11 further comprises P-order setting module 18 and M-order setting module 19. The P-order setting module 18 and M-order setting module 19 performs the totally order setting processing of the blocks in the sequence P and sequence M of the sequence-pair.

Hereinbelow, a description will be given of the operation of the sequence-pair creating apparatus 1 with the above-mentioned constitution.

Figure 2:
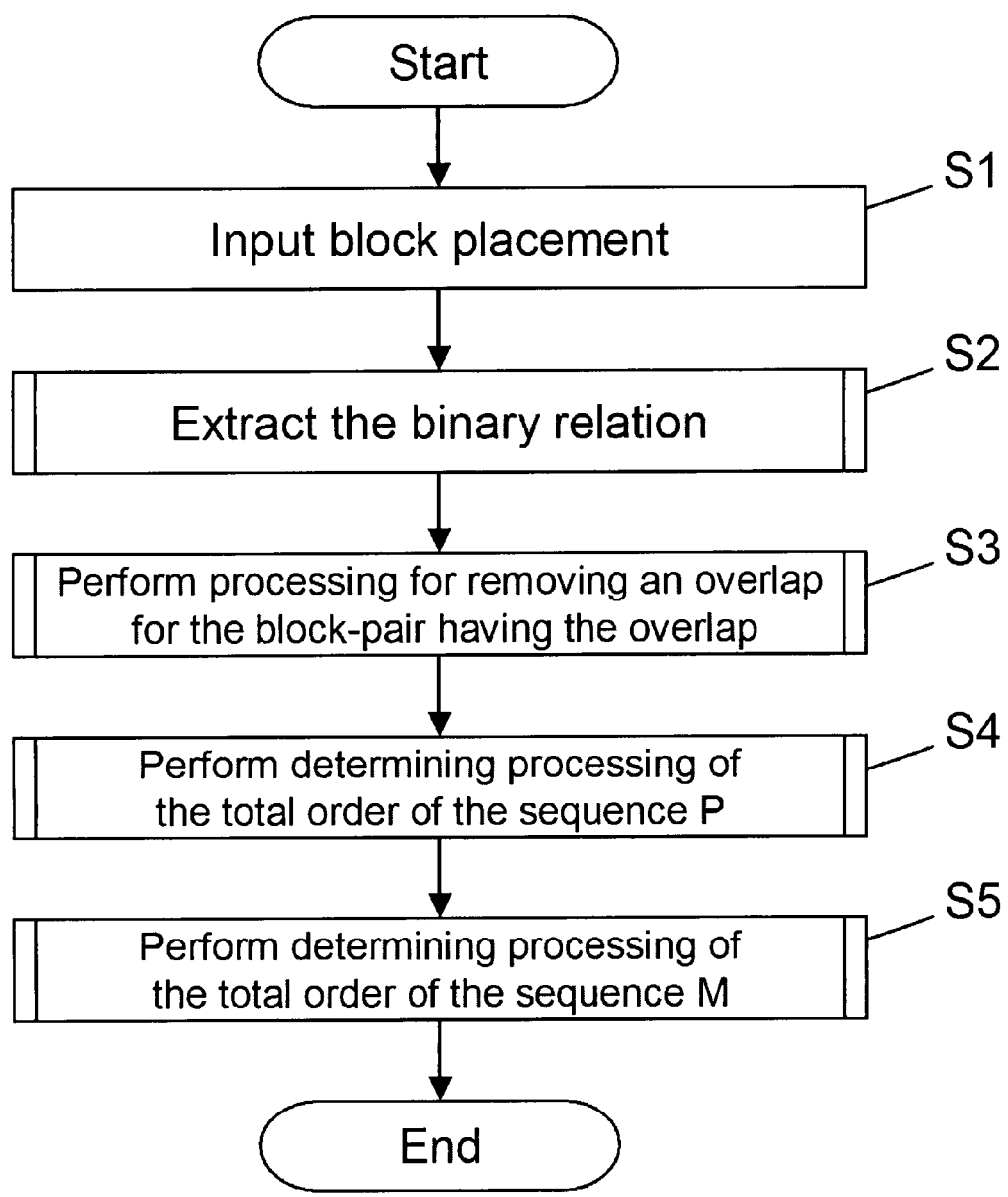
FIG. 2 is a flowchart showing the entire flow of a sequence-pair creating method with the sequence-pair creating apparatus according to the first embodiment of the present invention.

FIG. 2 shows the entire flow of a sequence-pair creating method with the sequence-pair creating apparatus according to the first embodiment of the present invention. First, the designer inputs initial information of block placement and information of size of the block to the block placement file 5 via the input unit 2 (S1). Further, in this case, the designer inputs, from the input unit 2, various configuration constraints (a clearance between specific blocks and a vertical collinear constraint, etc.) according to the necessity. The input various configuration constraints are stored in the configuration constraint file 6.

Subsequently, the binary relation setting module 9 extracts the binary relation of the block-pair in the sequences P and M of the sequence-pair (P, M) derived under the various configuration constraints from the information of block placement and information of size stored in the block placement file 5, and stores the extracted binary relation to the binary relation file 7 (S2).

Subsequently, the overlap removing module 10 searches for the block-pair having an overlap thereof from the information of block placement and information of size stored in the block placement file 5, and performs processing for removing the overlap. The information of block placement and information of size subjected to the overlap removing processing is output to the total order relation setting module 11 (S3).

Finally, in the total order relation setting module 11, the P-order setting module 18 performs determining processing of the total order of the sequence P (S4). Further, the M-order setting module 19 performs determining processing of the total order of the sequence M (S5). As a consequence, the sequence-pair (P, M) is determined. The determined sequence-pair (P, M) is output and stored to the sequence-pair file 8.

The foregoing is the entire processing flow of the sequence-pair creating method. Hereinbelow, a description will be given of calculating processing in main steps.

[1] Preparation

First, terms used in the following description will be mentioned. All block sets included in the initial block placement stored in the block placement file 5 are denoted by B={$b_1$, $b_2, \ldots, b_N$}. Reference character N denotes the total number of blocks in the block set B. The block is rectangle. Reference characters $(x(b_i), y(b_i))$ denote coordinates (positional coordinates) for specifying the position of a block $b_i (\in B)$. Herein, the positional coordinates of the block represent coordinates on the lower left of the block. The information of block placement is given by a set $\{(x(b_i), y(b_i))|\forall b_i \in B\}$ of the positional coordinates of the block. Reference character $w(b_i)$ denotes a width of the block $b_i (\in B)$ and reference character $h(b_i)$ denotes a height of the block $b_i (\in B)$. The information of size of the block is given by a set $\{(w(b_i), h(b_i))|\forall b_i \in B\}$ of a pair of the width and height of the block.

[1-1] Definition of Various Configuration Constraints (1) Separation Constraint

The separation constraint means that a minimal value (clearance) of the gap distance between two arbitrary blocks $b_i$ and $b_j$ in a block pair $(b_i, b_j)$ in the block set B should be not less than a predetermined value. If $x(b_i) < x(b_j)$, the separation constraint for the horizontal direction can be expressed as follows.

[Expression 5]

$$x(b_j) - \{x(b_i) + w(b_i)\} \geq D_h(b_i, b_j) \wedge D_h(b_i, b_j) \geq 0 \quad (9)$$

Similarly, if $y(b_i) < y(b_j)$, the separation constraint for the horizontal direction can be expressed as follows.

[Expression 6]

$$y(b_j) - \{y(b_i) + h(b_i)\} \geq D_v(b_i, b_j) \wedge D_v(b_i, b_j) \geq 0 \quad (10)$$

The separation constraint is imposed from the design specification. That is, on the chip, in order to ensure the separation property between device blocks, the ensuring of the clearance of a predetermined distance is required. The separation constraint is imposed to extract the block configured while ensuring the clearance at the initial configuration $\Phi$ of the block and to store the configuration relation using the clearance to the sequence-pair.

Figure 3:
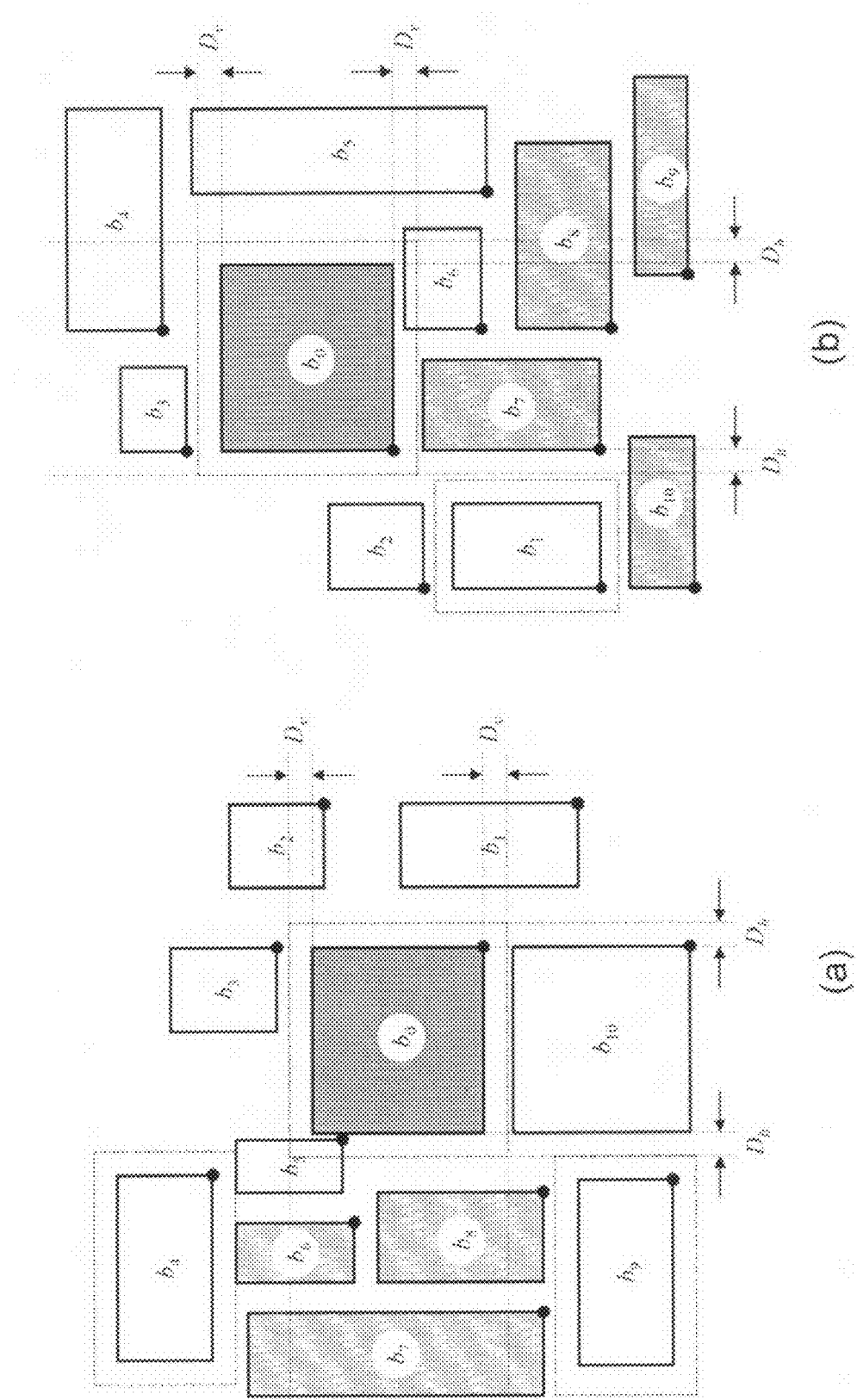
FIGS. 3A and 3B are diagrams showing examples of an separation constraint.

Specifically, the separation constraint will be described with examples shown in FIGS. 3A and 3B. Attention is paid to a block $b_0$. Referring to FIG. 3A, blocks $b_4, b_6, b_7, b_8$, and $b_9$ satisfy the separation constraint for the horizontal direction with respect to the block $b_0$ in equation (9). Further, referring to FIG. 3B, blocks $b_1, b_7, b_8, b_9$, and $b_{10}$ satisfy the separation constraint for the vertical direction with respect to the block $b_0$ in equation (10).

(2) Collinear Constraint

The collinear constraint means that, with respect to a partial set $B_k (\subseteq B)$ in the block set B, any of the top, bottom, left, and right sides or representative points of all blocks $b_i (\in B_k)$ in the partial set $B_k (\subseteq B)$ are aligned on one linear line. A horizontal collinear constraint means that the top side or bottom side or the representative points of all the blocks in the partial set $B_k (\subseteq B)$ are aligned on the horizontal linear line. A vertical collinear constraint means that the left side or right side or the representative points are aligned on the vertical linear line. Reference character $ALIGN_L(B_k)$ denotes a collinear constraint for constituting the blocks in the partial set $B_k (\subseteq B)$ to align the left sides thereof. Reference character $ALIGN_B(B_k)$ denotes a collinear constraint for constituting the blocks in the partial set $B_k (\subseteq B)$ to align the bottom sides thereof. Reference character $ALIGN_R(B_k)$ denotes a collinear constraint for constituting the blocks in the partial set $B_k (\subseteq B)$ to align the right sides thereof. Reference character $ALIGN_T(B_k)$ denotes a collinear constraint for constituting the blocks in the partial set $B_k (\subseteq B)$ to align the top sides thereof. Reference character $ALIGN_{CH}(B_k)$ denotes a collinear constraint for constituting the blocks in the partial set $B_k (\subseteq B)$ to align the representative points on the horizontal linear line. Reference character $ALIGN_{CV}(B_k)$ denotes collinear constraint for constituting the blocks in the partial set $B_k (\subseteq B)$ to align the representative points on the vertical linear line.

Upon arranging parts on the chip, the collinear constraints are imposed to arrange the parts so as to align circuit structures on a linear line when similar structures are iteratively arranged disposed.

Specifically speaking, the collinear constraints will be described with examples shown in FIGS. 4A and 4B. Referring to FIG. 4A, the left sides of four blocks $b_1, b_2, b_3$, and $b_4$ are aligned on one linear line. Therefore, the collinear constraint $ALIGN_L(B_k)$ is imposed to a set $B_k = \{b_1, b_2, b_3, b_4\}$ of the four blocks shown in FIG. 4A. Referring to FIG. 4B, the bottom sides of the four blocks $b_1, b_2, b_3$, and $b_4$ are aligned on one linear line. Therefore, the collinear constraint $ALIGN_B(B_k)$ is imposed to the set $B_k = \{b_1, b_2, b_3, b_4\}$ of the four blocks shown in FIG. 4B.

(3) Symmetrical Constraint

The symmetrical constraint means that, with respect to three blocks $b_i, b_j$, and $b_k (\in B)$ in the block set B, the blocks $b_i$ and $b_k$ are symmetrically constituted with the block $b_j$ as center in the horizontal direction or in the vertical direction. Reference character $SYMM_H(b_i, b_j, b_k)$ denotes a horizontal symmetrical constraint that means a symmetrical constraint for the horizontal direction. Reference character $SYMM_V(b_i, b_j, b_k)$ denotes a vertical symmetrical constraint that means a symmetrical constraint for the vertical direction. FIG. 5A shows an example of the horizontal symmetrical constraint $SYMM_H(b_i, b_j, b_k)$, and FIG. 5B shows an example of the vertical symmetrical constraint $SYMM_V(b_i, b_j, b_k)$ If $x(b_i) < x(b_j) < x(b_k)$, the horizontal symmetrical constraint can be expressed as follows.

[Expression 7]

$$\left(x(b_j) + \frac{1}{2}w(b_j)\right) - \left(x(b_i) + \frac{1}{2}w(b_i)\right) = \quad (11)$$
$$\left(x(b_k) + \frac{1}{2}w(b_k)\right) - \left(x(b_j) + \frac{1}{2}w(b_j)\right)$$

If $y(b_i) < y(b_j) < y(b_k)$, the vertical symmetrical constraint can be expressed as follows.

[Expression 8]

$$\left(y(b_j) + \frac{1}{2}h(b_j)\right) - \left(y(b_i) + \frac{1}{2}h(b_i)\right) = \quad (12)$$
$$\left(y(b_k) + \frac{1}{2}h(b_k)\right) - \left(y(b_j) + \frac{1}{2}h(b_j)\right)$$

The symmetrical constraints are imposed when parts need to be symmetrically arranged on the chip, as a differential amplifier circuit comprising an MOS transistor.

[1-2] Sequence-pair

Similarly to [Ref. 3], the left-and-right relation and above-and-below relation between the blocks in the block set B are defined as follows.

(1) Left-and-right Relation

With respect to a pair $(b_i, b_j)$ of two arbitrary blocks $b_i$ and $b_j$ in the block set B, if establishing a relation of $x(b_i) + w(b_i) \leq x(b_j)$, the block $b_i$ is left of the block $b_j$ (or, the block $b_j$ is right of the block $b_j$). The left-and-right relation of the block-pair $(b_i, b_j)$ is referred to as $h(b_i, b_j)$.

(2) Above-and-below Relation

With respect to a pair $(b_i, b_j)$ of two arbitrary blocks $b_i$ and $b_j$ in the block set B, if establishing a relation of $y(b_i)+h(b_i) \leq y(b_j)$, the block $b_i$ is below the block $b_j$ (or, the block $b_j$ is above the block $b_i$). The above-and-below relation of the block-pair $(b_i, b_j)$ is referred to as $v(b_i, b_j)$.

Further, similarly to [Ref. 3], the sequence-pair is defined as follows.

(3) Sequence-pair

It is assumed that a block set $B=\{b_1, b_2, \ldots, b_N\}$ comprising N blocks is given. Two block sequences as sequences of all blocks in the set B are referred to as $P=(p_1, p_2, \ldots, p_N)$ ($\forall p_i \in B$) and $M=(m_1, m_2, \ldots, m_N)$ ($\forall m_i \in B$). In this case, a pair (P, M) of two sequences is referred to as a sequence-pair.

(4) Sequence-pair of Block Placement

The rank of the block $b_i$ ($\in B$) in the sequence P is referred to as $\alpha(b_i)$, and the rank of the block $b_i$ ($\in B$) in the sequence M is referred to as $\beta(b_i)$.

[Expression 9]

$$p_{\alpha(b_i)}=b_i, m_{\beta(b_i)}=b_i \qquad (13)$$

At one block placement, when the sequences P and M of the block satisfy the following relations of:

(a) if $\alpha(b_i)<\alpha(b_j) \wedge \beta(b_i)<\beta(b_j)$, $b_i$ is left of $b_j$ ($b_j$ is right of $b_i$), and (b) if $\alpha(b_i)>\alpha(b_j) \wedge \beta(b_i)<\beta(b_j)$, $b_i$ is below $b_j$ ($b_j$ is above $b_i$), and the sequence-pair (P, M) is referred to as the sequence-pair of the block placement.

[2] Extracting Processing of Binary Relation

Next, a description will be given of extracting processing of the binary order in step S2 in FIG. 2. Herein, the binary relations of the sequences P and M can be expressed by the following defined variables $p_{ord}(b_i, b_j)$ and $m_{ord}(b_i, b_j)$:

[Expression 10]

$$p_{ord}(b_i, b_j) = \begin{cases} 1 & \text{(if } \alpha(b_i) < \alpha(b_j)) \\ 0 & \text{(otherwise)} \end{cases} \qquad (14)$$

$$m_{ord}(b_i, b_j) = \begin{cases} 1 & \text{(if } \beta(b_i) < \beta(b_j)) \\ 0 & \text{(otherwise)} \end{cases} \qquad (15)$$

Figure 6:
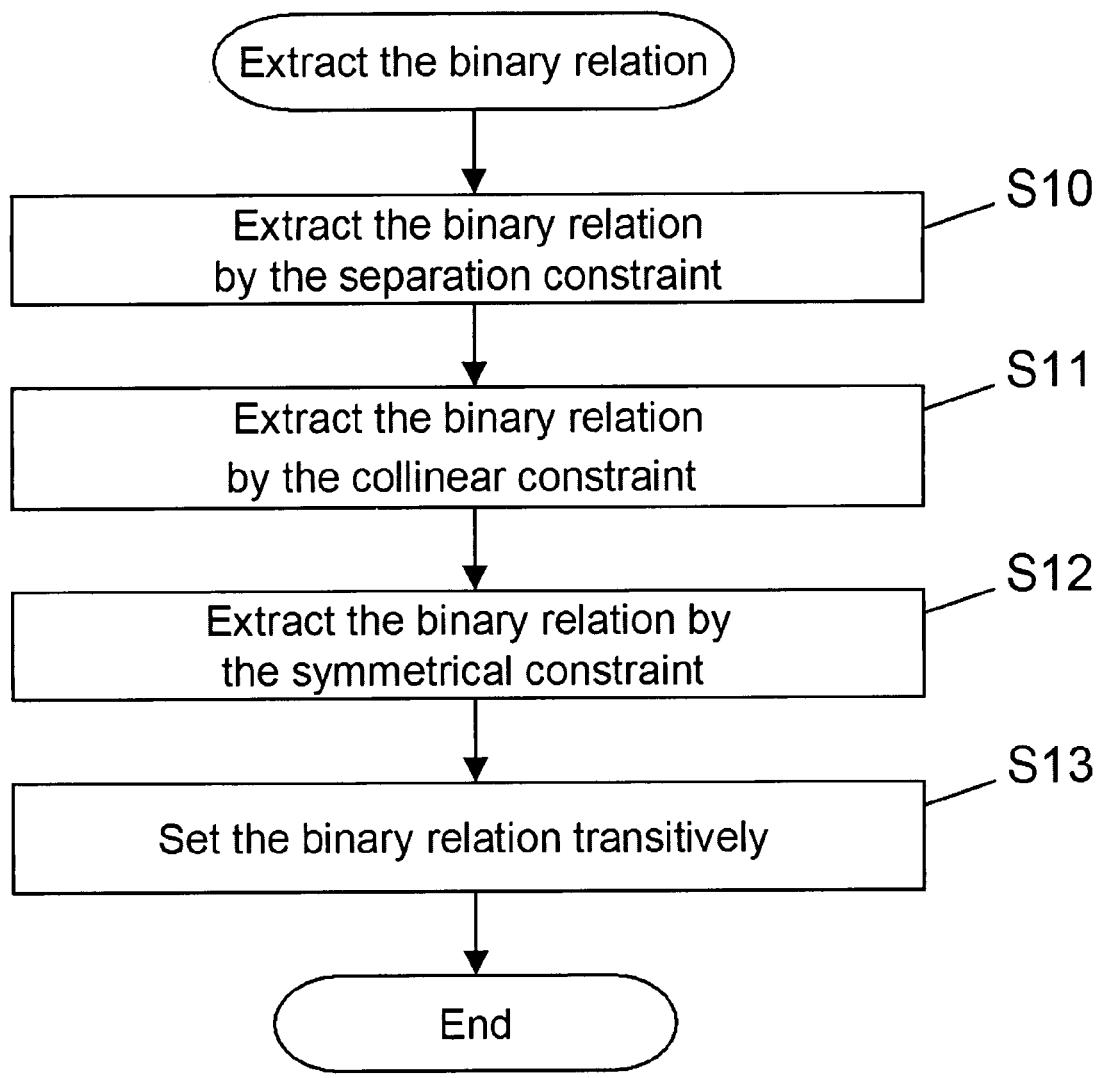
FIG. 6 is a flowchart showing the routine of processing for extracting a binary relation by using binary relation setting means.

FIG. 6 is a flowchart showing the routine of the extracting processing of the binary relation using the binary relation setting module 9. First, the separation constraint extracting module 12 extracts the binary relations $p_{ord}$ and $m_{ord}$ determined from the separation constraint. The extracted binary relations $p_{ord}$ and $m_{ord}$ are stored in the binary relation file 7 (in step S10). Subsequently, the vertical collinear constraint extracting module 13 and the horizontal collinear constraint extracting module 14 extract the binary relations $p_{ord}$ and $m_{ord}$ determined from the vertical collinear constraint and horizontal collinear constraint. The extracted binary relations $p_{ord}$ and $m_{ord}$ are stored in the binary relation file 7 (in step S11). Subsequently, the horizontal symmetrical constraint extracting module 15 and the vertical symmetrical constraint extracting module 16 extract the binary relations $p_{ord}$ and $m_{ord}$ determined from the horizontal symmetrical constraint and vertical symmetrical constraint. The extracted binary relations $p_{ord}$ and $m_{ord}$ are stored in the binary relation file 7 (in step S12). Finally, the binary relation transitively setting module 17 sets the binary relation that can be transitively set on the basis of the binary relation between the blocks stored in the binary relation file 7 from among the binary relations between the blocks to which the binary relation is not set yet, and stores the set binary relation to the binary relation file 7 (in step S13). Specifically, the calculating processing in steps is executed as follows.

[2-1] Extraction of Binary Relation From Separation Constraint (S10)

First, the separation constraint extracting module 12 selects the two blocks $b_i$ and $b_j$ stored in the block placement file 5, and reads positional coordinates $(x(b_i), y(b_i))$ and $(x(b_j), y(b_j))$ and sizes $(w(b_i), h(b_i))$ and $(w(b_j), h(b_j))$. Further, the separation constraint extracting module 12 reads clearances $D_h(b_i, b_j)$ and $D_v(b_i, b_j)$ between the blocks $b_i$ and $b_j$ from the configuration constraint file 6. Incidentally, values not less than 0 are set to $D_h(b_i, b_j)$ and $D_v(b_i, b_j)$. Further, the values of the clearances may be constant to all block-pairs.

Subsequently, the separation constraint extracting module 12 checks whether or not the following relation is established with respect to the block-pair $(b_i, b_j)$

[Expression 11]

$$y(b_i)+h(b_i)+D_v(b_i, b_j)>y(b_j) \wedge y(b_i)<y(b_j)+h(b_j)+D_v(b_j, b_i) \wedge x(b_j)-x(b_i) \geq w(b_i)+D_h(b_i, b_j) \qquad (16)$$

Upon establishing the relation of equation (16), "$b_i$ is left of $b_j$" is set.

[Expression 12]

$$\alpha(b_i)<\alpha(b_j) \wedge \beta(b_i)<\beta(b_j) \qquad (17)$$

The order is determined as shown in Equation (17). That is, the separation constraint extracting module 12 sets the binary relation between the blocks $b_i$ and $b_j$ in the sequences P and M.

[Expression 13]

$$p_{ord}(b_i, b_j)=1, p_{ord}(b_j, b_i)=0 \qquad (18a)$$

$$m_{ord}(b_i, b_j)=1, m_{ord}(b_j, b_i)=0 \qquad (18b)$$

The set Equations (18a), (18b) is stored in the binary relation file 7. In the examples shown in FIGS. 3A and 3B, the separation constraint extracting module 12 sets, to the block $b_0$, "$b_6$, $b_7$, and $b_8$ are left of $b_0$".

Similarly, the separation constraint extracting module 12 checks whether or not the following relation is established in relation to the block-pair $(b_i, b_j)$

[Expression 14]

$$x(b_i)+w(b_i)+D_h(b_i, b_j)>x(b_j) \wedge x(b_i)<x(b_j)+w(b_j)+D_h(b_j, b_i) \wedge y(b_j)-y(b_i) \geq h(b_i)+D_v(b_i, b_j) \qquad (19)$$

Upon establishing the relation of equation (19), "$b_i$ is below $b_j$" is set.

[Expression 15]

$$\alpha(b_i)>\alpha(b_j) \wedge \beta(b_i)<\beta(b_j) \qquad (20)$$

The order is determined as shown in Equation (20). That is, the separation constraint extracting module 12 sets the binary relation between the blocks $b_i$ and $b_j$ in the sequences P and M.

[Expression 16]

$$p_{ord}(b_i, b_j)=0, p_{ord}(b_j, b_i)=1 \qquad (21a)$$

$$m_{ord}(b_i, b_j)=1, m_{ord}(b_j, b_i)=0 \qquad (21b)$$

The set Equations (21a), (21b) is stored in the binary relation file 7. In the examples shown in FIGS. 3A and 3B, the separation constraint extracting module 12 sets, to the block $b_0$, "$b_7$, $b_8$, $b_9$, and $b_{10}$ are below $b_0$".

[2-2] Extraction of Binary Relation From Collinear Constraint (S11)

The vertical collinear constraint extracting module 13 and horizontal collinear constraint extracting module 14 extract a series of block sets in which the representative points on one side or block are aligned on the horizontal line or vertical line, from among the block set B stored in the block placement file 5, and sets the extracted block set as a partial set $B_k$ ($\subseteq$ B) to which the collinear constraint is imposed. Further, upon predetermining the partial set $B_k$ ($\subseteq$ B) to which the collinear constraint is imposed by the designer, the partial set $B_k$ is read from the configuration constraint file 6.

Subsequently, the vertical collinear constraint extracting method 13 and horizontal collinear constraint extracting module 14 align the block $b_i$ (i=1, 2, ..., $N_k$) in the partial set $B_k$ in the smaller order of $x(b_i)$ Hereinlater, the order of block $b_i$ in the alignment is referred to as $x_{ord}(b_i)$. Similarly, the block $b_i$ (i=1, 2, ..., $N_k$) in the partial set $B_k$ is aligned in the smaller order of $y(b_i)$. Hereinlater, the order of the block $b_i$ in the alignment is referred to as $y_{ord}(b_i)$.

(1) If $ALIGN_L(B_k)$, $ALIGN_R(B_k)$, or $ALIGN_{CV}(B_k)$ is given to the partial set $B_k$, the vertical collinear constraint extracting module 13 sets "$b_i$ is below $b_j$" when $y_{ord}(b_i) < y_{ord}(b_j)$ with respect to the block-pair ($b_i$, $b_j$) in the partial set $B_k$.

[Expression 17]

$$\alpha(b_i) > \alpha(b_j), \beta(b_i) < \beta(b_j) \quad (22)$$

The order is determined as shown Equation (22). That is, the vertical collinear constraint extracting module 13 sets the binary relation between the blocks $b_i$ and $b_j$ in the sequences P and M.

[Expression 18]

$$p_{ord}(b_i, b_j)=0, p_{ord}(b_j, b_i)=1 \quad (23a)$$

$$m_{ord}(b_i, b_j)=1, m_{ord}(b_j, b_i)=0 \quad (23b)$$

The set binary relation is stored to the binary relation file 7.

(2) If giving $ALIGN_B(B_k)$, $ALIGN_T(B_k)$, or $ALIGN_{CH}(B_k)$ is given to the partial set $B_k$, the horizontal collinear constraint extracting module 14 sets "$b_i$ is left of $b_j$" when $x_{ord}(b_i) < x_{ord}(b_j)$ with respect to the block-pair ($b_i$, $b_j$) in the partial set $B_k$.

[Expression 19]

$$\alpha(b_i) < \alpha(b_j), \beta(b_i) < \beta(b_j) \quad (24)$$

The order is determined as shown by Equation (24). That is, the horizontal collinear constraint extracting module 14 sets the binary relation between the blocks $b_i$ and $b_j$ in the sequences P and M.

[Expression 20]

$$p_{ord}(b_i, b_j)=1, p_{ord}(b_j, b_i)=0 \quad (25a)$$

$$m_{ord}(b_i, b_j)=1, m_{ord}(b_j, b_i)=0 \quad (25b)$$

The set Equations (25a),(25b) is stored to the binary relation file 7.

[2-3] Extraction of Binary Relation From Symmetrical Constraint (S12)

The horizontal symmetrical constraint extracting module 15 and vertical symmetrical constraint extracting module 16 extract three blocks that are symmetrically aligned in the vertical direction or horizontal direction, from among the block set B stored in the block placement file 5, and sets the extracted three blocks as blocks $b_i$, $b_j$, and $b_k$ ($\in$B) to which the symmetrical constraint is imposed. Further, when the designer predetermines the three block $b_i$, $b_j$, and $b_k$ ($\in$B) to which the symmetrical constraint is imposed, the blocks $b_i$, $b_j$, and $b_k$ are read from the configuration constraint file 6.

The setting of the binary relation based on the symmetrical constraint by using the horizontal symmetrical constraint extracting module 15 and vertical symmetrical constraint extracting module 16 is executed as follows.

(1) If giving $SYMM_H(b_i, b_j, b_k)$ with respect to blocks $b_i$, $b_j$, and $b_k$ ($x(b_i) < x(b_j) < x(b_k)$), the horizontal symmetrical constraint extracting module 15 sets "$b_i$ is left of $b_k$".

[Expression 21]

$$\alpha(b_i) < \alpha(b_k), \beta(b_i) < \beta(b_k) \quad (26)$$

The order is determined as shown by Equation (26). That is, the horizontal symmetrical constraint extracting module 15 sets the binary relation between the blocks $b_i$ and $b_k$ in the sequences P and M as shown by the following Equations (27a), (27b)

[Expression 22]

$$p_{ord}(b_i, b_k)=1, p_{ord}(b_k, b_i)=0 \quad (27a)$$

$$m_{ord}(b_i, b_k)=1, m_{ord}(b_k, b_i)=0 \quad (27b)$$

The set binary relation is stored to the binary relation file 7.

(2) If giving $SYMM_V(b_i, b_j, b_k)$ with respect to the blocks $b_i$, $b_j$, and $b_k$ ($y(b_i) < y(b_j) < y(b_k)$), the vertical symmetrical constraint extracting module 16 sets "$b_i$ is below $b_k$".

[Expression 23]

$$\alpha(b_i) > \alpha(b_k), \beta(b_i) < \beta(b_k) \quad (28)$$

The order is determined as shown by Equation (23). That is, the vertical symmetrical constraint extracting module 16 sets the binary relation between the blocks $b_i$ and $b_k$ in the sequences P and M, as shown by Equations (29a),(29b).

[Expression 24]

$$p_{ord}(b_i, b_k)=0, p_{ord}(b_k, b_i)=1 \quad (29a)$$

$$m_{ord}(b_i, b_k)=1, m_{ord}(b_k, b_i)=0 \quad (29b)$$

The set binary relation is stored to the binary relation file 7.

[2-4] Transitive Determination of Binary Relation (S13)

The binary relation transitively setting module 17 determines the binary relation that can be transitively determined from the determined binary relations stored in the binary relation file 7. This is performed as follows.

With respect to the three blocks $b_i$, $b_j$, and $b_k$, it is assumed that the binary relation in the sequence P of the block-pair ($b_i$, $b_j$) and the block-pair ($b_j$, $b_k$) is determined as $p_{ord}(b_i, b_j)=1 \wedge p_{ord}(b_j, b_k)=1$. In this case, the binary relation in the sequence P of the block-pair ($b_i$, $b_k$) is transitively determined, thereby setting $p_{ord}(b_i, b_k)=1$.

Similarly, with respect to the three blocks $b_i$, $b_j$, and $b_k$, if the binary relation in the sequence M of the block-pair ($b_i$, $b_j$) and the block-pair ($b_j$, $b_k$) is determined as $m_{ord}(b_i, b_j)=1 \wedge m_{ord}(b_j, b_k)=1$, the binary relation in the sequence M of the block-pair ($b_i$, $b_k$) is set as $m_{ord}(b_i, b_k)=1$.

[3] Overlap Removing Processing of Outer Shape of Block

Next, a description will be given of overlap removing processing of the outer shape of a block in step S3 in FIG. 2. In the overlap removing processing, if the blocks included in a block placement Φ given as an initial value, the shape of the block is deformed to be small, thereby removing the overlap of the blocks in the block placement Φ and the packing Π as a block placement without the overlap is created.

The above-mentioned overlap removing processing is performed because the sequence-pair is obtained by ordering the blocks having the block placement without the overlap (packing Π) as described in the column of [BACKGROUND OF THE INVENTION] and the blocks cannot be ordered if the blocks are overlapped.

Figure 7:
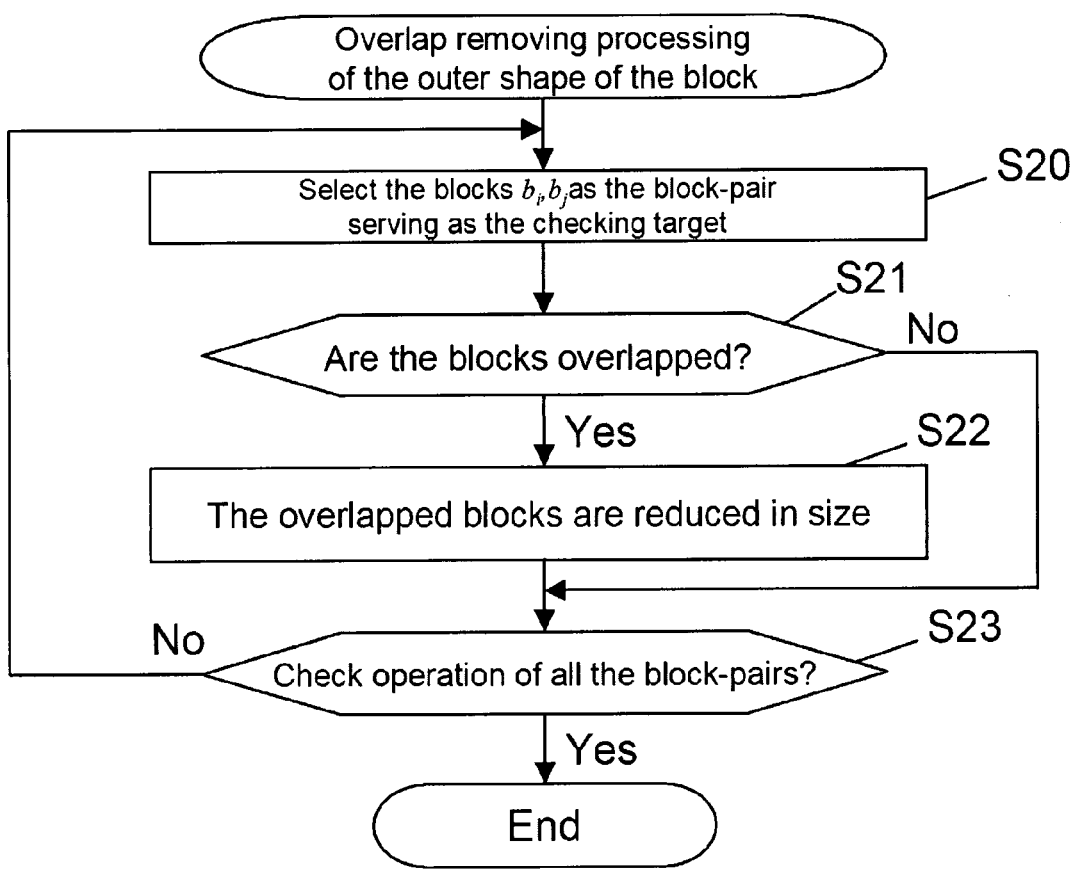
FIG. 7 is a flowchart showing the flow of processing for removing an overlap of outer shapes of blocks.

FIG. 7 is a flowchart showing the flow of the overlap removing processing of the outer shape of the block. First, the overlap removing module 10 selects the blocks $b_i$ and $b_j$ as the block-pair serving as the checking target from the block placement file 5 (in step S20). Further, the overlap removing module 10 checks whether or not the blocks $b_i$ and $b_j$ are overlapped. If the blocks are overlapped, the overlapped blocks $b_i$ and $b_j$ are reduced in size to remove the overlap (in step S22). On the other hand, if the blocks are not overlapped, no processing is performed. Further, the processing in steps S20 to S22 is repeated until ending the checking operation of all the block-pairs (in step S23).

Hereinbelow, a specific description will be given of the processing in step S22. Before the description, the overlapping way of the blocks is defined as follows.

(1) Upon establishing any of the following relations with respect to the block-pair ($b_i$, $b_j$) in the block set B, this means that the block $b_i$ and the block $b_j$ have an "overlapped corner".

[Expression 25]

$$x(b_i) \leq x(b_j) \wedge x(b_j) \leq x(b_i)+w(b_i) \wedge x(b_i)+w(b_i) \leq x(b_j)+w(b_j) \quad (30)$$

[Expression 26]

$$y(b_j) \leq y(b_i) \wedge y(b_i) \leq y(b_j)+h(b_j) \wedge y(b_j)+h(b_j) \leq y(b_i)+h(b_i) \quad (31)$$

Figure 8:
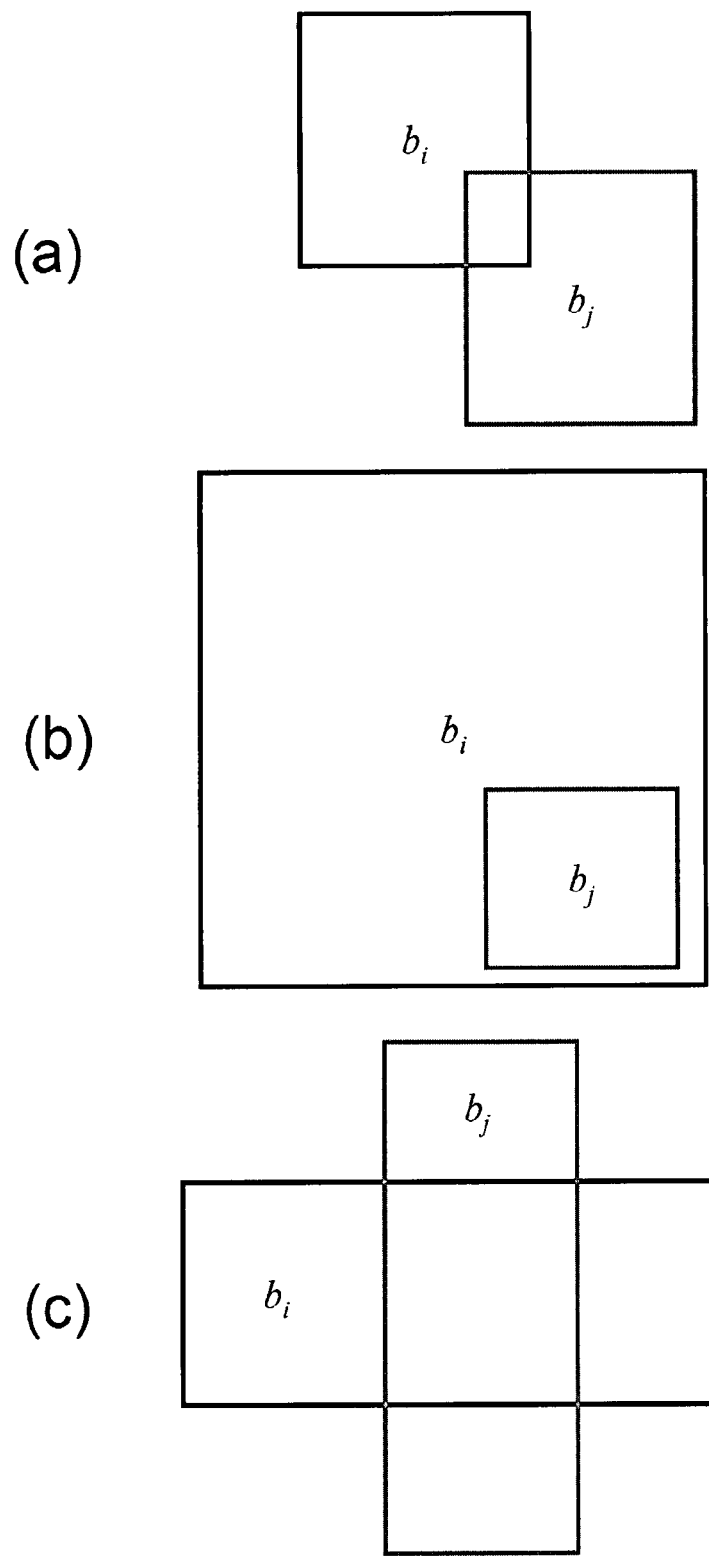
FIGS. 8A to 8C are diagrams showing examples of the overlap of blocks.

FIG. 8A shows one example of the blocks $b_i$ and $b_j$ having the overlapped corner.

(2) When the following relation is established with respect to the block-pair ($b_i$, $b_j$) in the block set B, the block $b_j$ "is included in" the block $b_i$.

[Expression 27]

$$x(b_i) \leq x(b_j) \wedge x(b_j)+w(b_j) \leq x(b_i)+w(b_i) \wedge y(b_i) \leq y(b_j) \wedge y(b_j)+h(b_j) \leq y(b_i)+h(b_i) \quad (32)$$

FIG. 8B shows an example in which the block $b_j$ is included in the block $b_i$.

(3) When the following relation is established with respect to the block-pair ($b_i$, $b_j$) in the block set B, the block $b_i$ and the block $b_j$ "intersect".

[Expression 28]

$$x(b_i) \leq x(b_j) \wedge x(b_j)+w(b_j) \leq x(b_i)+w(b_i) \wedge y(b_j) \leq y(b_i) \wedge y(b_i)+h(b_i) \leq y(b_j)+h(b_j) \quad (33)$$

[3-1] Overlap Removing Processing of Blocks Having Overlapped Corner

When corners of the two blocks $b_i$ and $b_j$ are overlapped, the overlap removing processing is performed as follows. First, reference numeral dx denotes the length of the overlap of the outer shape of the blocks $b_i$ and $b_j$ in the horizontal direction and reference character dy denotes the length thereof in the vertical direction. FIG. 9A shows an example of dx and dy.

(1) If dx<dy, the lengths of the blocks $b_i$ and $b_j$ in the horizontal direction are reduced by dx/2, respectively, so as to remove the overlap of the blocks $b_i$ and $b_j$. For example, if $x(b_i)<x(b_j)$, the width of the outer shape of the block $b_i$ is w'$(b_i)=w(b_i)-dx/2$ and the width of the outer shape of the block $b_j$. The x coordinate of the lower-left corner of the outer shape is x'$(b_j)=x(b_j)+dx/2$. The width of the outer shape of the block $b_j$ is w'$(b_j)=w(b_j)-dx/2$. FIG. 9B shows an example of overlap removing processing in the case of dx<dy.

(2) If dy<dx, the lengths of the blocks $b_i$ and $b_j$ in the vertical direction are reduced by dy/2, respectively, so as to remove the overlap of the blocks $b_i$ and $b_j$. For example, if $y(b_i)<y(b_j)$, the height of the outer shape of the block $b_i$ is h'$(b_i)=h(b_i)-dy/2$. The y coordinate of the lower-left corner of the outer shape of the block $b_j$ is y'$(b_j)=y(b_j)+dy/2$. The height of the outer shape of the block $b_j$ is h'$(b_j)=h(b_j)-dy/2$.

[3-2] Overlap Removing Processing When Blocks Have an Inclusion Relation and Intersect When the two blocks $b_i$ and $b_j$ have an inclusion relation and intersect, the overlap removing processing is performed as follows. First, the overlap removing means calculates the following four values with respect to the blocks $b_i$ and $b_j$.

[Expression 29]

$$dx_1 = [x(b_j)+w(b_j)]-x(b_i)$$

$$dx_2 = [x(b_i)+w(b_i)]-x(b_j)$$

$$dy_1 = [y(b_j)+h(b_j)]-y(b_i)$$

$$dy_2 = [y(b_i)+h(b_i)]-y(b_j) \quad (34)$$

Next, among $dx_1$, $dx_2$, $dy_1$, and $dy_2$, when $dx_1$ or $dx_2$ is minimal, the width of $b_i$ or $b_j$ is reduced in the horizontal direction until removing the overlap of the blocks $b_i$ and $b_j$. For example, at the initial block placement Φ, it is assumed that the blocks $b_i$ and $b_j$ are configured as shown in FIG. 10A. Referring to FIG. 10A, a relation of min($dx_1$, $dx_2$, $dy_1$, $dy_2$) =$dx_1$ is established. In this case, the width of $b_i$ is changed to w'$(b_i)=\max(0, w(b_i)-dx_1/2)$ and the width of $b_j$ is changed to w'$(b_j)=\max(0, w(b_j)-dx_1/2)$. FIG. 10B shows a result of performing the overlap removing processing of the blocks $b_i$ and $b_j$ shown in FIG. 10A.

Incidentally, at the initial block placement Φ, as shown in FIG. 10C, a relation of $w(b_j)<dx_1/2$ can be considered. In this case, a relation of w'$(b_j)=\max(0, w(b_j)-dx_1/2)=0$ is established. When the width of the block $b_j$ is 0 as mentioned above, the position of the block is moved up to the position of the side of the block $b_i$ serving as the reference for measuring $dx_1$. FIG. 10D shows the state thereof.

When $dy_1$ or $dy_2$ is minimal, similarly, the height of $b_i$ or $b_j$ is reduced in the vertical direction until removing the overlap of the blocks $b_i$ and $b_j$. For example, if min($dx_1$, $dx_2$, $dy_1$, $dy_2$)=$dy_1$, the height of $b_i$ is changed to h'$(b_i)=\max(0, h(b_i)-dy_1/2)$ and the height of $b_j$ is changed to h'$(b_j)=\max(0, h(b_j)-dy_1/2)$. Incidentally, even when the processing when the changed height of the block is 0, the operation is similar to the case in which $dx_1$ or $dx_2$ is minimal.

[4] Total Order Relation Fixing Processing

Finally, a description will be given of total order relation fixing processing in steps S4 and S5 in FIG. 2. The total order relation fixing processing is independently performed in the sequence P and the sequence M.

[4-1] Total Order Relation Fixing Processing of Sequence P

Figure 11:
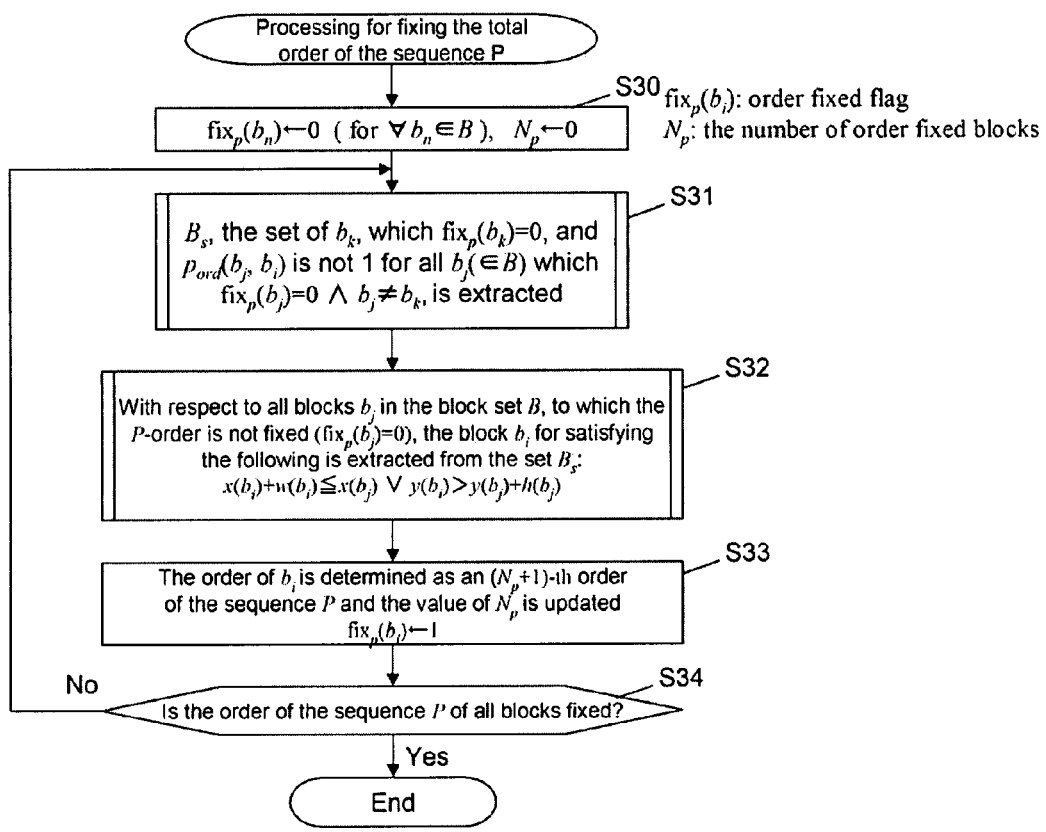
FIG. 11 is a flowchart showing a flow of processing for determining the total order of a sequence P.

FIG. 11 is a flowchart showing the flow of the processing for fixing the total order of the sequence P. In the processing, the P-order setting module 18 fixes the order of blocks from the head of the sequence P. Herein, a variable $\text{fix}_p(b_i)$ defined as follows is used as a variable indicating whether or not the order of the block $b_i$ ($\in$B) is fixed in the sequence P.

[Expression 30]

$$\text{fix}_p(b_i) = \begin{cases} 1 & (\text{if } b_i \text{ is fixed in sequence } P) \\ 0 & (\text{otherwise}) \end{cases} \quad (35)$$

Hereinbelow, the number of determined blocks in the sequence P is denoted by $N_p$.

First, the P-order setting module 18 initializes all variables $\text{fix}_p(b_i)$ ($\forall b_i \in B$) to 0 and further initializes $N_p$ to 0 (in step S30).

Subsequently, with respect to the block $b_k$ to which the P-order is not fixed ($\text{fix}_p(b_k)=0$) at the current time and all blocks $b_j$ ($\in B$), to which the P-order is not fixed ($\text{fix}_p(b_j)=0$), excluding the block $b_k$, the block $b_k$ when the binary relation $p_{ord}(b_j, b_i)$ is not 1 is extracted (in step S31). Hereinlater, this set of the block $b_k$ is referred to as $B_s$ ($\subseteq B$).

Subsequently, with respect ○ all blocks $b_j$ in the block set B, to which the P-order is not fixed ($\text{fix}_p(b_j)=0$), the P-order setting module 18 extracts the block $b_i$ for satisfying $x(b_i)+w(b_i) \leq x(b_j)$ or $y(b_i) > y(b_j)+h(b_j)$, from the set $B_s$ (in step S32).

Further, the order of the extracted block $b_i$ is determined as an ($N_p+1$)-th order of the sequence P ($\alpha(b_i)=N_p+1$), and the variable $\text{fix}_p(b_i)$ is set as 1 (in step S33).

The processing in steps S31 to S33 is repeated until fixing the order of the sequence P of all blocks in the block set B (in step S34).

[4-2] Total Order Relation Fixing Processing of Sequence M

The total order relation fixing processing of the sequence M by using the M-order setting module 19 is performed, similarly to the total order relation fixing processing of the sequence P. That is, also in the processing, the M-order setting module 19 fixes the order of blocks from the head of the sequence M. Herein, a variable $\text{fix}_m(b_i)$ defined as follows is used as a variable indicating whether or not the order of the block $b_i$ ($\in B$) in the sequence M is fixed.

[Expression 31]

$$\text{fix}_m(b_i) = \begin{cases} 1 & (\text{if } b_i \text{ is fixed in sequence } M) \\ 0 & (\text{otherwise}) \end{cases} \quad (36)$$

The number of blocks to which the order is fixed in the sequence M is denoted by $N_m$.

First, the M-order setting module 19 initializes all variables $\text{fix}_m(b_i)$ ($\forall b_i \in B$) to 0, and $N_m$ is initialized to 0. Subsequently, with respect to all blocks $b_j$ ($\in B$) to which the M-order is not fixed, excluding the block $b_k$ to which the M-order is not fixed at the current timing, the M-order setting module 19 extracts the block $b_k$ having the binary relation $m_{ord}(b_j, b_i)$ that is not 1 (a set of the blocks $b_k$ is referred to as $B_s$ ($\subseteq B$)). Subsequently, the M-order setting module 19 extracts, from the block set $B_s$, the block $b_i$ in the block set B for satisfying a relation of $x(b_i)+w(b_i) \leq x(b_j)$ or $y(b_i) > y(b_j)+h(b_j)$ with respect to all blocks $b_j$, to which the M-order is not fixed. Further, the M-order setting module 19 fixes the order of the extracted block $b_i$ to an ($N_m+1$)-th block of the sequence M ($\beta(b_i)=N_m+1$) and sets $\text{fix}_m(b_i)$ to 1.

The above-mentioned processing is repeated until fixing the order of the sequence M of all blocks in the block set B. Thus, it is possible to create the sequence-pair (P, M) for satisfying the total binary relations in the sequences P and M based on various configuration constraints.

Second Embodiment

[1] Constitution of Sequence-pair Creating Apparatus

Figure 12:
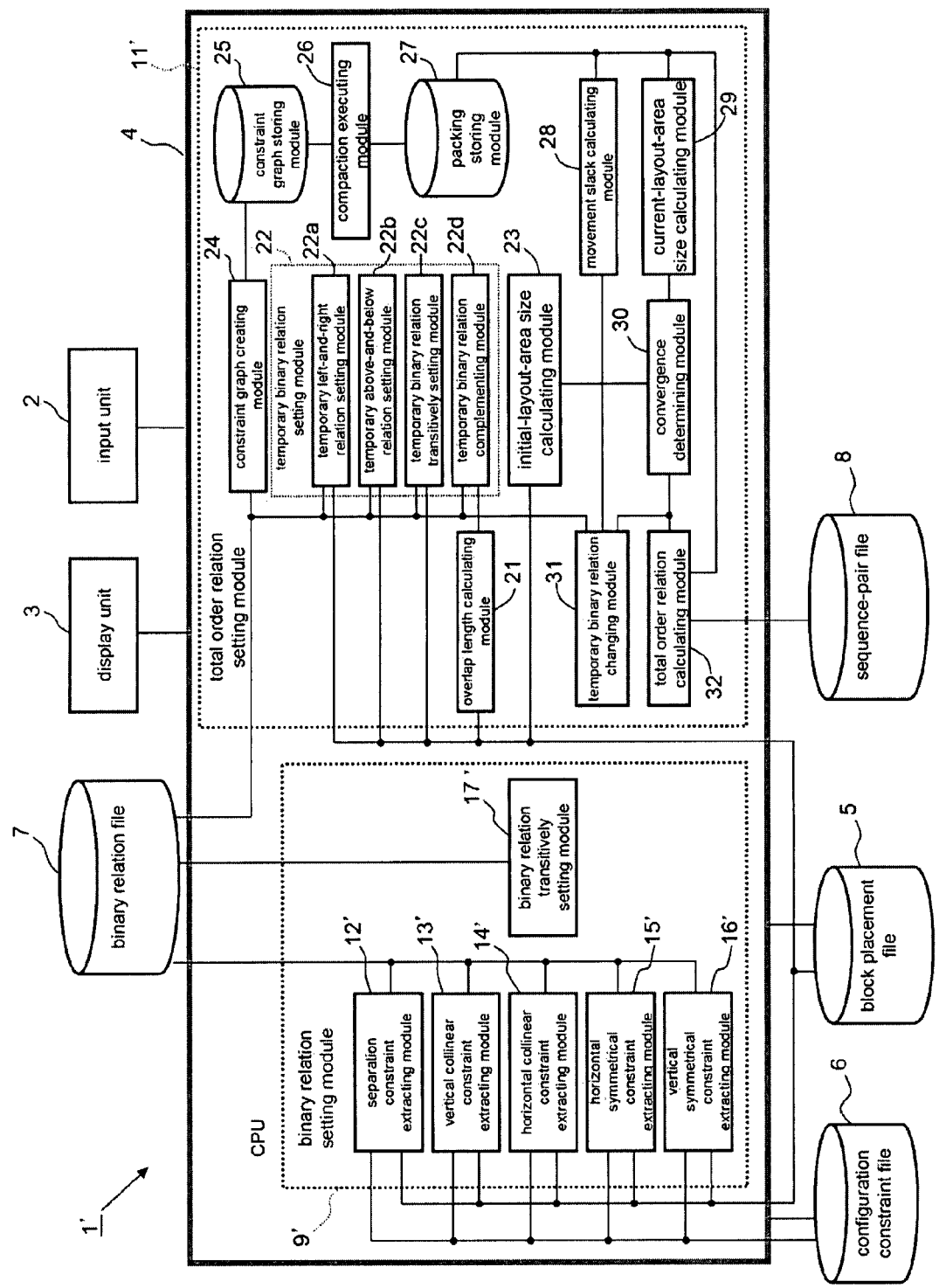
FIG. 12 is a diagram showing the constitution of a sequence-pair creating apparatus according to the second embodiment of the present invention.

FIG. 12 is a diagram showing the constitution of the sequence-pair creating apparatus according to the second embodiment of the present invention. A sequence-pair creating apparatus 1' according to the second embodimeant comprises the input unit 2, the display unit 3, the CPU 4, the block placement file 5, the configuration constraint file 6, the binary relation file 7, and the sequence-pair file 8. A description of the input unit 2, the display unit 3, the block placement file 5, the configuration constraint file 6, the binary relation file 7, and the sequence-pair file 8 is omitted because it is similar to that according to the first embodiment.

Incidentally, the block placement file 5 stores the information of block placement and information of size of blocks arranged on the chip. It is assumed that the block placement file 5 stores information of block placement and information of size with respect to N blocks. The block is referred to as $b_i$ (i=1, . . . , N). A set of all blocks stored in the block placement file 5 is referred to as a "block set" B. Further, a pair of two blocks $b_i$ and $b_j$ in the block set is referred to as a "block-pair". A set of all block-pairs is referred to as a "block-pair set" B×B.

The CPU 4 comprises binary relation setting module 9' and total order relation setting module 11'. The binary relation setting module 9' and total order relation setting module 11' are realized as functional modules by loading programs from the input unit 2 and executing them.

The binary relation setting module 9' sets the binary relations of the block-pairs on the basis of the configuration constraint extracted from the information of block placement and information of size, stored in the block placement file 5, and the configuration constraint externally designated by the input unit 2. The binary relation set by the binary relation setting module 9' is a "fundamental binary relation". The binary relation setting module 9' stores the fundamental binary relation set to the block-pair to the binary relation file 7.

Herein, the fundamental binary relation for the horizontal direction is referred to as a "basic left-and-right relation". The basic left-and-right relation of a block-pair ($b_i$, $b_j$) including two blocks $b_i$ and $b_j$ ($\in B$) is referred to as $h_{ord}(b_i, b_j)$. Further, the fundamental binary relation for the vertical direction is referred to as a "basic above-and-below relation". The basic above-and-below relation of a block-pair ($b_i$, $b_j$) including two blocks $b_i$ and $b_j$ ($\in B$) is referred to as $v_{ord}(b_i, b_j)$.

The binary relation setting module 9' further comprises separation constraint extracting module 12', vertical collinear constraint extracting module 13', horizontal collinear constraint extracting module 14', horizontal symmetrical constraint extracting module 15', vertical symmetrical constraint extracting module 16', and binary relation transitively setting module 17'.

The separation constraint extracting module 12' extracts the block-pair for satisfying the separation constraint from the information of block placement and information of size, and sets the left-and-right relation $h_{ord}$ and above-and-below relation $v_{ord}$ of the block-pair. Incidentally, the separation constraint is as mentioned according to the first embodiment.

The vertical collinear constraint extracting module 13' and horizontal collinear constraint extracting module 14' set the left-and-right relation $h_{ord}$ and above-and-below relation $v_{ord}$ of the blocks as the constraint target in accordance with the vertical collinear constraint and horizontal collinear constraint, extracted from the information of block placement and information of size or input from the input unit 2 by the designer. Incidentally, the vertical collinear constraint and horizontal collinear constraint are as mentioned according to the first embodiment.

The horizontal symmetrical constraint extracting module 15' and vertical symmetrical constraint extracting module 16' set the left-and-right relation $h_{ord}$ and above-and-below relation $v_{ord}$ of the blocks as the constraint target in accordance with the vertical symmetrical constraint and horizontal symmetrical constraint, extracted from the information of block placement and information of size or input from the input unit 2 by the designer. Incidentally, the vertical symmetrical constraint and horizontal symmetrical constraint are as mentioned above according to the first embodiment.

The binary relations of the block-pairs extracted by the constraint extracting means are stored to the binary relation file 7. The binary relation transitively setting module 17' sets the transitively-set binary relation of the block-pair to which the binary relation is not set yet on the basis of the binary relation stored in the binary relation file 7.

The total order relation setting module 11' sets the total order relation of the blocks in the sequences P and M on the basis of the information of block placement and information of size (packing Π) for satisfying all binary relations $h_{ord}(b_i, b_j)$ and $v_{ord}(b_i, b_j)$ ($b_i, b_j \in B$) set by the binary relation setting module 9'.

The total order relation setting module 11' further comprises overlap length calculating module 21, temporary binary relation setting module 22, initial-layout-area size calculating module 23, constraint graph creating module 24, constraint graph storing module 25, compaction executing module 26, packing storing module 27, movement slack calculating module 28, current-layout-area size calculating module 29, convergence determining module 30, temporary binary relation changing module 31, and total order relation calculating module 32.

The overlap length calculating module 21 calculates a width $d_x(b_i, b_j)$ of the overlap in the horizontal direction and a width $d_y(b_i, b_j)$ of the overlap in the vertical direction when the block-pair ($b_i, b_j$) has the overlap thereof.

The temporary binary relation setting module 22 sets the temporary binary relation of the block-pair ($b_k, b_i$), to which the fundamental binary relation is not set yet, from among all block-pairs in the block-pair set B×B. Further, the temporary binary relation setting module 22 further stores the set temporary binary relation to the binary relation file 7. Herein, the "temporary binary-relation" means the binary relation that is temporarily set to the block-pair, to which the fundamental binary relation is not set yet. The temporary binary relation setting module 22 comprises temporary left-and-right relation setting module 22a, temporary above-and-below relation setting module 22b, temporary binary relation transitively setting module 22c, and temporary binary relation complementing module 22d.

The temporary left-and-right relation setting module 22a sets the temporary left-and-right relation of the block-pair ($b_i, b_j$) in accordance with the left-and-right relation of horizontal positional coordinates $x(b_i)$ and $x(b_j)$ of both the blocks of the block-pair ($b_i, b_j$) having the overlap in the vertical direction no overlap in the horizontal direction, from among the block-pairs to which the fundamental binary relation is not set yet. Further, the temporary above-and-below relation setting module 22b sets the temporary above-and-below relation of the block-pair ($b_i, b_j$) in accordance with the above-and-below relation of vertical positional coordinates $y(b_i)$ and $y(b_j)$ of both the blocks to the block-pair ($b_i, b_j$) having the overlap thereof in the horizontal direction and no overlap thereof in the vertical direction, from among the block-pairs to which the fundamental binary relation is not set yet.

Herein, the "temporary left-and-right relation" means that the temporary binary relation for the horizontal direction. The temporary left-and-right relation of the block-pair ($b_i, b_j$) is referred to as $h_{ord}(b_i, b_j)$. Further, the "temporary above-and-below relation" means the temporary binary relation for the vertical direction. The temporary above-and-below relation of the block-pair ($b_i, b_j$) is referred to as $v_{ord}(b_i, b_j)$.

The temporary binary relation transitively setting module 22c transitively derives the temporary left-and-right relation from the temporary left-and-right relations set by the temporary left-and-right relation setting module 22a to the block-pair to which neither the fundamental binary relation nor the temporary binary relation is set, and sets the derived the temporary left-and-right relation as the temporary binary relation of the target block-pair. Further, the temporary binary relation transitively setting module 22c transitively derives the temporary left-and-right relation from the temporary above-and-below relation set by the temporary above-and-below relation setting module 22b and sets the derived temporary left-and-right relation as the temporary binary relation of the target block-pair.

The temporary binary relation complementing module 22d complements the temporary binary relation to the block-pair to which neither the fundamental binary relation nor the temporary binary relation is set.

The initial-layout-area size calculating module 23 calculates a width W and a height H of the layout area at the first-given block placement (initial block placement) Φ. Herein, the "layout area at the initial block placement" means an area surrounded by a minimal-rectangle boundary surrounding the initial block placement. The "width of the layout area" means the length of the side of the layout area in the horizontal direction. The "height of the layout area" means the length of the side of the layout area in the vertical direction.

The constraint graph creating module 24 creates the horizontal constraint graph on the basis of the basic left-and-right relation and temporary left-and-right relation stored in the binary relation file 7. Further, the constraint graph creating module 24 creates the vertical constraint graph on the basis of the basic above-and-below relation and temporary above-and-below relation stored in the binary relation file 7. The created horizontal constraint graph and vertical constraint graph are stored to the constraint graph storing module 25.

Figure 25:
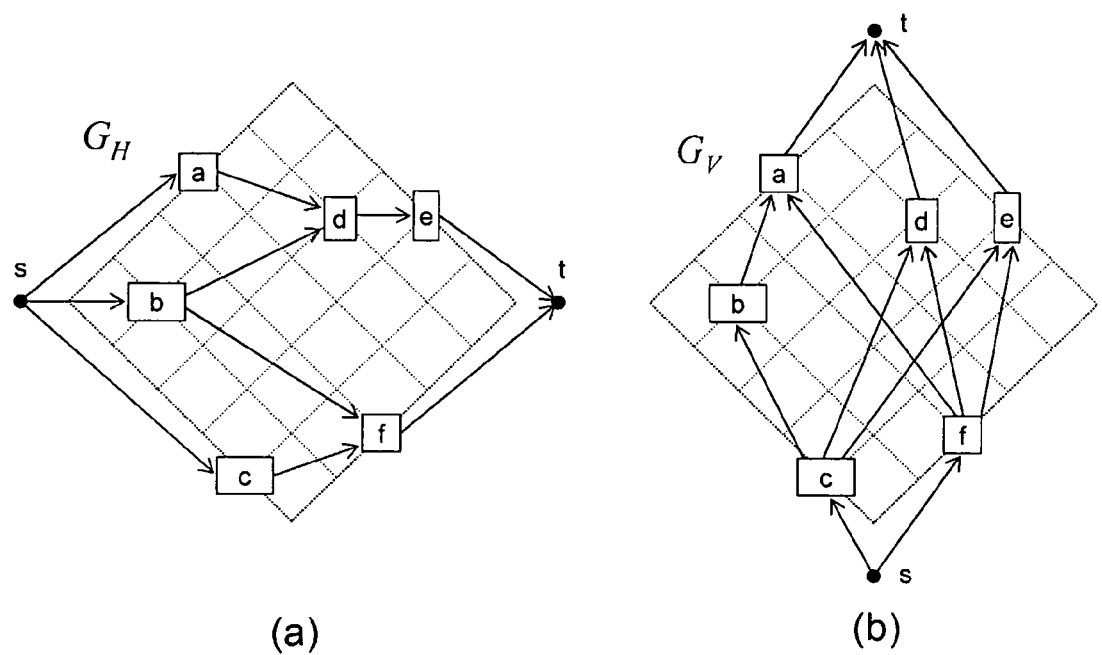
FIG. 25A is a horizontal constraint graph of the (P, M) packing corresponding to (P, M)=(abdecf, cbfade)
FIG. 25B is a vertical constraint graph thereof.
Figure 26:
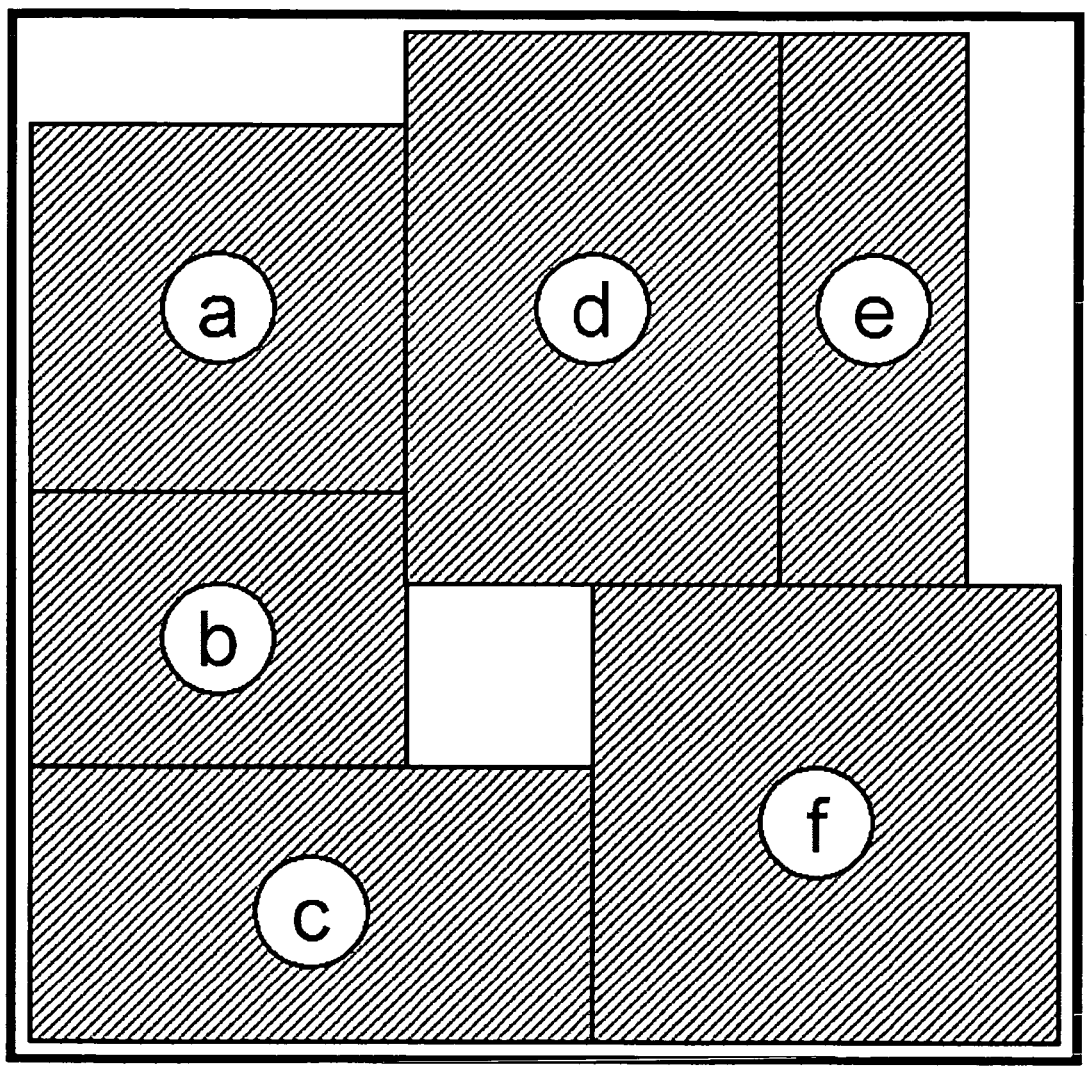
FIG. 26 is a diagram showing an example of the block placement obtained as a result of calculating a maximal length path.

Herein, the "horizontal constraint graph" means a graph $G_H=(V, E_H, \Omega_H)$ defined by the following (refer to FIG. 25A).

[Expression 32]

$$G_H=(V, E_H; \Omega_H)$$

$$V=V_1 \cup V_2$$

$$V_1=\{\text{source s, sink t}\}$$

$$V_2=\{i | i \text{ one-to-one corresponds to each block } b_i \text{ in } B\}$$

$$E_H=E_1 \cup E_{2H}$$

$$E_1=\{(s,i), (i,t) | i \in V_2\}$$

$$E_{2H}=\{(i,j) \in V_2 \times V_2 | j \text{ is right of } i\}$$

$$\Omega_H=\{\omega(s), \omega(t)\} \cup \{\omega(i) | i \in V_2\}$$

$$\omega(s)=\omega(t)=0, \omega(i)=w(b_i) \ (\forall i \in V_2) \tag{37}$$

Herein, V, V$_1$, and V$_2$ denote sets of vertexes, E, E$_1$, and E$_{2H}$ denote sets of directed edges, and $\Omega_H$ denotes a set of weights of vertexes. Reference characters s and t denote a source and a sink, and reference character i denotes a vertex of the horizontal constraint graph G$_H$ other than the source and sink. Reference character $\omega$(i) denotes a weight of the vertex i. Reference character w(b$_i$) denotes a width of the block b$_i$.

Further, the "vertical constraint graph" denotes a graph G$_V$=(V, E$_V$, $\Omega_V$) defined by the following (refer to FIG. 25B).

[Expression 33]

$$G_V=(V, E_V, \Omega_V)$$

$$V=V_1 \cup V_2$$

$$V_1=\{source\ s, sink\ t\}$$

$$V_2=\{i | i\ one\text{-}to\text{-}one\ corresponds\ to\ each\ block\ b_i\ in\ B\}$$

$$E_V=E_1 \cup E_{2V}$$

$$E_1=\{(s,i), (i,t) | i \in V_2\}$$

$$E_{2V}=\{(i,j) \in V_2 \times V_2 | j\ is\ above\ i\}$$

$$\Omega_V=\{w(s), w(t)\} \cup \{w(i) | i \in V_2\}$$

$$\omega(s)=\omega(t)=0, \omega(i)=h(x_i)\ (\forall i \in V_2) \tag{38}$$

Herein, V, V$_1$, and V$_2$ denote sets of vertexes, E, E$_1$, and E$_{2V}$ denote sets of directed edges, and $\Omega_V$ denotes a set of weights of vertexes. Reference characters s and t denote a source and a sink, and reference character i denotes a vertex of the vertical constraint graph G$_V$ other than the source and sink. Reference character $\omega$(i) denotes a weight of the vertex i. Reference character h(b$_i$) denotes a width of the block b$_i$.

The compaction executing module 26 executes upper-right-compaction on the basis of the horizontal constraint graph and vertical constraint graph and creates a packing $\Pi_{rt}$. The created packing $\Pi_{rt}$ is stored to the packing storing module 27. Further, the compaction executing module 26 executes lower-left-compaction on the basis of the horizontal constraint graph and vertical constraint graph and creates a packing $\Pi_{lb}$. The created packing $\Pi_{lb}$ is stored to the packing storing module 27.

Herein, the "compaction" means compaction of the area of a frame surrounding the block placement by optimizing the block placement. The "upper-right-compaction" performs the compaction to stuff the block from the upper-right corner, and the "lower-left-compaction" performs the compaction to stuff the block from the lower-left corner. Further, the "packing" means the configuration without the overlap of the blocks.

The movement slack calculating module 28 calculates the difference between the positional coordinates (x$_t$(b$_i$), y$_t$(b$_i$)) at the packing $\Pi_{rt}$ of the block b$_i$ ($\in$B) and the positional coordinates (x$_b$(b$_i$), y$_b$(b$_i$)) at the packing $\Pi_{lb}$, and calculates a horizontal movement slack H$_{slack}$=|x$_t$(b$_i$)−x$_b$(b$_i$)| and a vertical movement slack V$_{slack}$=|y$_t$(b$_i$)−y$_b$(b$_i$)|.

Herein, the horizontal movement slack is an index indicating the degree of freedom of the distance at which the block can be moved in the horizontal direction by the packing. The block having a smaller horizontal movement slack cannot be largely moved in the horizontal direction. Further, the vertical movement slack is an index indicating the degree of freedom of the distance at which the block can be moved in the vertical direction by the packing. The block having a smaller vertical movement slack cannot be largely moved in the vertical direction.

The current-layout-area size calculating module 29 calculates a width W' and a height H' of the layout area of the packing $\Pi_{lb}$.

The convergence determining module 30 compares the width W' of the layout area of the packing $\Pi_{lb}$ with the width W of the layout area of the initial block placement $\Phi$ to determine whether or not W'≦W. Further, the convergence determining module 30 compares the height H' of the layout area of the packing $\Pi_{lb}$ with the height H of the layout area of the initial block placement $\Phi$ to determine whether or not H'≦H.

If W'≦W and H'≦H, the temporary binary relation changing module 31 changes, from among the temporary left-and-right relation, the temporary left-and-right relation having the minimal sum of the horizontal movement slacks between both the blocks into the temporary above-and-below relation. Further, the temporary binary relation changing module 31 changes, from among the temporary above-and-below relations, the temporary above-and-below relation having the minimal sum of the vertical movement slack between both the blocks into the temporary left-and-right relation. Furthermore, the temporary binary relation changing module 31 updates the changed temporary binary relation from the temporary binary relations stored in the binary relation file 7.

If W'>W or H'>H, the total order relation calculating module 32 sets a series of ranks of all the blocks in the sequence P and M on the basis of the packing $\Pi_{lb}$. Further, the total order relation calculating module 32 stores the created sequences P and M of the blocks to the sequence-pair file 8.

[2] Operation of Sequence-pair Creating Apparatus

Hereinbelow, a description will be given of the operation of the sequence-pair creating apparatus 1' with the above-mentioned constitution according to the second embodiment.

[2-1] Entire Flow of Processing

Figure 13:
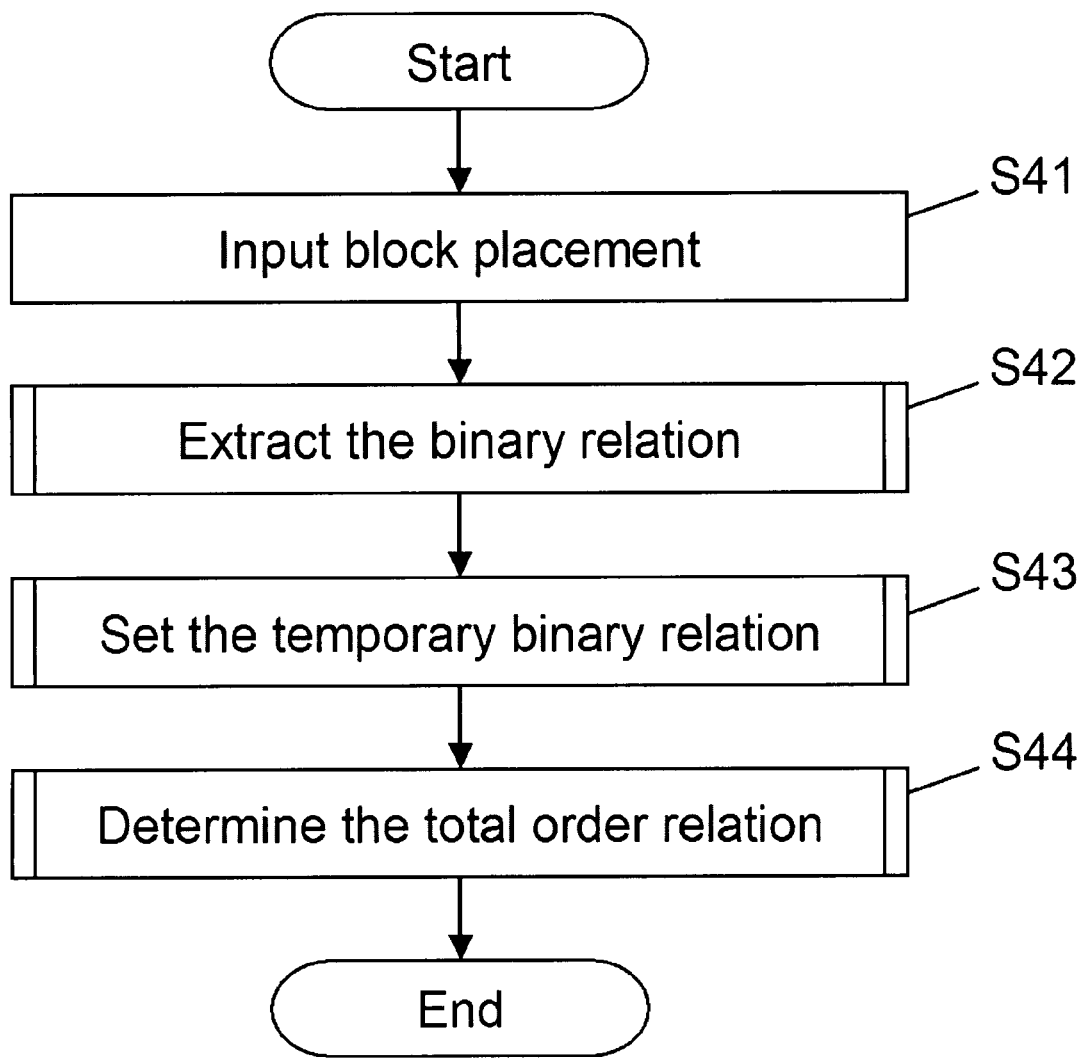
FIG. 13 is a flowchart showing the entire flow of the routine for creating a sequence-pair executed by the sequence-pair creating apparatus according to the second embodiment.

FIG. 13 is a flowchart showing the entire flow of the creating routine of the sequence-pair, executed by the sequence-pair creating apparatus according to the second embodiment.

First, the designer inputs, via the input unit 2 to the block placement file 5, the information of block placement of the initial block placement $\Phi$ and the information of size of the block (in step S41). Further, in this case, the designer inputs, from the input unit 2, various configuration constraints (clearance between the block and vertical collinear constraint, etc.) between specific blocks according to the necessity. The input various configuration constraints are stored to the configuration constraint file 6. The processing in step S41 is similar to the processing in step S1 FIG. 2.

Subsequently, the binary relation setting module 9' extracts the fundamental binary relation derived on the basis of the various configuration constraints from the information of block placement and information of size stored in the block placement file 5, and stores the extracted fundamental binary relation to the binary relation file 7 (in step S42).

Subsequently, the temporary binary relation setting module 22 sets the initial temporary binary relation on the basis of the information of block placement and information of size of the initial block placement $\Phi$. The set initial temporary binary relation is stored to the binary relation file 7 (in step S43).

Finally, the total order relation setting module 11' performs processing for determining the total order relation in the sequences P and M on the basis of the fundamental binary relation and the initial temporary binary relation (in step S44). As a consequence, the sequence-pair (P, M) is determined. The determined sequence-pair (P, M) is output to the sequence-pair file 8 and is stored thereto.

The foregoing is the flow of the entire processing of the sequence-pair creating method. Hereinbelow, a specific description will be given of calculating processing in main steps.

[2-2] Binary Relation Extracting Processing

Since the flow of the binary relation extracting processing in step S42 is basically similar to that shown in FIG. 6, it will be described here with reference to FIG. 6.

First, in step S10, the separation constraint extracting module 12' extracts the basic left-and-right relation $h_{ord}$ and basic above-and-below relation $v_{ord}$ determined from the separation constraint. The extracted fundamental binary relations $h_{ord}$ and $v_{ord}$ are stored to the binary relation file 7. Incidentally, the method for deriving the fundamental binary relations $h_{ord}$ and $v_{ord}$ from the separation constraint is as mentioned in [2-1] according to the first embodiment.

Now, the relation of "$b_i$ is left of $b_j$" is denoted by $b_i \in M^{bb}(b_j)$ with the partial set defined by equation (2). The relation of "$b_i$ is right of $b_j$" is denoted by $b_i \in M^{aa}(b_j)$ with the partial set defined by equation (1). The relation of "$b_i$ is below $b_j$" is denoted by $b_i \in M^{ab}(b_j)$ with the partial set defined by equation (4). The relation of "$b_i$ is below $b_j$" is denoted by $b_i \in M^{ba}(b_j)$ with the partial set defined by equation (3).

Further, the left-and-right relation $h_{ord}(b_i, b_j)$ between the blocks $b_i$ and $b_j$ is defined as follows.

[Expression 34]

$$h_{ord}(b_i, b_j)=0 \Leftrightarrow b_i \in M^{aa}(b_j) \quad (39)$$

$$h_{ord}(b_i, b_j)=1 \Leftrightarrow b_i \in M^{bb}(b_j) \quad (40)$$

[Expression 35]

$$v_{ord}(b_i, b_j)=0 \Leftrightarrow b_i \in M^{ab}(b_j) \quad (41)$$

$$v_{ord}(b_i, b_j)=1 \Leftrightarrow b_i \in M^{ba}(b_j) \quad (42)$$

The separation constraint extracting module 12' determines $b_i \in M^{bb}(b_j)$ when the equation (16) is established to the block-pair ($b_i$, $b_j$) to which the separation constraint is imposed.

[Expression 36]

$$h_{ord}(b_i, b_j)=1, h_{ord}(b_j, b_i)=0 \quad (41)$$

The setting is stored to the binary relation file 7. Further, when the equation (19) is established to the block-pair ($b_i$, $b_j$) to which the separation constraint is imposed, the separation constraint extracting module 12' determines $b_i \in M^{ba}(b_j)$

[Expression 37]

$$v_{ord}(b_i, b_j)=1, v_{ord}(b_j, b_i)=0 \quad (42)$$

The setting is stored to the binary relation file 7.

Subsequently, in step S11, the vertical collinear constraint extracting module 13 and horizontal collinear constraint extracting module 14 extract the binary relations hard and $v_{ord}$ determined by the vertical collinear constraint and horizontal collinear constraint. The extracted binary relations $h_{ord}$ and $v_{ord}$ are stored to the binary relation file 7.

That is, the vertical collinear constraint extracting module 13 determines $b_i \in M^{ab}(b_j)$ when $y(b_i)<y(b_j)$ with respect to the block-pair ($b_i$, $b_j$) to which the vertical collinear constraint is imposed.

[Expression 38]

$$v_{ord}(b_i, b_j)=1, v_{ord}(b_j, b_i)=0 \quad (43)$$

The setting is stored to the binary relation file 7. Further, the horizontal collinear constraint extracting module 14 determines $b_i \in M^{bb}(b_j)$ when $x(b_i)<x(b_j)$ with respect to the block-pair ($b_i$, $b_j$) to which the horizontal collinear constraint is imposed.

[Expression 39]

$$h_{ord}(b_i, b_j)=1, h_{ord}(b_j, b_i)=0 \quad (44)$$

The setting is stored to the binary relation file 7.

Subsequently, in step S12, the horizontal symmetrical constraint extracting module 15 and vertical symmetrical constraint extracting module 16 extract the binary relations $h_{ord}$ and $v_{ord}$ determined by the horizontal symmetrical constraint and vertical symmetrical constraint. The extracted binary relations $h_{ord}$ and $v_{ord}$ are stored to the binary relation file 7.

That is, when $SYMM_H(b_i, b_j, b_k)$ is given with respect to blocks $b_i$, $b_j$, and $b_k$ ($x(b_i)<x(b_j)<x(b_k)$), the horizontal symmetrical constraint extracting module 15 determines $b_i \in M^{bb}(b_k)$

[Expression 40]

$$h_{ord}(b_i, b_k)=1, h_{ord}(b_k, b_i)=0 \quad (45)$$

The setting is stored to the binary relation file 7. Further, when $SYMM_V(b_i, b_j, b_k)$ is given with respect to the block $b_i$, $b_j$, and $b_k$ ($y(b_i)<y(b_j)<y(b_k)$), the vertical symmetrical constraint extracting module 16 determines $b_i \in M^{ab}(b_j)$.

[Expression 41]

$$v_{ord}(b_i, b_k)=1, v_{ord}(b_k, b_i)=0 \quad (46)$$

Equation (46) is set and is stored to the binary relation file 7.

Finally, in step S13, the binary relation transitively setting module 17 sets the fundamental binary relation that is transitively determined from among the fundamental binary relations of the block-pairs, to which the fundamental binary relation is not set yet, stored to the binary relation file 7, and stores the set fundamental binary relation to the binary relation file 7.

That is, both the left-and-right relation and the above-and-below relation are order relations and the transitivity is therefore established on the basis of the order principle. Hence, if setting the basic left-and-right relations of $h_{ord}(b_i, b_j)=1$ and $h_{ord}(b_j, b_k)=1$ with respect to the three blocks $b_i$, $b_j$, and $b_k$, relations of $h_{ord}(b_i, b_k)=1$ and $h_{ord}(b_k, b_i)=0$ are derived on the basis of the transitivity. As a consequence, the binary relation transitively setting module 17 transitively derives new basic left-and-right relation and basic above-and-below relation from the basic left-and-right relation and basic above-and-below relation stored in the binary relation file 7. Further, the derived new basic left-and-right relation and basic above-and-below relation are stored to the binary relation file 7.

[2-3] Temporary Binary Relation Setting Processing

Figure 14:
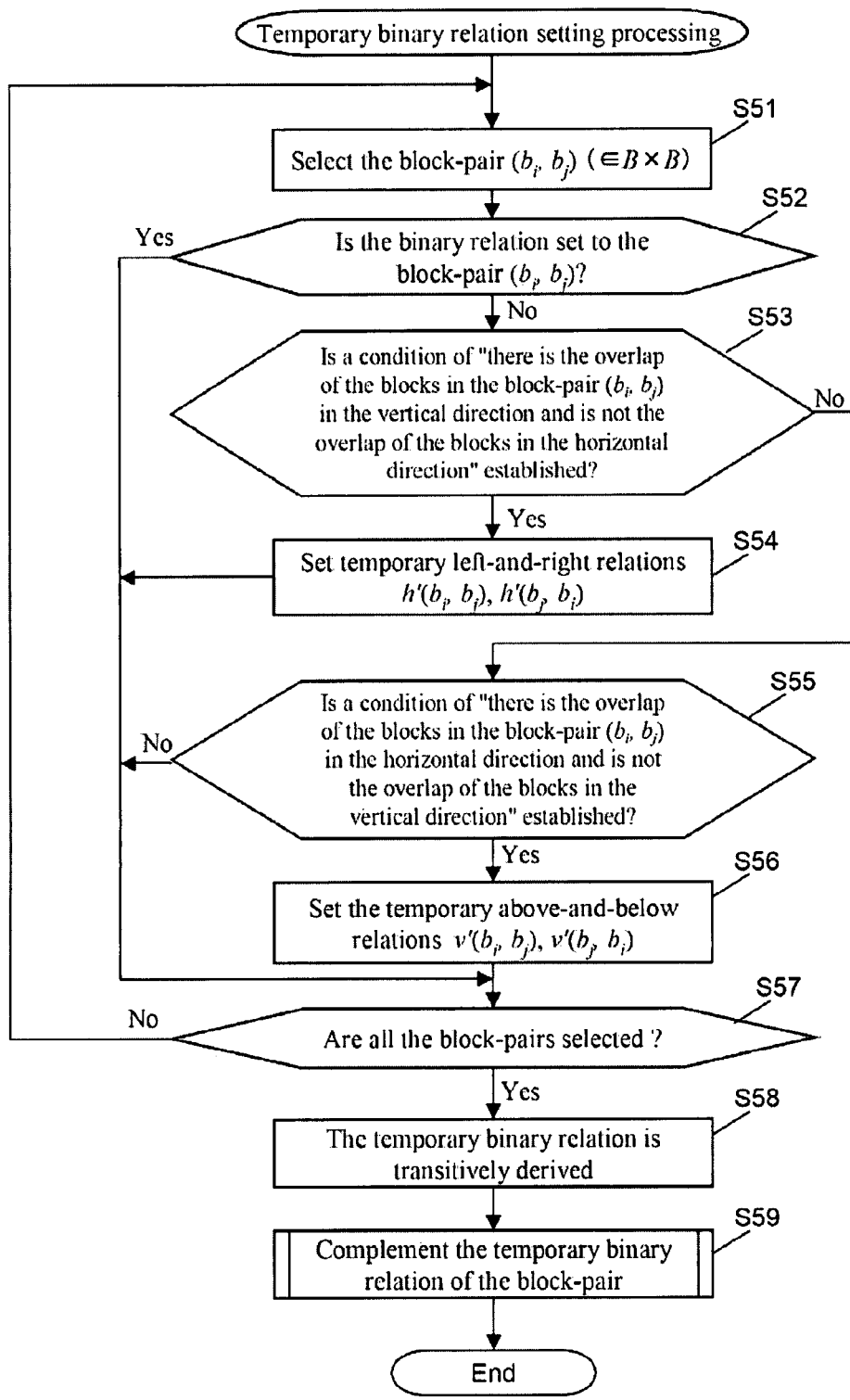
FIG. 14 is a flowchart showing temporary binary relation setting processing in step S43 in FIG. 13.

FIG. 14 is a flowchart showing the temporary binary relation setting processing in step S43 in FIG. 13.

First, in step S51, the temporary binary relation setting module 22 selects two non-selected blocks $b_i$ and $b_j$ from the blocks stored in the block placement file 5.

Subsequently, in step S52, the temporary binary relation setting module 22 checks whether or not the binary relation (fundamental binary relation or temporary binary relation) is set to the block-pair ($b_i$, $b_j$) by referring to the fundamental binary relation and temporary binary relation stored in the binary relation file 7. If the binary relation is set to the block-pair ($b_i$, $b_j$), the processing advances to step S57. Otherwise, the processing advances to step S53.

In step S53, the temporary left-and-right relation setting module 22a determines, by referring to the information of block placement and information of size of the blocks $b_i$ and $b_j$ stored in the block placement file 5, whether or not a condition of "there is the overlap of the blocks in the block-pair ($b_i$, $b_j$) in the vertical direction and is not the overlap of the blocks in the horizontal direction" is established. If it is determined that the condition is established, the processing advances to step S54. If it is determined that the condition is not established, the processing advances to step S55. Herein, "there is the overlap of the blocks in the block-pair ($b_i$, $b_j$) in the vertical direction is not the overlap in the horizontal direction" means a state of the block placement shown in FIG. 15A.

In step S54, the temporary left-and-right relation setting module 22a refers to positional coordinates (x($b_i$), y($b_i$)) and (x($b_j$), y($b_j$)) of the blocks $b_i$ and $b_j$, if x($b_i$)<x($b_j$), determines $b_i \in M^{bb}(b_j)$, sets h'$_{ord}$($b_i$, $b_j$)=1 and h'$_{ord}$($b_j$, $b_i$)=0, and stores the set relations to the binary relation file 7. Then, the processing shifts to step S57.

In step S55, the temporary above-and-below relation setting module 22b determines a condition of "there is the overlap of the blocks in the block-pair ($b_i$, $b_j$) in the horizontal direction and is not the overlap of the blocks in the vertical direction". If it is determined that the condition is established, the processing shifts to step S56. If it is determined that the condition is not established, the processing shifts to step S57. Herein, "there is the overlap of the blocks in the block-pair ($b_i$, $b_j$) in the horizontal direction and is not the overlap of the blocks in the vertical direction" means a state of the block placement shown in FIG. 15B.

In step S56, the temporary above-and-below relation setting module 22b refers to positional coordinates (x($b_i$), y($b_i$)) and (x($b_j$), y($b_j$)) of the blocks $b_i$ and $b_j$, if y($b_i$)<y($b_j$), determines $b_i \in M^{ab}(b_j)$, sets v'$_{ord}$($b_i$, $b_j$)=1 and v'$_{ord}$($b_j$, $b_i$)=0, and stores the set relations to the binary relation file 7. Then, the processing shifts to step S57.

In step S57, the processing returns to step S51 if there is the block-pair that is not selected. If all the block-pairs are selected, the processing shifts to step S58.

Subsequently, in step S58, the temporary binary relation transitively setting module 22c transitively derives the temporary binary relation that can be transitively derived to the block-pair to which the temporary binary relation is not set yet. Herein, the temporary binary relation is transitively derived similarly to the case in step S13.

Finally, in step S59, the temporary binary relation complementing module 22d complements the temporary binary relation of the block-pair to which the binary relation is not set yet and the temporary binary relation setting processing then ends. The temporary binary relation is complemented as follows.

Figure 16:
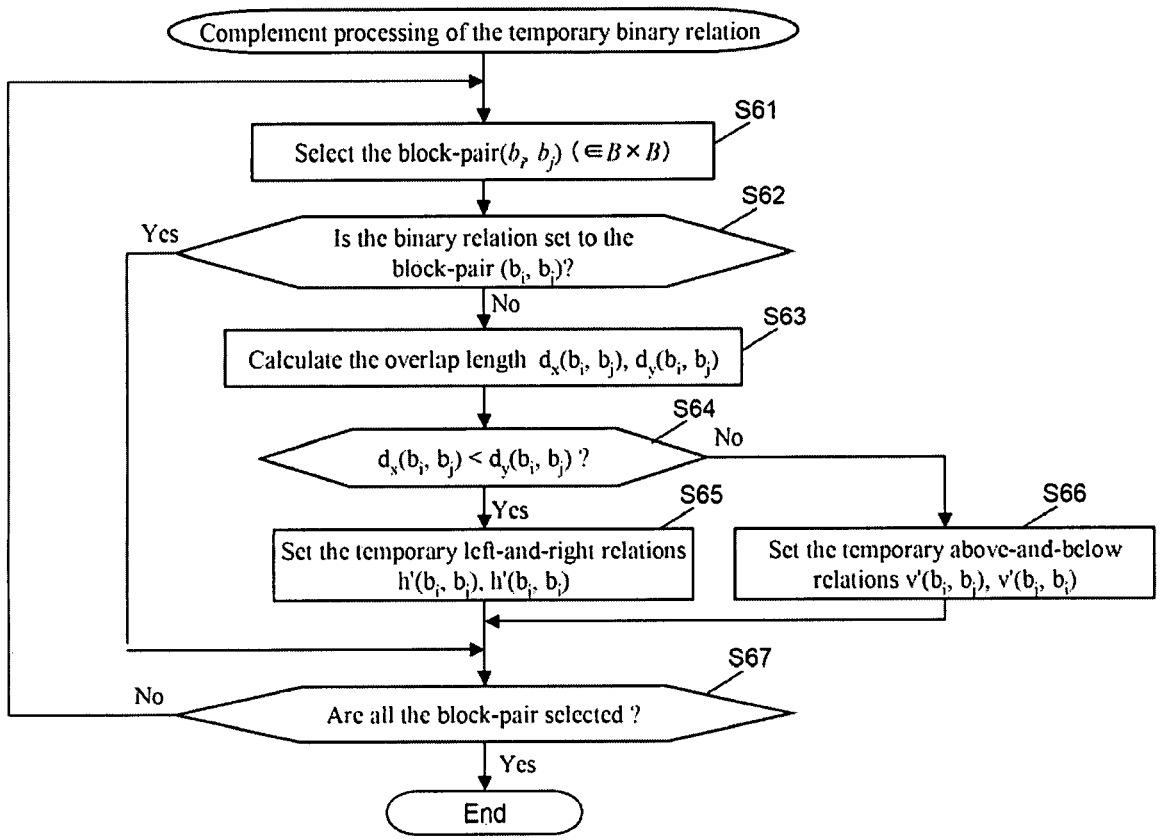
FIG. 16 is a flowchart of complementing processing of la temporary binary relation.

FIG. 16 is a flowchart of complementing processing of the temporary binary relation.

First, in step S61, the temporary binary relation complementing module 22d selects the two blocks $b_i$ and $b_j$ that are not selected yet from among the blocks stored in the block placement file 5.

Subsequently, in step S62, the temporary binary relation complementing module 22d checks whether or not the binary relation is set to the block-pair ($b_i$, $b_j$) by referring to the binary relation (fundamental binary relation or temporary binary relation) stored in the binary relation file 7. If it is determined that the binary relation is set to the block-pair ($b_i$, $b_j$), the processing shifts to step S67. If it is determined that the binary relation is not set yet, the processing shifts to step S63.

Subsequently, in step S63, the overlap length calculating module 21 calculates a length $d_x(b_i, b_j)$ of the overlap of the blocks $b_i$ and $b_j$ in the horizontal direction and a length $d_y(b_i, b_j)$ of the blocks $b_i$ and $b_j$ in the vertical direction by referring to the information of block placement and information of size stored in the block placement file 5.

Herein, "the overlap length in the horizontal direction" means the minimal distance among the movement distances, when two blocks are overlapped and then one block is moved in horizontal direction (right or left) to be overlapped to the other block. Further, "the overlap length in the vertical direction" means the minimal distance among the movement distances, when two blocks are overlapped and then one block is moved in the vertical direction (above or below) to be overlapped to the other block.

Figure 17:
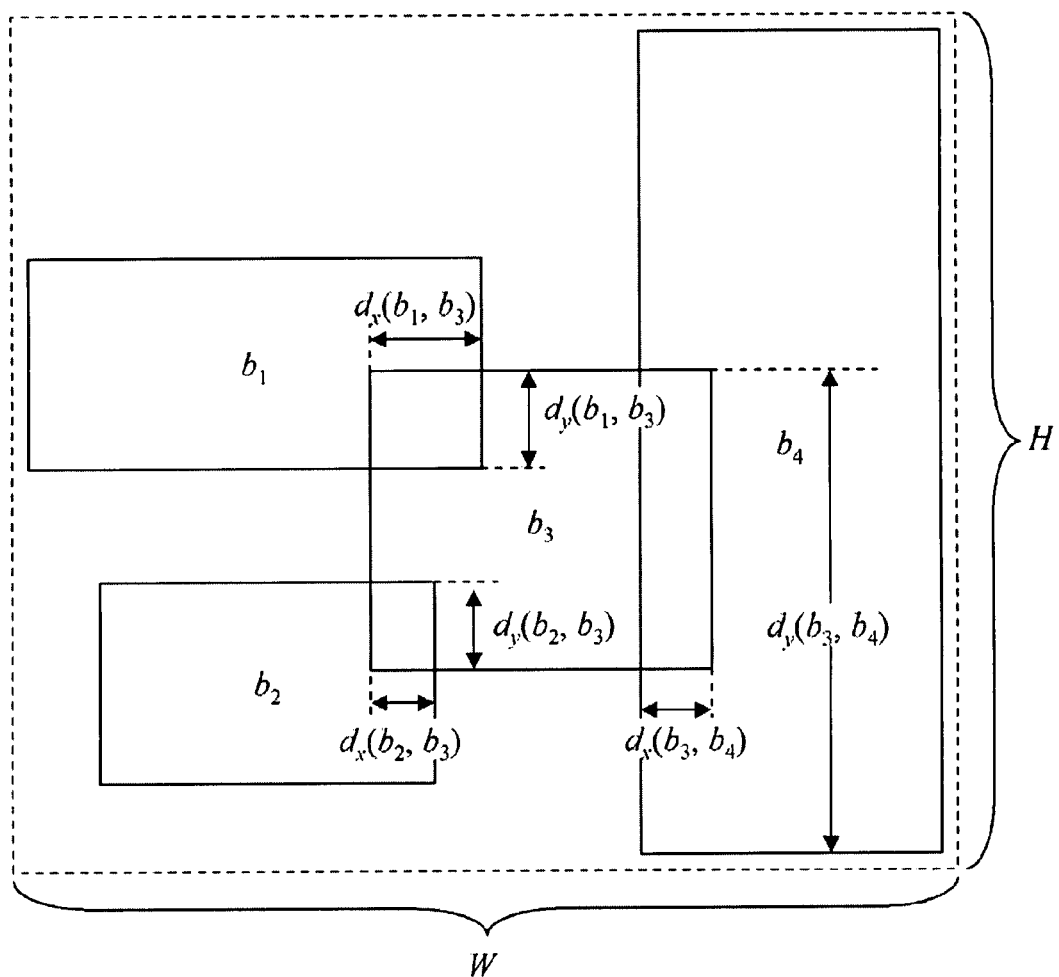
FIG. 17 is a diagram for illustrating the overlap length of a block-pair.

Referring to FIG. 17, block-pairs ($b_1$, $b_3$), ($b_2$, $b_3$), and ($b_3$, $b_4$) are overlapped in the horizontal direction and in the vertical direction. The lengths $d_x(b_1, b_3)$, $d_x(b_2, b_3)$, and $d_x(b_3, b_4)$ of the block-pairs in the horizontal direction and the lengths $d_y(b_1, b_3)$, $d_y(b_2, b_3)$, and $d_y(b_3, b_4)$ of the block-pairs in the vertical direction are as shown in FIG. 17.

Subsequently, in step S64, the temporary binary relation complementing module 22d determines whether or not the overlap length $d_x(b_i, b_j)$ of the blocks $b_i$ and $b_j$ in the horizontal direction is smaller than the overlap length $d_y(b_i, b_j)$ of the blocks $b_i$ and $b_j$ in the vertical direction (i.e., $d_x(b_i, b_j) < d_y(b_i, b_j)$).

If $d_x(b_i, b_j) < d_y(b_i, b_j)$, in step S65, the temporary binary relation complementing module 22d sets the temporary left-and-right relation h'$_{ord}$($b_i$, $b_j$) to the block-pair ($b_1$, $b_j$), and stores the set temporary left-and-right relation to the binary relation file 7. That is, the temporary binary relation complementing module 22d refers to coordinates (x($b_i$), y($b_i$)) and (x($b_j$), y($b_j$)) of the blocks $b_i$ and $b_j$, determines $b_i \in M^{bb}(b_j)$ if x($b_i$)<x($b_j$), and sets h'$_{ord}$($b_i$, $b_j$)=1 and h'$_{ord}$($b_j$, $b_i$)=0. If not x($b_i$)<x($b_j$), the temporary binary relation complementing module 22d determines $b_j \in M^{bb}(b_i)$ and sets relations of h'$_{ord}$($b_i$, $b_j$)=0 and h'$_{ord}$($b_j$, $b_i$)=1.

On the other hand, if $d_x(b_i, b_j) \geq d_y(b_i, b_j)$, in step S66, the temporary binary relation complementing module 22d sets the temporary above-and-below relation v'$_{ord}$($b_i$, $b_j$) to the block-pair ($b_i$, $b_j$), and stores the set temporary above-and-below relation to the binary relation file 7. That is, the temporary binary relation complementing module 22d refers to coordinates (x($b_i$), y($b_i$)) and (x($b_j$), y($b_j$)) of the blocks $b_i$ and $b_j$, determines $b_i \in M^{ab}(b_j)$ if y($b_i$)<y($b_j$), and sets v'$_{ord}$($b_i$, $b_j$)=1 and v'$_{ord}$($b_j$, $b_i$)=0. If not y($b_i$)<y($b_j$), the temporary binary relation complementing module 22d determines $b_j \in M^{ab}(b_i)$ and sets relations of v'$_{ord}$($b_i$, $b_j$)=0 and v'$_{ord}$($b_j$, $b_i$)=1.

Finally, in step S67, if there is a non-selected block-pair, the processing returns to step S61. If all the block-pair are selected, the complementing processing of the temporary binary relation ends.

The above-mentioned temporary binary relation setting processing sets the fundamental binary relation or temporary binary relation to all the block-pairs in the block-pair set B×B. The binary relations are stored to the binary relation file 7.

[2-4] Total Order Relation Fixing Processing

Finally, a description will be given of the total order relation fixing processing in step S44 in FIG. 13.

Figure 18:
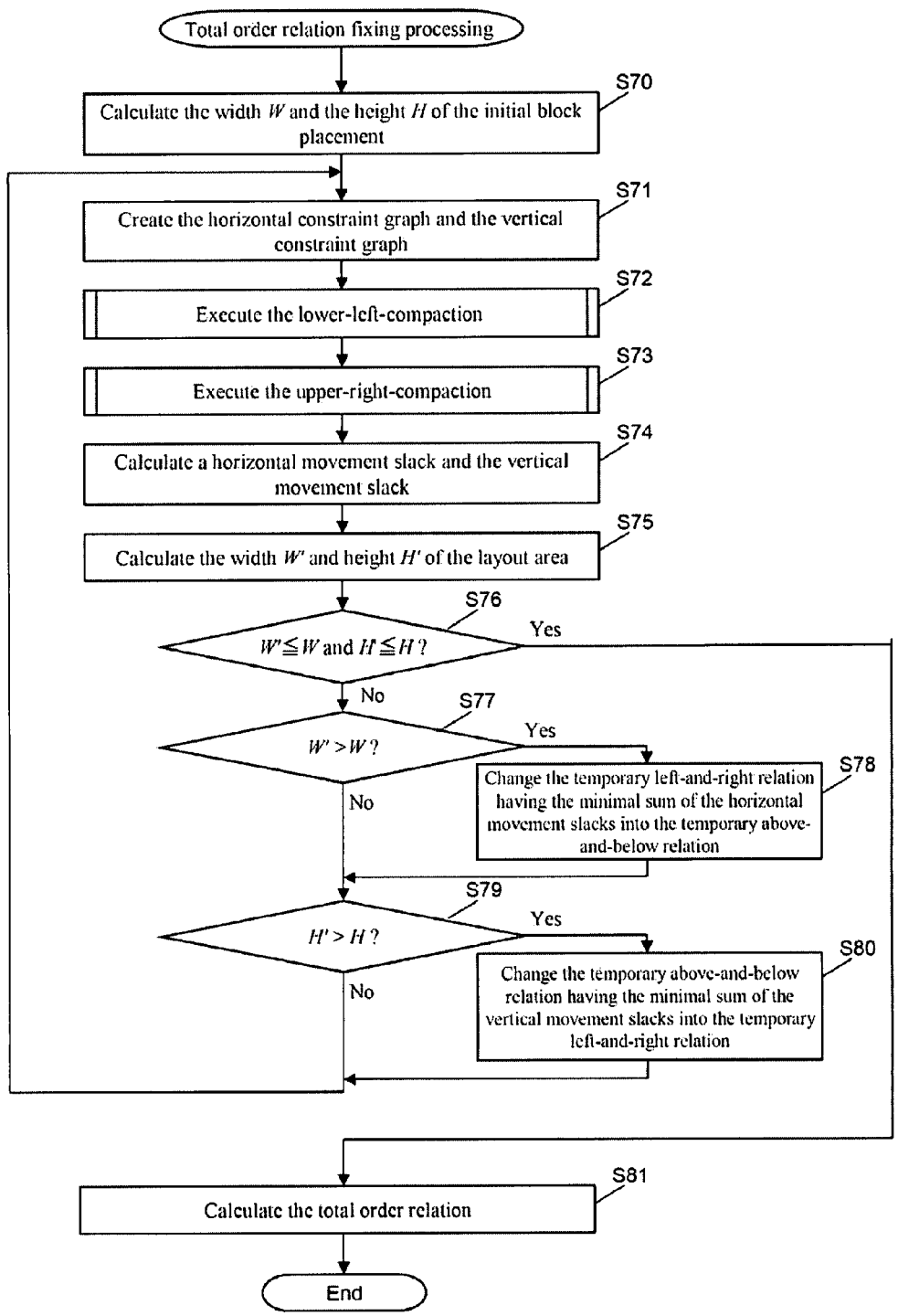
FIG. 18 is a flowchart of the total order relation fixing processing.

FIG. 18 is a flowchart of the total order relation fixing processing.

First, in step S70, the initial-layout-area size calculating module 23 calculates a width W and a height H of the initial block placement Φ on the basis of the information of block placement and information of size stored in the block placement file 5.

Subsequently, in step S71, the constraint graph creating module 24 creates the horizontal constraint graph on the basis of the left-and-right relation stored in the binary relation file 7. Further, the constraint graph creating module 24 further creates the vertical constraint graph on the basis of the above-and-below relation stored in the binary relation file 7. The created horizontal constraint graph and vertical constraint graph are stored to the constraint graph storing module 25.

Herein, the "horizontal constraint graph" is a digraph $G_H = (V, E_H, \Omega_H)$ defined by equation (37) (refer to FIG. 25A). The "vertical constraint graph" is a digraph $G_V = (V, E_V, \Omega_V)$ defined by equation (38) (refer to FIG. 25B).

The horizontal constraint graph can be created by the following processing.

(1) The vertexes corresponding to all blocks in the block set B are created. The vertex corresponding to the block $b_i$ ($\in B$) is set as i. Further, the source s and sink t are created as the vertexes.

(2) A weight $\omega$ (i) of the vertex i corresponding to the block $b_i$ ($\in B$) is set to the width $w(b_i)$ of the block $b_i$. Further, weights $\omega$ (s) and $\omega$ (t) of the source s and sink t are set as 0.

(3) The left-and-right relation (basic left-and-right relation or temporary left-and-right relation) is set to the block-pair $(b_i, b_j)$. If $h_{ord}(b_i, b_j)=1$ (or $h'_{ord}(b_i, b_j)=1$), a directed edge (i, j) from the vertex i to a vertex j is created. If $h_{ord}(b_j, b_i)=1$ (or $h'_{ord}(b_j, b_i)=1$), a directed edge (j, i) from the vertex j to the vertex i is created. This operation is performed to all the block-pairs in the block-pair set B×B.

(4) A directed edge (s, i) from the source s to the vertex i is created to the vertex i having an indegree 0. Further, a directed edge (i, t) from the vertex i to the sink t is created to the vertex i having an outdegree 0.

Herein, the "directed edge" means an edge connecting two vertexes, directed from one vertex (initial vertex) to the other vertex (terminal vertex). The "indegree" means the number of edges having one vertex as a terminal point. The "outdegree" means the number of edges having one vertex as an initial point.

Similarly, the vertical constraint graph can be created by the following processing.

(1') The vertexes corresponding to all blocks in the block set B are created. The vertex corresponding to the block $b_i$ ($\in B$) is designated by i. Further, the source s and sink t are created as the vertexes.

(2') A weight $\omega$ (i) of the vertex i corresponding to the block $b_i(\in B)$ is set to a height $h(b_i)$ of the block $b_i$. Further, weights $\omega$ (s) and $\omega$ (t) of the source s and sink t are set to 0.

(3') The above-and-below relation (basic above-and-below relation or temporary above-and-below relation) is set to the block-pair $(b_i, b_j)$. If $v_{ord}(b_i, b_j)=1$ (or $v'_{ord}(b_i, b_j)=1$), the directed edge (i, j) from the vertex i to vertex j is created. Further, if $v_{ord}(b_j, b_i)=1$ (or $v'_{ord}(b_j, b_i)=1$), the directed edge (j, i) from the vertex j to vertex i is created. This operation is performed to all block-pairs in the block-pair set B×B.

(4') The directed edge (s, i) from the source s to the vertex i is created to the vertex i having an indegree 0. Further, the directed edge (i, t) from the vertex i to sink t is created to the vertex i having an outdegree 0.

Subsequently, in step S72, the compaction executing module 26 performs the lower-left-compaction on the basis of the horizontal constraint graph and the vertical constraint graph stored in the constraint graph storing module 25, thereby creating the packing $\Pi_{lb}$. The lower-left-compaction processing will be described in detail later. The created packing $\Pi_{lb}$ is stored to the packing storing module 27.

Subsequently, in step S73, the compaction executing module 26 performs the upper-right-compaction on the basis of the horizontal constraint graph and the vertical constraint graph stored in the constraint graph storing module 25 and creates the packing $\Pi_{rt}$. The upper-right-compaction processing will be described in detail later. The created packing $\Pi_{rt}$ is stored to the packing storing module 27.

Subsequently, in step S74, the movement slack calculating module 28 calculates the difference between positional coordinates $(x_t(b_i), y_t(b_i))$ at the packing $\Pi_{rt}$ of the block $b_i$ ($\in B$) and positional coordinates $(x_b(b_i), y_b(b_i))$ at the packing $\Pi_{lb}$, and further calculates a horizontal movement slack $H_{slack}(b_i) = |x_t(b_i) - x_b(b_i)|$ and a vertical movement slack $V_{slack}(b_i) = |y_t(b_i) - y_b(b_i)|$.

Subsequently, in step S75, the current-layout-area size calculating module 29 calculates the width W' and height H' of the layout area at the packing $\Pi_{lb}$ on the basis of the packing $\Pi_{lb}$ stored in the packing storing module 27.

Subsequently, in step S76, the convergence determining module 30 compares the width W' of the layout area at the packing $\Pi_{lb}$ with the width W of the layout area at the initial block placement Φ, and determines whether or not W'≦W. Further, the convergence determining module 30 compares the height H' of the layout area at the packing $\Pi_{lb}$ with the height H of the layout area of the initial block placement Φ, and determines whether or not H'≦H. If W'≦W and H'≦H, the processing shifts to step S81. If not W'≦W and H'≦H, the processing shifts to step S77.

In step S77, the temporary binary relation changing module 31 determines whether or not W'>W. If W'>W, in step S78, the temporary binary relation changing module 31 extracts, from among the block-pairs $(b_i, b_j)$ ($\in B \times B$) in the block-pair set B×B, the block-pair having the set temporary left-and-right relation and the minimal one of the sum $H_{slack}(b_i) + H_{slack}(b_j)$ of the horizontal movement slacks between both the block. Further, the temporary left-and-right relation of the block-pair is changed into the temporary above-and-below relation.

For example, it is assumed that the block-pair $(b_i, b_j)$ is extracted. The temporary left-and-right relation $h'_{ord}(b_i, b_j)$ and $h'_{ord}(b_j, b_i)$ is set to the block-pair $(b_i, b_j)$. In this case, the temporary binary relation changing module 31 compares $y(b_i)$ with $y(b_j)$. If $y(b_i) < y(b_j)$, the temporary binary relation of the block-pair $(b_i, b_j)$ is changed into the temporary above-and-below relation as $v'_{ord}(b_i, b_j)=1$ and $v'_{ord}(b_j, b_i)=0$. If $y(b_i) \geq y(b_j)$, the temporary binary relation of the block-pair $(b_i, b_j)$ is changed into the temporary above-and-below relation as $v'_{ord}(b_i, b_j)=0$ and $v'_{ord}(b_j, b_i)=1$.

Subsequently, in step S79, the temporary binary relation changing module 31 determines whether or not H'>H. If H'>H, in step S80, the temporary binary relation changing module 31 extracts, from among the block-pairs $(b_i, b_j)$ ($\in B \times B$) in the block-pair set B×B, the block-pair having the set temporary above-and-below relation and the minimal one of the sum $V_{slack}(b_i) + V_{slack}(b_j)$ of the vertical movement slacks between both the blocks. Further, the temporary above-and-below relation of the block-pair is changed into the temporary left-and-right relation. Then, the processing returns to step S71.

If W'≦W and H'≦H in step S76, in step S81, the total order relation calculating means sets a series of ranks in the sequences P and M of all blocks on the basis of the packing $\Pi_{lb}$ stored in the packing storing module 27. Further, the created sequences P and M of the blocks are stored in the sequence-pair file 8. Incidentally, as a method for obtaining the sequence-pair (P, M) from the packing $\Pi_{lb}$, the method as described in [1] of "BACKGROUND OF THE INVENTION" in [Ref. 3] can be employed.

As mentioned above, the configuration constraint between the blocks is extracted as the binary relation, and the sequence-pair (P, M) is created to satisfy the binary relation.

Finally, a complementary description will be given of the lower-left-compaction processing and upper-right-compaction processing in steps S72 and S73.

Figure 19:
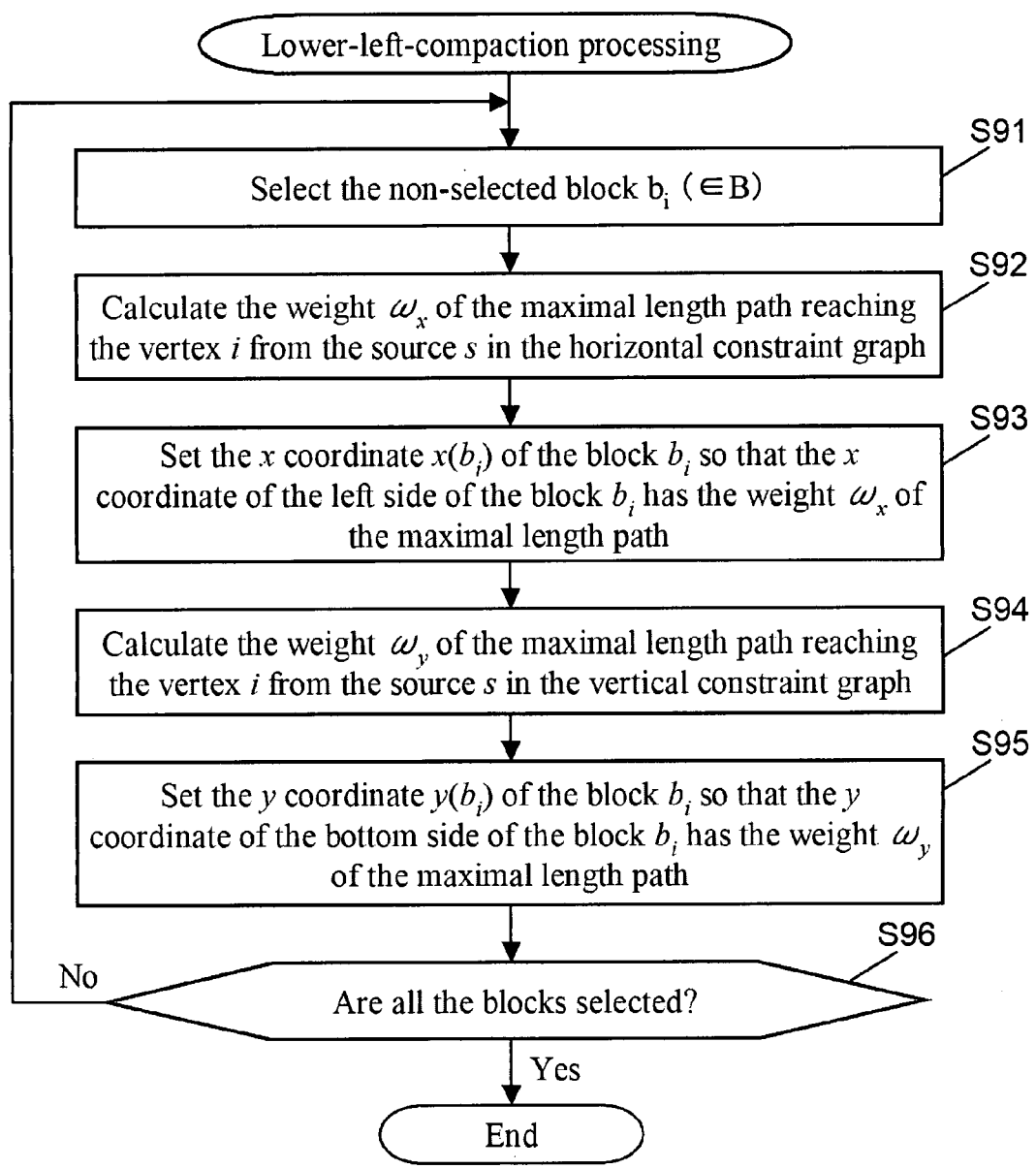
FIG. 19 is a flowchart of lower-left-compaction processing in step S72.

FIG. 19 is a flowchart showing the lower-left-compaction processing in step S72.

First, in step S91, the compaction executing module 26 selects the non-selected block $b_i$ from the blocks in the block set B.

Subsequently, in step S92, the compaction executing module 26 refers to the horizontal constraint graph $G_H$ stored in the constraint graph storing module 25, and calculates the weight of the path reaching the vertex i from the source s of the block $b_i$ in the horizontal constraint graph $G_H$. Herein, the "weight of the path" means the sum of weights of the vertexes (excluding the initial vertex and terminal vertex) in the halfway of the path. Further, the path having the maximal weight is referred to as a maximal length path from the source to the vertex i. The weight of the maximal length path is referred to as $\omega_x$.

Subsequently, in step S93, the compaction executing module 26 sets the x coordinate $x(b_i)$ of the block $b_i$ so that the x coordinate of the left side of the block $b_i$ has the weight $\omega_x$ of the maximal length path.

For example, when the positional coordinates of the block $b_i$ are the center of gravity of the block $b_i$, it is set that $x(b_i)=\omega_x+w(b_i)/2$. It is noted that $w(b_i)$ is a width of the block $b_i$. Further, the positional coordinates of the block $b_i$ are vertexes on the lower left of the block $b_i$, it is set that $x(b_i)=\omega_x$.

Subsequently, in step S94, the compaction executing module 26 refers to the vertical constraint graph $G_V$ stored in the constraint graph storing module 25 in the vertical constraint graph $G_V$, and calculates the weight of the path reaching the vertex i from the source s of the block $b_i$. Then, the path having the maximal weight thereof is a maximal length path from the source s to the vertex i. The weight of the maximal length path is referred to as $\omega_y$.

Subsequently, in step S95, the compaction executing module 26 sets the y coordinate $y(b_i)$ of the block $b_i$ so that the y coordinate of the bottom side of the block $b_i$ sets the weight $\omega y$ of the maximal length path.

Then, in step S96, if all the blocks in the block set B are not selected yet, the processing returns to step S91. After ending the selection of all the blocks, the lower-left-compaction processing ends.

The upper-right-compaction processing is performed similarly to the lower-left-compaction processing.

Figure 20:
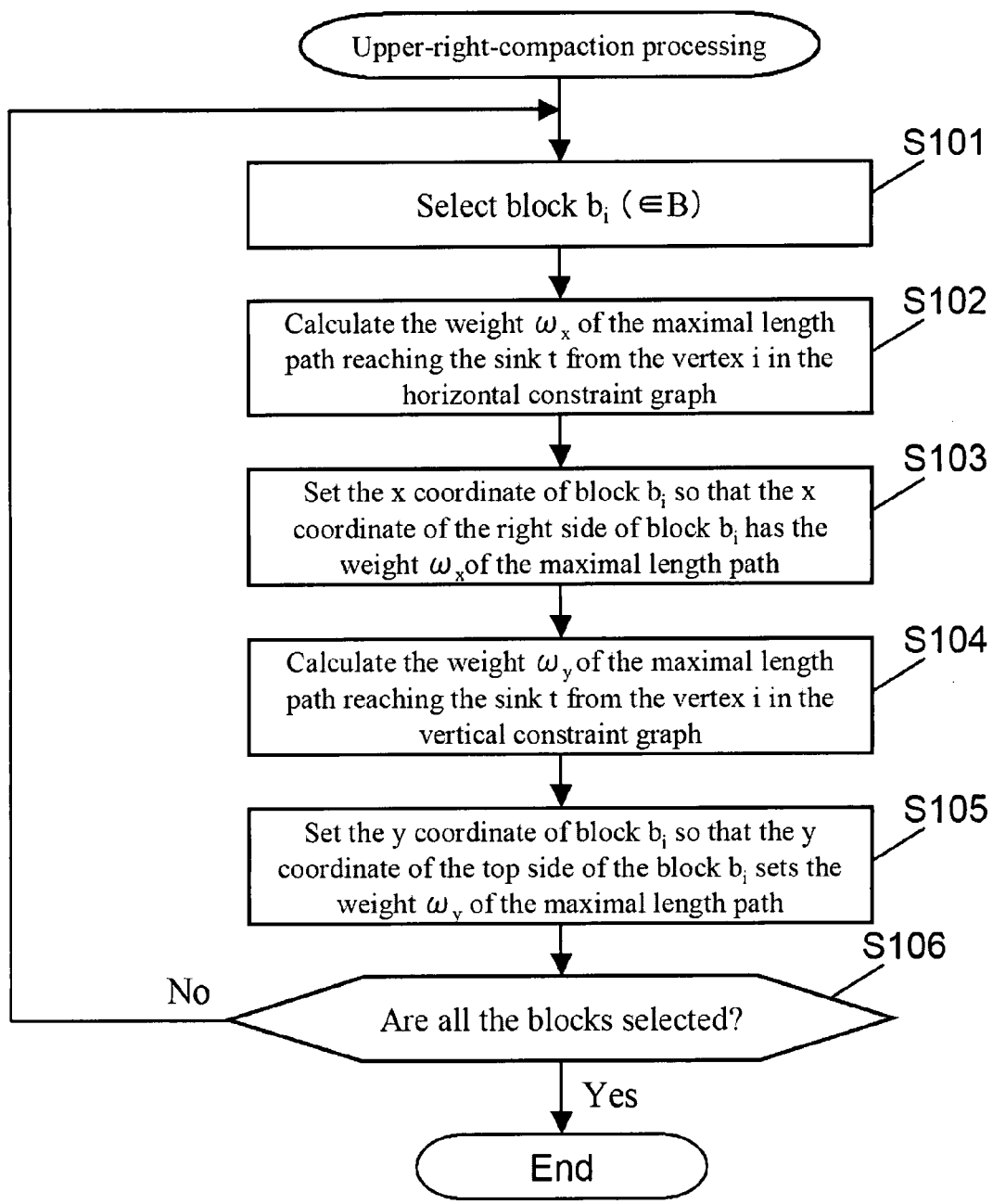
FIG. 20 is a flowchart of upper-right-compaction processing in step S73.
Figure 21:
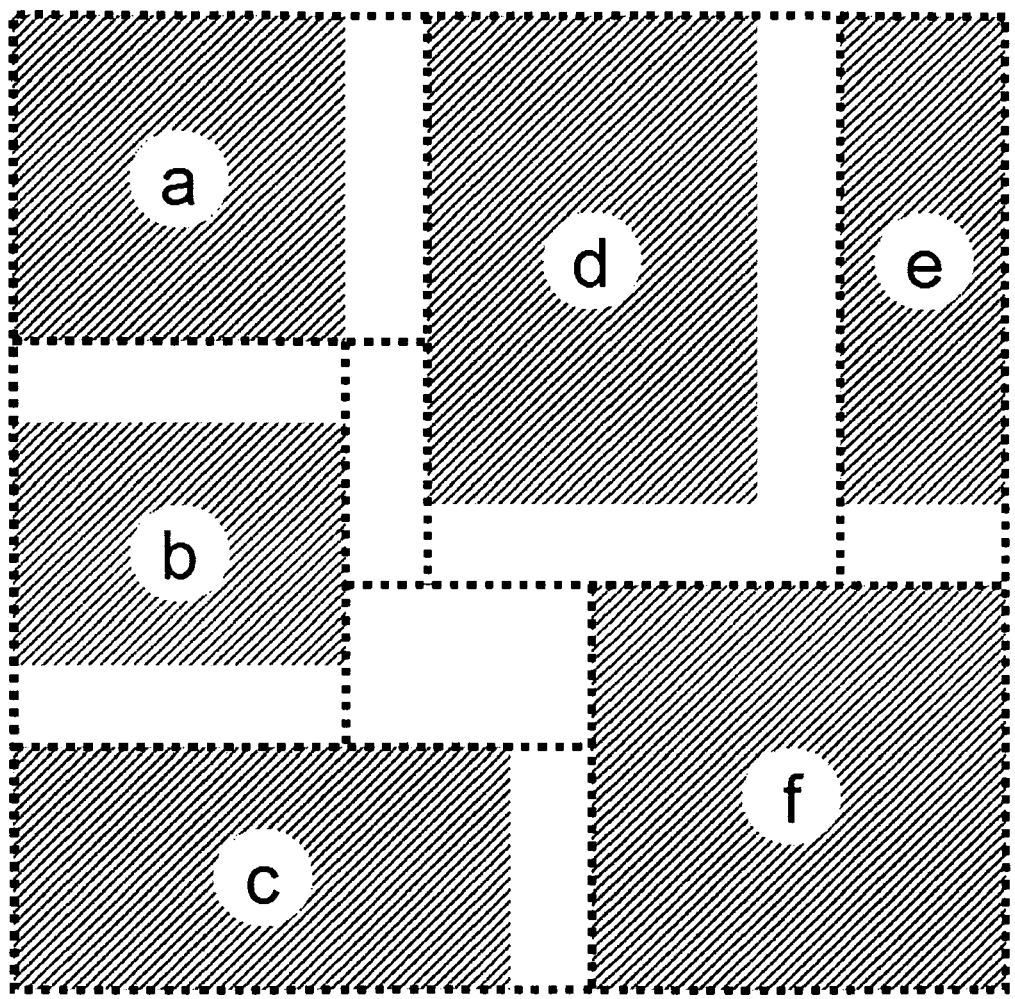
FIG. 21 is a diagram showing a floorplan of one packing Π in six blocks.
Figure 22:
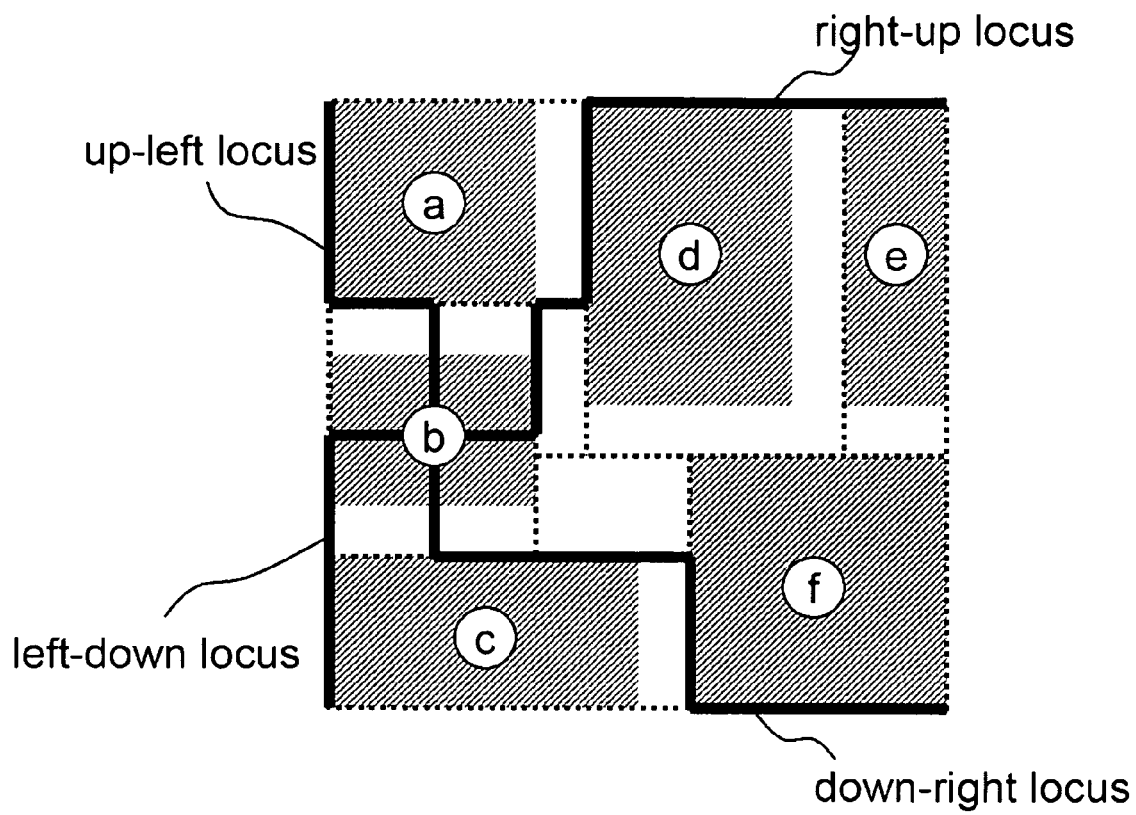
FIG. 22 is a diagram showing a right-up locus, an up-left locus, a left-down locus, and a down-right locus with respect to a block b in the packing Π shown in FIG. 21.
Figure 23:
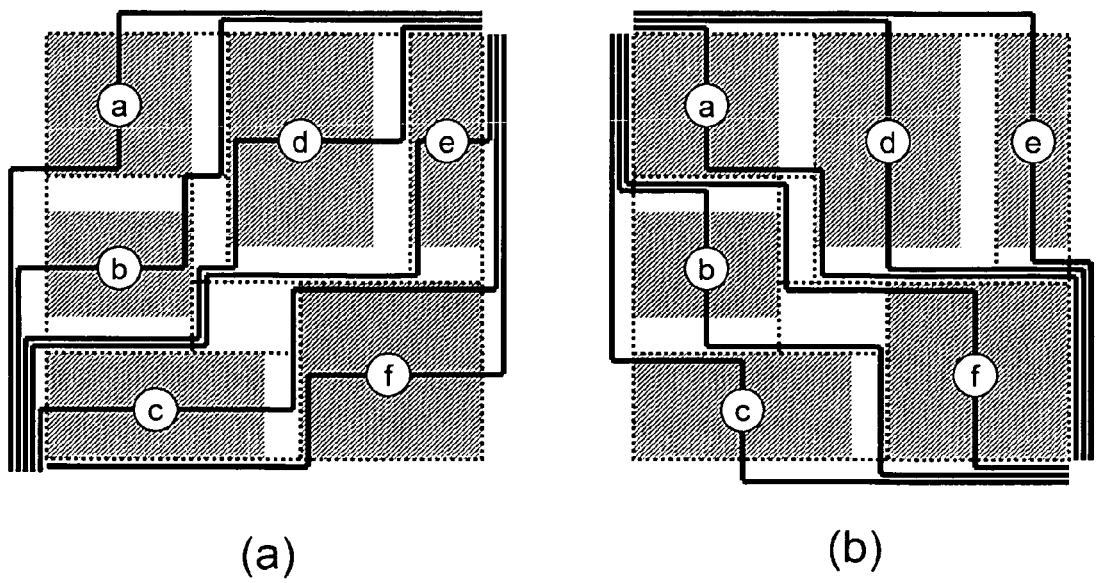
FIG. 23A is a diagram showing a positive locus and FIG. 23B is a diagram showing a negative locus with respect to the packing Π shown in FIG. 221.
Figure 24:
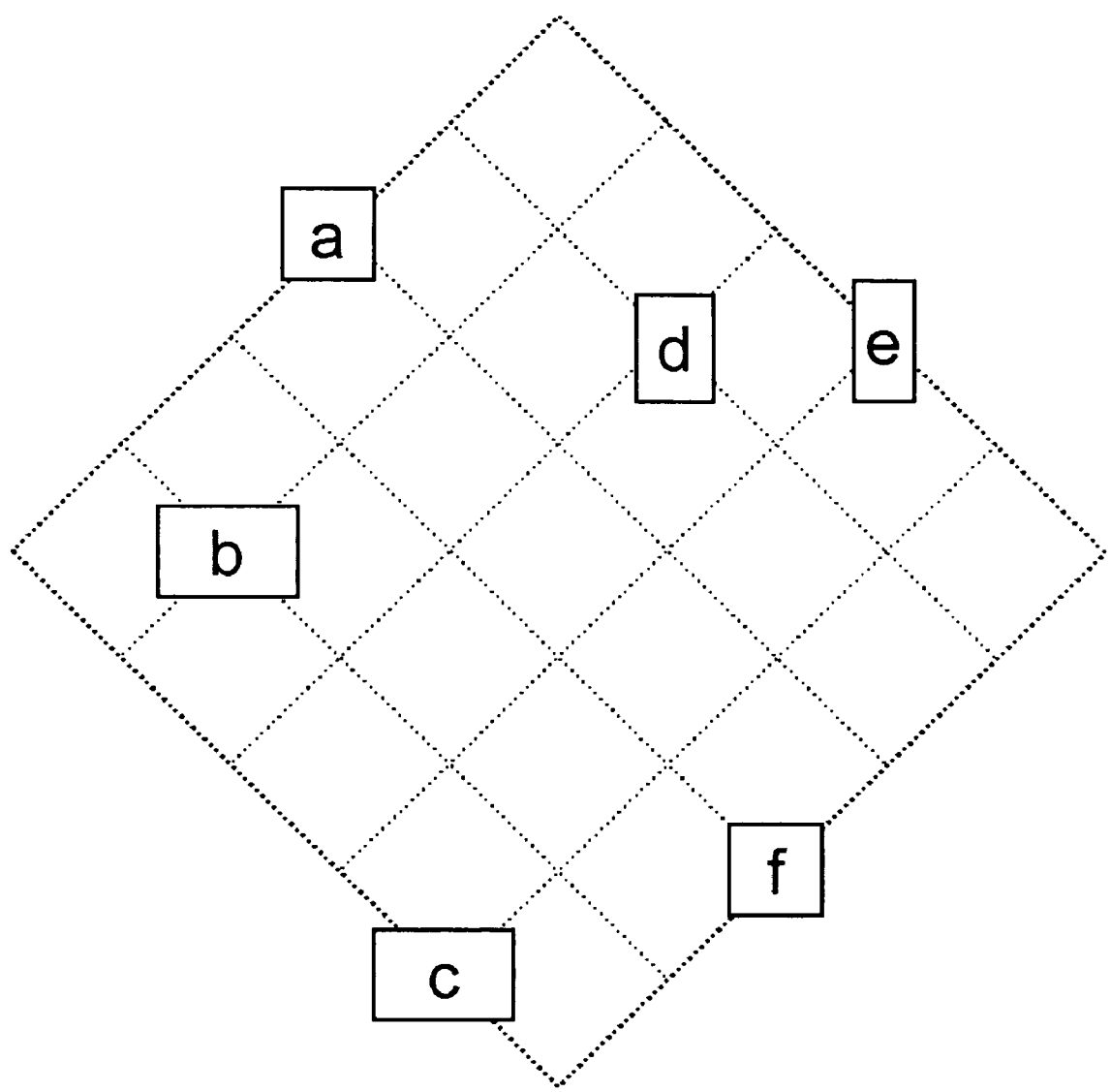
FIG. 24 is a diagram showing a (P, M) packing corresponding to (P, M)=(abdecf, cbfade)

FIG. 20 is a flowchart of the upper-right-compaction processing in step S73.

First, in step S101, the compaction executing module 26 selects the non-selected block $b_i$ from the blocks in the block set B.

Subsequently, in step S102, the compaction executing module 26 refers to the horizontal constraint graph $G_H$ stored in the constraint graph storing module 25, and calculates the weight of the path reaching the sink t from the vertex i of the block $b_i$ in the horizontal constraint graph $G_H$. Then, the path having the maximal weight is set as a maximal length path from the vertex i to the sink t. The weight of the maximal length path is referred to as $\omega_x$.

Subsequently, in step S103, the compaction executing module 26 sets the x coordinate $x(b_i)$ of the block $b_i$ so that the x coordinate of the right side of block $b_i$ sets the weight $\omega_x$ of the maximal length path.

For example, if the positional coordinates of the block $b_i$ are the center of gravity of the block $b_i$, it is set so that $x(b_i)=W'-(\omega_x+w(b_i)/2)$. It is noted that $w(b_i)$ denotes a width of the block $b_i$. Reference character W' denotes the width of the packing $\Pi_{lb}$. Further, if the positional coordinates of the block $b_i$ are the vertexes of the block $b_i$, it is set so that $x(b_i)=W'-(\omega_x+w(b_i))$.

Subsequently, in step S104, the compaction executing module 26 refers to vertical constraint graph $G_V$ stored in the constraint graph storing module 25, and calculates the weight of the path reaching the sink t from the vertex i of the block $b_i$ in the vertical constraint graph $G_V$. Then, the path having the maximal weight is set as a maximal length path from the vertex i to the sink t. The weight of the maximal length path is referred to as $\omega_y$.

Subsequently, in step S105, the compaction executing module 26 sets the y coordinate $y(b_i)$ of the block $b_i$ so that the y coordinate of the top side of the block $b_i$ sets the weight $\omega_y$ of the maximal length path.

In step S106, if all the blocks in the block set B are not selected yet, the processing returns to step S101. If all the blocks are selected, the lower-left-compaction processing ends.

The above-mentioned processing enables the lower-left-compaction and upper-right-compaction from the vertical constraint graph $G_H$ and vertical constraint graph $G_V$.

REFERENCES

[Ref. 1] Japanese Unexamined Patent Application Publication No. 9-108934

[Ref. 2] Japanese Unexamined Patent Application Publication No. 9-108933

[Ref. 3] H. Murata, K. Fujiyoshi, S. Nakatake, and Y. Kajitani, "VLSI module placement based on rectangle-packing by the sequence pair," IEEE Transaction on Computer Aided Design of Integrated Circuits and Systems, Vol. 15, No. 12, pp. 1518-1524, 1996.

[Ref. 4] Y. Kubo, S. Nakatake, Y. Kajitani, and M. Kawakita, "Explicit Expression and Simultaneous Optimization of Placement and Routing for Analog IC Layouts, "Proceedings of IEEE/ACM Asia South Pacific Design Automation Conference 2002, pp. 467-472, 2002.

What is claimed is:

1. A sequence-pair creating apparatus comprising block placement storing means that stores information of size serving as information of a weight $w(b_i)$ and a height $h(b_i)$ of a block $b_i$ ($b_i \in B$) in a set B of N ($\geq 2$) rectangle blocks (hereinafter, referred to as a "block set") having a width and a height, and information of block placement having positional coordinates $(x(b_i), y(b_i))$ of the block $b_i$ ($b_i \in B$) upon configuring all blocks in the block set B on a chip, the sequence-pair creating apparatus creating a sequence-pair (P, M), serving as a pair of a sequence P of the N blocks $b_i$ ($b_i \in B$) and a sequence M of the N blocks $b_i$ ($b_i \in B$) different from the sequence P, for uniquely specifying a positional relation between the blocks in the case of configuring all the blocks in the block set B on the chip without an overlap of the block, the sequence-pair creating apparatus comprising:

binary relation setting means that sets, in accordance with the information of block placement and information of size, a binary relation serving as an order relation that indicates a relative configuration between the blocks of a block pair ($b_i$, $b_j$) of two blocks $b_i$ and $b_j$ ($\in B$) and that is derived from a configuration constraint between the blocks extracted from the information of block placement and information of size or designated by an external input; and total order relation setting means that sets a series of ranks of the sequences P and M for all the blocks on the basis of the information of block placement and information of size so as to satisfy all binary relations set by the binary relation setting means.

2. The sequence-pair creating apparatus according to claim 1, wherein the binary relation setting means comprises separation constraint extracting means that, by referring to positional coordinates ($x(b_i)$, $y(b_i)$) and ($x(b_j)$, $y(b_j)$), widths $w(b_i)$ and $w(b_j)$, and heights $h(b_i)$ and $h(b_j)$ of the two blocks $b_i$ and $b_j$ ($\in B$) stored in the block placement storing means, sets the binary relation between the block $b_i$ and block $b_j$ in accordance with a left-and-right relation of the positional coordinates of the block $b_i$ and $b_j$ when the y coordinates of sides in the vertical direction (hereinafter, this is referred to as the y direction) do not have a clearance with a predetermined width not less than 0 and those in the horizontal direction (hereinafter, this is referred to as the x direction) of the block $b_i$ and block $b_j$ have a clearance with a predetermined width not less than 0, and further sets the binary relation between the block $b_i$ and block $b_j$ in accordance with an above-and-below relation between the positional coordinates of the blocks $b_i$ and $b_j$ when the x coordinates of sides in the x direction of the block $b_i$ and block $b_j$ do not have a clearance with a predetermined width not less than 0 and those in the y direction of the block $b_i$ and block $b_j$ have a clearance with a predetermined width not less than 0.

3. The sequence-pair creating apparatus according to claim 1, wherein the binary relation setting means comprises:

vertical collinear constraint extracting means that sets the binary relation between the two blocks $b_i$ and $b_j$ in a partial set $B_k$ ($\subseteq B$) of the block set B stored in the block placement storing means in accordance with an above-and-below relation between the positional coordinates of the block $b_i$ ($\in B_k$) upon imposing a configuration constraint (hereinafter, referred to as a "vertical collinear constraint") for aligning a left side or right side or representative points of the block $b_i$ ($\in B_k$) on a vertical line to the blocks in the partial set $B_k$.

4. The sequence-pair creating apparatus according to claim 1, wherein the binary relation setting means comprises:

horizontal collinear constraint extracting means that sets the binary relation between two blocks $b_i$ and $b_j$ in a partial set $B_k$ of the block set B stored in the block placement storing means in accordance with a left-and-right relation between positional coordinates the block $b_i$ ($\in B_k$) in the partial set $B_k$ when imposing a configuration constraint (hereinafter, referred to as a "horizontal collinear constraint") for aligning top sides or bottom sides or representative points of the blocks in the partial set $B_k$ on a horizontal line to the blocks in the partial set $B_k$.

5. The sequence-pair creating apparatus according to claim 1, wherein the binary relation setting means comprises:

horizontal symmetrical constraint extracting means that sets the binary relation in accordance with a left-and-right relation of the positional coordinates of both blocks $b_i$ and $b_k$ of three blocks $b_i$, $b_j$, and $b_k$ in the block set B stored in the block placement storing means upon configuration constraint (hereinafter, referred to as a "horizontal symmetrical constraint") for configuring the block $b_i$ and block $b_k$ at positions symmetrical to the block $b_j$ in the horizontal direction.

6. The sequence-pair creating apparatus according to claim 1, wherein the binary relation setting means comprises:

vertical symmetrical constraint extracting means that sets the binary relation in accordance with an above-and-below relation of the positional coordinates of both blocks $b_i$ and $b_k$ of three blocks $b_i$, $b_j$, and $b_k$ in the block set B stored in the block placement storing means when a configuration constraint (hereinafter, referred to as "vertical symmetrical constraint") for configuring the block $b_i$ and block $b_k$ at positions symmetrical to the block $b_j$ in the vertical direction.

7. The sequence-pair creating apparatus according to claim 1, wherein the binary relation setting means comprises:

binary relation transition setting means that transitively sets the binary relation between blocks $b_i$ and $b_k$ of three blocks $b_i$, $b_j$, and $b_k$ in the block set B from the binary relation between the blocks $b_i$ and $b_j$ and the binary relation between the blocks $b_j$ and $b_k$ when the binary relation between the blocks $b_i$ and $b_j$ and the binary relation between the blocks $b_j$ and $b_k$ are set and the binary relation between the blocks $b_i$ and $b_k$ is not set.

8. The sequence-pair creating apparatus according to claim 1, wherein the binary relation setting means sets, with respect to two blocks $b_i$ and $b_j$ in the block set B, a binary relation between the sequences P and M to $p_{ord}(b_i, b_j)=1$ and $m_{ord}(b_i, b_j)=1$ when the block $b_i$ is on the left of the block $b_j$ and further sets a binary relation between the sequences P and M to $p_{ord}(b_i, b_j)=0$ and $m_{ord}(b_i, b_j)=1$ when the block $b_i$ is below the block $b_j$, and the total order relation setting means comprises:

P-order setting means that sequentially sets ranks of the blocks at the sequence P from the left by repeating operation for extracting a block $b_i$ ($\in B_n$) in a set $B_n$ ($\subseteq B$) of blocks to which the rank is not set at the sequence P, having a binary order relation $p_{ord}(b_i, b_j)$ between the block $b_i$ ($\in B_n$) and all blocks $b_j$ ($\in B_n$) other than the block $b_i$ in the set $B_n$, which is not 1, and for setting the set of the extracted blocks as a set $B_s$ ($\subseteq B_n$) and operation for selecting the block $b_i$ in the set $B_s$ having the right side thereof that is on the left or at the collinear position of the left side of all blocks $b_j$ ($\in B_s$) other than the block $b_i$ in the set $B_s$ or having the bottom side thereof that is upper than the top side of the block $b_j$, and for aligning the selected block $b_i$ at the sequence P packing from the left; and M-order setting means that sequentially sets ranks of the blocks at the sequence M from the left by repeating operation for extracting a block $b_i$ ($\in B_m$) in a set $B_m$ ($\subseteq B$) of blocks to which the rank is not set at the sequence M, having a binary order relation $m_{ord}(b_i, b_j)$ between the block $b_i$ ($\in B_m$) and all blocks $b_j$ ($\in B_m$) other than the block $b_i$ in the set $B_m$, which is not 1, and for setting the set of the extracted blocks as a set $B_t$ ($\subseteq B_m$) and operation for selecting the block $b_i$ in the set $B_t$ having the right side of the block $b_i$ is on the left or at the collinear position of the left side of all the blocks $b_j$ ($\in B_t$) in the set $B_t$ other than the block $b_i$ or the bottom side of the block $b_i$ is upper than the top side of the block $b_j$, and for aligning the selected block $b_i$ at the sequence M packing from the left.

9. The sequence-pair creating apparatus according to claim 1, further comprising:
  overlap removing means that creates the information of block placement and information of size without an overlap of the blocks, upon overlapping the blocks in the block set B stored in the block placement storing means, by reducing the width or height of one or both of the two overlapped blocks,
  wherein the total order relation setting means sets a total order relation of the blocks at the sequences P and M in accordance with the information of block placement and information of size without the overlap of blocks created by the overlap removing means so as to satisfy the binary relation set by the binary relation setting means.

10. The sequence-pair creating apparatus according to claim 1, wherein the binary relation setting means sets a left-and-right relation serving as the binary relation for the horizontal direction and an above-and-below relation serving as the binary relation for the vertical direction from one of all block pairs of the blocks in the block set B, which is extracted from the block placement information and information of size or to which the configuration constraint between the blocks designated by the external input is imposed, on the basis of the configuration constraint, and further sets a left-and-right relation and an above-and-below relation which are transitively determined from the set left-and-right relation and above-and-below relation,
  the total order relation setting means comprises:
  temporary binary relation setting means that sets a temporary binary relation serving as a temporary left-and-right relation or above-and-below relation of a block pair ($b_k$, $b_l$) ($b_k$, $b_l \in B$) other than one of all the block pairs of the blocks in the block set B, which is related by the left-and-right relation or above-and-below relation (hereinafter, "fundamental binary relation") set by the binary relation setting means;
  initial layout area size calculating means that calculates a width W and a height H of a layout area of an initial block placement (hereinafter, referred to as an "initial block placement");
  constraint graph creating means that creates a horizontal constraint graph and a vertical constraint graph on the basis of the fundamental binary relation and the temporary binary relation;
  compaction executing means that executes upper-right-compaction or upper-left-compaction on the basis of both the horizontal constraint graph and vertical constraint graph created by the constraint graph creating means after the creation thereof and further executes lower-left-compaction or lower-right-compaction on the basis of both the horizontal constraint graph and vertical constraint graph;
  current layout area size calculating means that calculates a width W' and a height H' of a layout area of a minimum block placement (hereinafter, referred to as "current block placement") obtained as results of the compaction executed by the compaction executing means;
  convergence determining means that determines whether or not the width W' of the layout area is not more than the width W of the layout area of the initial block placement and whether or not the height H' of the layout area is not more than the height H of the layout area of the initial block placement;
  temporary binary relation changing means that changes one or a plurality of temporary binary relations for the horizontal direction into a temporary binary relation for the vertical direction and further changes one or a plurality of the temporary binary relations for the vertical direction into the temporary binary relation for the horizontal direction when the convergence determining means does not determine that the width W' and height H' of the layout area are not more than the width W and height H of the layout area of the initial block placement; and
  total order relation calculating means that sets a series of ranks of all the blocks at the sequences P and M on the basis of the current block placement when the convergence determining means determines that the width W' and height H' of the layout area are not more than the width W and height H of the layout area of the initial block placement, and
  the constraint graph creating means creates again a horizontal constraint graph and a vertical constraint graph, when the temporary binary relation changing means changes the temporary binary relation, on the basis of the changed temporary binary relation and fundamental binary relation.

11. The sequence-pair creating apparatus according to claim 10, wherein the total order relation setting means comprises:
  movement slack calculating means that calculates the difference $|x_t(b_i)-x_b(b_i)|$ (hereinafter, referred to as a "horizontal movement slack") between distances $x_t(b_i)$ and $x_b(b_i)$ of movement of the blocks $b_i$ ($b_i \in B$) as results of the compaction executed by the compaction executing means and the difference $|y_t(b_i)-y_b(b_i)|$ (hereinafter, referred to as a "vertical movement slack") between distances $y_t(b_i)$ and $y_b(b_i)$ of movement thereof, and
  the temporary binary relation changing means changes, when the convergence determining means does not determine that an area of the layout area is minimum, the temporary binary relation having the minimum sum of the horizontal movement slacks of both the blocks from among the temporary binary relations for the horizontal direction into the temporary binary relation for the vertical direction and further changes the temporary binary relation having the minimum sum of the vertical movement slacks of both the blocks from among the temporary binary relations for the vertical direction into the temporary binary relation for the horizontal direction.

12. The sequence-pair creating apparatus according to claim 10, wherein the total order relation setting means comprises:
  overlap length calculating means that calculates an overlap length $d_x(b_i, b_j)$ for the horizontal direction and an overlap length $d_y(b_i, b_j)$ for the vertical direction for a block pair ($b_i$, $b_j$) ($b_i$, $b_j \in B$) having overlapped blocks from among all the block pairs in a set B×B of the block pairs, and
  the temporary binary relation setting means comprises:
  temporary left-and-right relation setting means that sets the temporary binary relation for the horizontal direction between the block $b_k$ and the block $b_l$ in accordance with the left-and-right relation between horizontal positional coordinates $x(b_k)$ and $x(b_l)$ of the blocks $b_k$ and $b_l$ for the block pair with an overlap in the vertical direction and without an overlap in the horizontal direction of the block pairs ($b_k$, $b_l$) to which the fundamental binary relation is not set;
  temporary above-and-below relation setting means that sets the temporary binary relation for the vertical direction between the block $b_k$ and the block $b_l$ in accordance with an above-and-below relation between vertical positional coordinates $y(b_k)$ and $y(b_l)$ of the blocks $b_k$ and $b_l$ for the block pair with the overlap in the horizontal direction and without the overlap in the vertical direction of the block pairs ($b_k$, $b_l$) to which the fundamental binary relation is not set;

temporary binary relation transition setting means that sets a temporary binary relation transitively determined from the temporary binary relations set by the temporary left-and-right relation setting means and the temporary above-and-below relation setting means and the fundamental binary relations; and temporary binary relation complementing means that sets, with respect to the block pair ($b_i$, $b_j$) to which neither the fundamental binary relation nor the temporary binary relation is set, the temporary binary relation for the horizontal direction between the block $b_i$ and the block $b_j$ in accordance with the left-and-right relation between the horizontal positional coordinates $x(b_i)$ and $x(b_j)$ of the blocks $b_i$ and $b_j$ when the overlap length $d_x(b_i, b_j)$ for the vertical direction is shorter than the overlap length $d_y(b_i, b_j)$ for the vertical direction and, in the case except for the time, further sets the temporary binary relation for the vertical direction between the block $b_i$ and the block $b_j$ in accordance with an above-and-below relation between the vertical positional coordinates $y(b_i)$ and $y(b_j)$ of the blocks $b_i$ and $b_j$.

13. A sequence-pair creating method for, on the basis of information of size serving as information of a weight $w(b_i)$ and a height $h(b_i)$ of a block $b_i$ ($b_i \in B$) in a set B of N ($\geqq 2$) rectangle blocks (hereinafter, referred to as a "block set") having a shape, and information of block placement having positional coordinates ($x(b_i)$, $y(b_i)$) of the block $b_i$ ($b_i \in B$) upon configuring all blocks in the block set B on a chip, creating a sequence-pair (P, M), serving as a pair of a sequence P of the N blocks $b_i$ ($b_i \in (B)$ and a sequence M of the N blocks $b_i$ ($b_i \in B$) different from the sequence P, for uniquely specifying a positional relation between the blocks in the case of configuring all the blocks in the block set B on the chip without an overlap of the blocks, the sequence-pair creating method comprising:

a binary relation setting step of setting by a computer, in accordance with the information of block placement and information of size, a binary relation serving as an order relation that indicates a relative configuration between the blocks of a block pair ($b_i$, $b_j$) of two blocks $b_i$ and $b_j$ ($\in B$) and that is derived from a configuration constraint between the blocks extracted from the information of block placement and information of size or designated by an external input; and a total order relation setting step of setting a series of ranks of the sequences P and M for all the blocks on the basis of the information of block placement and information of size so as to satisfy all binary relations set by the binary relation setting step.

14. The sequence-pair creating method according to claim 13, wherein the binary relation setting step comprises an separation constraint extracting step of, by referring to positional coordinates ($x(b_i)$, $y(b_i)$) and ($x(b_j)$, $y(b_j)$), widths $w(b_i)$ and $w(b_j)$, and heights $h(b_i)$ and $h(b_j)$ of the two blocks $b_i$ and $b_j$ ($\in B$) in the block set B, setting the binary relation between the block $b_i$ and block $b_j$ in accordance with a left-and-right relation of the positional coordinates of the block $b_i$ and $b_j$ when the y coordinates of sides in the vertical direction (hereinafter, this is referred to as the y direction) do not have a clearance with a predetermined width not less than 0 and those in the horizontal direction (hereinafter, this is referred to as the x direction) of the block $b_i$ and block $b_j$ have a clearance with a predetermined width not less than 0, and further setting the binary relation between the block $b_i$ and block $b_j$ in accordance with an above-and-below relation between the positional coordinates of the blocks $b_i$ and $b_j$ when the x coordinates of sides in the x direction of the block $b_i$ and block $b_j$ do not have a clearance with a predetermined width not less than 0 and those in the y direction of the block $b_i$ and block $b_j$ have a clearance with a predetermined width not less than 0.

15. The sequence-pair creating method according to claim 13, wherein the binary relation setting step comprises:

a vertical collinear constraint extracting step of setting the binary relation between the two blocks $b_i$ and $b_j$ in a partial set $B_k$ ($\subseteq B$) of the block set B in accordance with an above-and-below relation between the positional coordinates of the block $b_i$ ($\in B_k$) upon imposing a configuration constraint (hereinafter, referred to as a "vertical collinear constraint") for aligning a left side or right side or representative points of the block $b_i$ ($\in B_k$) on a vertical line to the blocks in the partial set $B_k$.

16. The sequence-pair creating method according to claim 13, wherein the binary relation setting step comprises:

a horizontal collinear constraint extracting step of setting the binary relation between two blocks $b_i$ and $b_j$ in a partial set $B_k$ of the block set B in accordance with a left-and-right relation between positional coordinates the block $b_i$ ($\in B_k$) in the partial set $B_k$ when imposing a configuration constraint (hereinafter, referred to as a "horizontal collinear constraint") for aligning top sides or bottom sides or representative points of the blocks in the partial set $B_k$ on a horizontal line to the blocks in the partial set $B_k$.

17. The sequence-pair creating method according to claim 13, wherein the binary relation setting step comprises:

a horizontal symmetrical constraint extracting step of setting the binary relation in accordance with a left-and-right relation of the positional coordinates of both blocks $b_i$ and $b_k$ of three blocks $b_i$, $b_j$, and $b_k$ in the block set B upon configuration constraint (hereinafter, referred to as a "horizontal symmetrical constraint") for configuring the block $b_i$ and block $b_k$ at positions symmetrical to the block $b_j$ in the horizontal direction.

18. The sequence-pair creating method according to claim 13, wherein the binary relation setting step comprises:

a vertical symmetrical constraint extracting step of setting the binary relation in accordance with an above-and-below relation of the positional coordinates of both blocks $b_i$ and $b_k$ of three blocks $b_i$, $b_j$, and $b_k$ in the block set B when a configuration constraint (hereinafter, referred to as "vertical symmetrical constraint") for configuring the block $b_i$ and block $b_k$ at positions symmetrical to the block $b_j$ in the vertical direction.

19. The sequence-pair creating method according to claim 13, wherein the binary relation setting step comprises:

a binary relation transition setting step of transitively setting the binary relation between blocks $b_i$ and $b_k$ of three blocks $b_i$, $b_j$, and $b_k$ in the block set B from the binary relation between the blocks $b_i$ and $b_j$ and the binary relation between the blocks $b_j$ and $b_k$ when the binary relation between the blocks $b_i$ and $b_j$ and the binary relation between the blocks $b_j$ and $b_k$ are set and the binary relation between the blocks $b_i$ and $b_k$ is not set.

20. The sequence-pair creating method according to claim 13, wherein the binary relation setting step sets, with respect to two blocks $b_i$ and $b_j$ in the block set B, a binary relation between the sequences P and M to $p_{ord}(b_i, b_j)=1$ and $m_{ord}(b_i, b_j)=1$ when the block $b_i$ is on the left of the block $b_j$ and further sets a binary relation between the sequences P and M to $p_{ord}(b_i, b_j)=0$ and $m_{ord}(b_i, b_j)=1$ when the block $b_i$ is below the block $b_j$, and the total order relation setting step comprises:

a P-order setting step of sequentially setting ranks of the blocks at the sequence P from the left by repeating operation for extracting a block $b_i$ ($\in B_n$) in a set $B_n$ ($\subseteq B$) of blocks to which the rank is not set at the sequence P, having a binary order relation $p_{ord}(b_i, b_j)$ between the block $b_i$ ($\in B_n$) and all blocks $b_j$ ($\in B_n$) other than the block $b_i$ in the set $B_n$, which is not 1, and for setting the set of the extracted blocks as a set $B_s$ ($\subseteq B_n$) and operation for selecting the block $b_i$ in the set $B_s$ having the right side thereof that is on the left or at the collinear position of the left side of all blocks $b_j$ ($\in B_s$) other than the block $b_i$ in the set $B_s$ or having the bottom side thereof that is upper than the top side of the block $b_j$, and for aligning the selected block $b_i$ at the sequence P packing from the left; and an M-order setting step of sequentially setting ranks of the blocks at the sequence M from the left by repeating operation for extracting a block $b_i$ ($\in B_m$) in a set $B_m$ ($\subseteq B$) of blocks to which the rank is not set at the sequence M, having a binary order relation $m_{ord}(b_i, b_j)$ between the block $b_i$ ($\in B_m$) and all blocks $b_j$ ($\in B_m$) other than the block $b_i$ in the set $B_m$, which is not 1, and for setting the set of the extracted blocks as a set $B_t$ ($\subseteq B_m$) and operation for selecting the block $b_i$ in the set $B_t$ having the right side of the block $b_i$ is on the left or at the collinear position of the left side of all blocks $b_j$ ($\in B_t$) in the set $B_t$ other than the block $b_i$ or the bottom side of the block $b_i$ is upper than the top side of the block $b_j$, and for aligning the selected block $b_i$ at the sequence M packing from the left.

21. The sequence-pair creating method according to claim 13, further comprising:

an overlap removing step of creating the information of block placement and information of size without the overlap of the blocks, upon overlapping the blocks in the block set B, by reducing the width or height of one or both of the two overlapped blocks, wherein the total order relation setting step sets a total order relation of the blocks at the sequences P and M in accordance with the information of block placement and information of size without the overlap of the blocks created by the overlap removing step so as to satisfy the binary relation set by the binary relation setting step.

22. The sequence-pair creating method according to claim 13, wherein the binary relation setting step sets a left-and-right relation serving as the binary relation for the horizontal direction and an above-and-below relation serving as the binary relation for the vertical direction from one of all block pairs of the blocks in the block set B, which is extracted from the block placement information and information of size or to which the configuration constraint between the blocks designated by the external input is imposed, on the basis of the configuration constraint, and further sets a left-and-right relation and an above-and-below relation which are transitively determined from the set left-and-right relation and above-and-below relation, the total order relation setting step comprises:

a temporary binary relation setting step of setting a temporary binary relation serving as a temporary left-and-right relation or above-and-below relation of a block pair ($b_k$, $b_l$) ($b_k$, $b_l \in B$) other than one of all the block pairs of the blocks in the block set B, which is related by the left-and-right relation or above-and-below relation (hereinafter, "fundamental binary relation") set by the binary relation setting step;

an initial layout area size calculating step of calculating a width W and a height H of a layout area of an initial block placement (hereinafter, referred to as an "initial block placement");

a constraint graph creating step of creating a horizontal constraint graph and a vertical constraint graph on the basis of the fundamental binary relation and the temporary binary relation;

a compaction executing step of executing upper-right-compaction or upper-left-compaction on the basis of both the horizontal constraint graph and vertical constraint graph created by the constraint graph creating step after the creation thereof and further executing lower-left-compaction or lower-right-compaction on the basis of both the horizontal constraint graph and vertical constraint graph;

a current layout area size calculating step of calculating a width W' and a height H' of a layout area of a minimum block placement (hereinafter, referred to as "current block placement") obtained as results of the compaction executed by the compaction executing step;

a convergence determining step of determining whether or not the width W' of the layout area is not more than the width W of the layout area of the initial block placement and whether or not the height H' of the layout area is not more than the height H of the layout area of the initial block placement;

a temporary binary relation changing step of changing one or a plurality of temporary binary relations for the horizontal direction into a temporary binary relation for the vertical direction and further changing one or a plurality of the temporary binary relations for the vertical direction into the temporary binary relation for the horizontal direction when the convergence determining step does not determine that the width W' and height H' of the layout area are not more than the width W and height H of the layout area of the initial block placement; and a total order relation calculating step of setting a series of ranks of all the blocks at the sequences P and M on the basis of the current block placement when the convergence determining step determines that the width W' and height H' of the layout area are not more than the width W and height H of the layout area of the initial block placement, and the constraint graph creating step creates again a horizontal constraint graph and a vertical constraint graph, when the temporary binary relation changing step changes the temporary binary relation, on the basis of the changed temporary binary relation and fundamental binary relation.

23. The sequence-pair creating method according to claim 22, wherein the total order relation setting step comprises:

a movement slack calculating step of calculating the difference $|x_t(b_i)-x_b(b_i)|$ (hereinafter, referred to as a "horizontal movement slack") between distances $x_t(b_i)$ and $x_b(b_i)$ of movement of the blocks $b_i$ ($b_i \in B$) as results of the compaction executed by the compaction executing step and the difference $|y_t(b_i)-y_b(b_i)|$ (hereinafter, referred to as a "vertical movement slack") between distances $y_t(b_i)$ and $y_b(b_i)$ of movement thereof, and the temporary binary relation changing step changes, when the convergence determining step does not determine that an area of the layout area is minimum, the temporary binary relation having the minimum sum of the horizontal movement slacks of both the blocks from among the temporary binary relations for the horizontal direction into the temporary binary relation for the vertical direction and further changes the temporary binary relation having the minimum sum of the vertical movement slacks of both the blocks from among the temporary binary relations for the vertical direction into the temporary binary relation for the horizontal direction.

24. The sequence-pair creating method according to claim 22, wherein the total order relation setting step comprises:

an overlap length calculating step of calculating an overlap length $d_x(b_i, b_j)$ for the horizontal direction and an overlap length $d_y(b_i, b_j)$ for the vertical direction for a block pair $(b_i, b_j)$ $(b_i, b_j \in B)$ having overlapped blocks from among all the block pairs in a set B×B of the block pairs, and the temporary binary relation setting step comprises:

a temporary left-and-right relation setting step of setting the temporary binary relation for the horizontal direction between the block $b_k$ and the block $b_l$ in accordance with the left-and-right relation between horizontal positional coordinates $x(b_k)$ and $x(b_l)$ of the blocks $b_k$ and $b_l$ for the block pair with an overlap in the vertical direction and without an overlap in the horizontal direction of the block pairs $(b_k, b_l)$ to which the fundamental binary relation is not set;

a temporary above-and-below relation setting step of setting the temporary binary relation for the vertical direction between the block $b_k$ and the block $b_l$ in accordance with an above-and-below relation between vertical positional coordinates $y(b_k)$ and $y(b_l)$ of the blocks $b_k$ and $b_l$ for the block pair with the overlap in the horizontal direction and without the overlap in the vertical direction of the block pairs $(b_k, b_l)$ to which the fundamental binary relation is not set;

a temporary binary relation transition setting step of setting a temporary binary relation transitively determined from the temporary binary relations set by the temporary left-and-right relation setting step and the temporary above-and-below relation setting step and the fundamental binary relations; and a temporary binary relation complementing step of setting, with respect to the block pair $(b_i, b_j)$ to which neither the fundamental binary relation nor the temporary binary relation is set, the temporary binary relation for the horizontal direction between the block $b_i$ and the block $b_j$ in accordance with the left-and-right relation between the horizontal positional coordinates $x(b_i)$ and $x(b_j)$ of the blocks $b_i$ and $b_j$ when the overlap length $d_x(b_i, b_j)$ for the vertical direction is shorter than the overlap length $d_y(b_i, b_j)$ for the vertical direction and, in the case except for the time, further setting the temporary binary relation for the vertical direction between the block $b_i$ and the block $b_j$ in accordance with an above-and-below relation between the vertical positional coordinates $y(b_i)$ and $y(b_j)$ of the blocks $b_i$ and $b_j$.

25. A computer comprising a program for enabling a computer to execute the sequence-pair creating method according to claim 13.

* * * * *